(12) United States Patent  
Song

(10) Patent No.: US 11,422,803 B2  
(45) Date of Patent: Aug. 23, 2022

(54) PROCESSING-IN-MEMORY (PIM) DEVICE

(71) Applicant: SK hynix Inc., Icheon-si (KR)

(72) Inventor: Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/145,245

(22) Filed: Jan. 8, 2021

(65) Prior Publication Data

US 2021/0208877 A1 Jul. 8, 2021

Related U.S. Application Data

(63) Continuation-in-part of application No. 17/090,462, filed on Nov. 5, 2020.

(60) Provisional application No. 62/958,223, filed on Jan. 7, 2020, provisional application No. 62/958,609, filed on Jan. 8, 2020.

(30) Foreign Application Priority Data

Jan. 17, 2020 (KR) ........................ 10-2020-0006902

(51) Int. Cl.
*G06F 9/30* (2018.01)
*G06F 7/544* (2006.01)

(52) U.S. Cl.
CPC .......... *G06F 9/3001* (2013.01); *G06F 7/5443* (2013.01); *G06F 9/30036* (2013.01)

(58) Field of Classification Search
None
See application file for complete search history.

(56) References Cited

U.S. PATENT DOCUMENTS

| 5,276,634 | A | * | 1/1994 | Suzuki | G06F 7/485 |
| | | | | | 708/497 |
| 6,247,036 | B1 | * | 6/2001 | Landers | G06F 9/30003 |
| | | | | | 708/603 |
| 9,438,274 | B2 | * | 9/2016 | Cho | H03M 13/1545 |
| 9,537,477 | B2 | * | 1/2017 | Song | H03K 5/00006 |
| 10,042,639 | B2 | | 8/2018 | Gopal et al. | |
| 2008/0180450 | A1 | * | 7/2008 | Dowling | G06F 9/3853 |
| | | | | | 345/503 |
| 2018/0121796 | A1 | | 5/2018 | Deisher et al. | |
| 2018/0232627 | A1 | * | 8/2018 | Rozen | G06N 3/08 |

(Continued)

FOREIGN PATENT DOCUMENTS

KR 1020170097633 A 8/2017

OTHER PUBLICATIONS

Liao, Y., et al., A High Performance and Low Power 32-bit Multiply-Accumulate Unit with Single-Instruction-Multiple-Data (SIMD) Feature., IEEE, 2002. pp. 926-931. (Year: 2002).*

*Primary Examiner* — Eric Coleman
(74) *Attorney, Agent, or Firm* — William Park & Associates Ltd.

(57) ABSTRACT

A processing-in-memory (PIM) device includes a data storage region and a multiplication/accumulation (MAC) operator. The data storage region is configured to store first data and second data. The MAC operator is configured to perform a MAC arithmetic operation of the first data and the second data. The MAC operator includes a MAC circuit configured to perform the MAC arithmetic operation to output MAC result data and a data output unit configured to feedback bias data to the MAC circuit prior to the MAC arithmetic operation.

18 Claims, 58 Drawing Sheets

(56) References Cited

U.S. PATENT DOCUMENTS

| | | | |
|---|---|---|---|
| 2018/0260711 A1* | 9/2018 | Zhang | G06N 3/063 |
| 2018/0300138 A1* | 10/2018 | Pineda de Gyvez | G06N 3/0635 |
| 2018/0341495 A1* | 11/2018 | Culurciello | G06N 3/04 |
| 2019/0235866 A1* | 8/2019 | Das Sarma | G06F 17/16 |
| 2019/0318246 A1* | 10/2019 | Chen | G06N 3/04 |
| 2020/0193277 A1 | 6/2020 | Kwon | |
| 2020/0294575 A1 | 9/2020 | O et al. | |

* cited by examiner

FIG. 32

$$\begin{pmatrix} W0.0 & W0.1 & W0.2 & \cdots & W0.N \\ W1.0 & W1.1 & W1.2 & \cdots & W1.N \\ W2.0 & W2.1 & W2.2 & \cdots & W2.N \\ & & \cdots & & \\ WM.0 & WM.1 & WM.2 & \cdots & WM.N \end{pmatrix} \times \begin{pmatrix} X0.0 \\ X1.0 \\ X2.0 \\ \cdots \\ XN.0 \end{pmatrix} = \begin{pmatrix} MAC0.0 \\ MAC1.0 \\ MAC2.0 \\ \cdots \\ MACN.0 \end{pmatrix} + \begin{pmatrix} B0.0 \\ B1.0 \\ B2.0 \\ \cdots \\ BN.0 \end{pmatrix} = \begin{pmatrix} Y0.0 \\ Y1.0 \\ Y2.0 \\ \cdots \\ YN.0 \end{pmatrix}$$

WEIGHT MATRIX   VECTOR MATRIX   MAC RESULT MATRIX   BIAS MATRIX   BIASED RESULT MATRIX

PROCESSING-IN-MEMORY (PIM) DEVICE

CROSS-REFERENCE TO RELATED APPLICATIONS

This is a continuation-in-part of U.S. patent application Ser. No. 17/090,462, filed Nov. 5, 2020, which claims the priority of provisional application No. 62/958,223, filed on Jan. 7, 2020, and Korean Application No. 10-2020-0006902, filed on Jan. 17, 2020, which are incorporated herein by reference in their entirety. This application also claims the provisional application No. 62/958,609, filed on Jan. 8, 2020, which is incorporated herein by reference in its entirety.

BACKGROUND

1. Technical Field

Various embodiments of the present disclosure relate to processing-in-memory (PIM) devices and, more particularly, to PIM devices performing a deterministic arithmetic operation.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. One cause of this widespread interest may be due to the improved performance of processors performing arithmetic operations. To improve the performance of artificial intelligence, it may be necessary to increase the number of layers constituting a neural network of the artificial intelligence to educate the artificial intelligence. This trend has continued in recent years, which has led to an exponential increase in the amount of computations required for hardware actually performing the computations. Moreover, if artificial intelligence employs a general hardware system including a memory and a processor which are separated from each other, the performance of the artificial intelligence may be degraded due to a limitation of the amount of data communication between the memory and the processor. In order to solve this problem, a PIM device in which a processor and memory are integrated in one semiconductor chip has been used as a neural network computing device. Because the PIM device directly performs arithmetic operations in the PIM device, a data processing speed in the neural network may be improved.

SUMMARY

A processing-in-memory (PIM) device according to an embodiment of the present disclosure includes a data storage region and a multiplication/accumulation (MAC) operator. The data storage region is configured to store first data and second data. The MAC operator is configured to perform a MAC arithmetic operation of the first data and the second data. The MAC operator includes a MAC circuit configured to perform the MAC arithmetic operation to output MAC result data and a data output unit configured to feedback bias data to the MAC circuit prior to the MAC arithmetic operation.

A processing-in-memory (PIM) device according to an embodiment of the present disclosure includes a multiplication/accumulation (MAC) circuit, a data output unit, and an input control circuit. The MAC circuit includes an arithmetic block and an accumulative addition logic circuit. The arithmetic block is configured to perform a MAC arithmetic operation of first data and second data to output MAC interim data, and the accumulative addition logic circuit is configured to add feedback data to the MAC interim data to output MAC result data. The data output unit is configured to set the MAC result data as the feedback data to transmit the feedback data to the accumulative addition logic circuit. The input control circuit is configured to supply the first and second data to the MAC circuit. The input control circuit is configured to supply first preliminary data and second preliminary data to the MAC circuit before the first and second data are supplied to the MAC circuit. Bias data are outputted as the MAC result data by the MAC arithmetic operation of the first and second preliminary data.

BRIEF DESCRIPTION OF THE DRAWINGS

Certain features of the disclosed technology are illustrated by various embodiments with reference to the attached drawings.

FIG. 32 illustrates an example of a MAC arithmetic operation performed in the PIM device illustrated in FIG. 31.

DETAILED DESCRIPTION OF THE EMBODIMENTS

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed. A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure.

Various embodiments are directed to processing-in-memory (PIM) devices which are capable of performing a deterministic arithmetic operation at a high speed.

Figure 1:
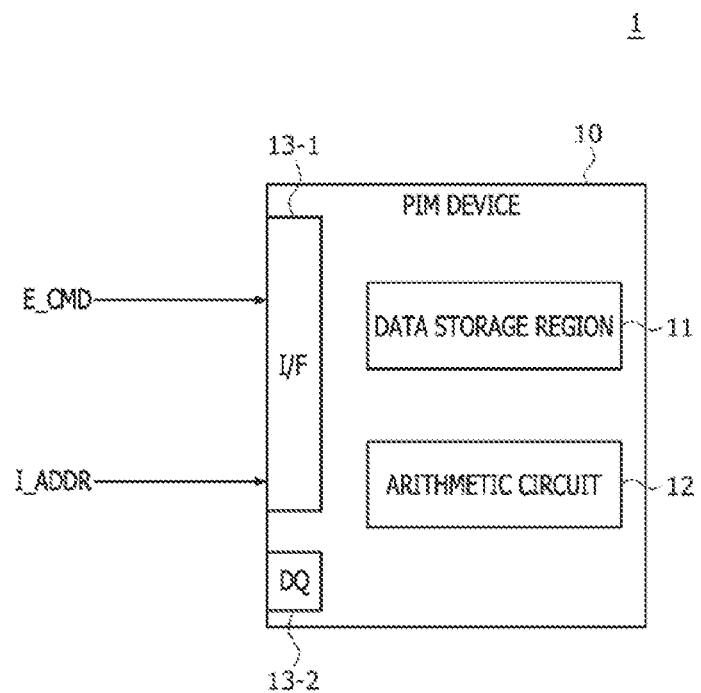
FIG. 1 is a block diagram illustrating a PIM device according to an embodiment of the present disclosure.

FIG. 1 is a block diagram illustrating a PIM device according to an embodiment of the present disclosure. As illustrated in FIG. 1, the PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device 10 through the data I/O pad 13-2. In an embodiment, the arithmetic circuit 12 may perform additional operations, for example a bias addition operation and an active function operation, for a neural network calculation, for example, an arithmetic operation in a deep learning process. In another embodiment, the PIM device 10 may include a bias addition circuit and active function circuit separated from the arithmetic circuit 12.

The interface 13-1 of the PIM device 10 may receive an external command E_CMD and an input address I_ADDR from an external device. The external device may denote a host or a PIM controller coupled to the PIM device 10. Hereinafter, it may be assumed that the external command E_CMD transmitted to the PIM device 10 is a command requesting the MAC arithmetic operation. That is, the PIM device 10 may perform a MAC arithmetic operation in response to the external command E_CMD. The data I/O pad 13-2 of the PIM device 10 may function as a data communication terminal between a device external to the PIM device 10, for example the PIM controller or a host located outside the PIM system 1. Accordingly, data outputted from the host or the PIM controller may be inputted into the PIM device 10 through the data I/O pad 13-2. Also, data outputted from the PIM device 10 may be inputted to the host or the PIM controller through the data I/O pad 13-2.

In an embodiment, the PIM device 10 may operate in a memory mode or a MAC arithmetic mode. In the event that the PIM device 10 operates in the memory mode, the PIM device 10 may perform a data read operation or a data write operation for the data storage region 11. In the event that the PIM device 10 operates in the MAC arithmetic mode, the arithmetic circuit 12 of the PIM device may receive first data and second data from the data storage region 11 to perform the MAC arithmetic operation. In the event that PIM device 10 operates in the MAC arithmetic mode, the PIM device 10 may also perform the data write operation for the data storage region 11 to execute the MAC arithmetic operation. The MAC arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Figure 2:
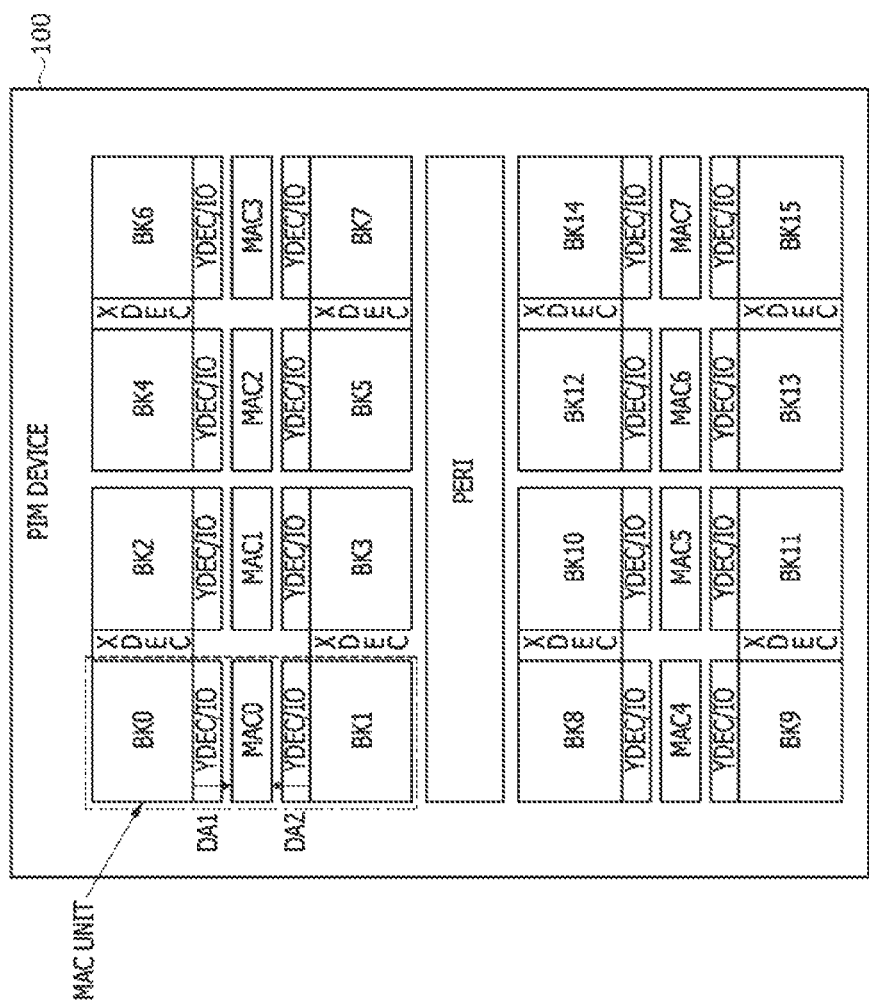
FIG. 2 is a schematic diagram illustrating an arrangement of memory banks and multiplication/accumulation (MAC) operators included in a PIM device according to a first embodiment of the present disclosure.

FIG. 2 illustrates a disposal structure indicating placement of memory banks BK0, . . . , and BK15 and MAC operators MAC0, . . . , and MAC7 included in a PIM device 100 according to an embodiment of the present disclosure. In an embodiment, the memory banks BK0, . . . , and BK15 and the MAC operators MAC0, . . . , and MAC7 may be included in the data storage region and the arithmetic circuit of the PIM device 10 of FIG. 1, respectively. Referring to FIG. 2, the PIM device 100 may include a data storage region and an arithmetic circuit. In an embodiment, the data storage region may include the memory banks BK0, . . . , and BK15. Although the present embodiment illustrates an example in which the data storage region includes the memory banks BK0, . . . , and BK15, the memory banks BK0, . . . , and BK15 are merely examples which are suitable for the data storage region. In some embodiments, the memory banks BK0, . . . , and BK15 may be a memory region corresponding to a volatile memory device, for example, a DRAM device. In an embodiment, each of the memory banks BK0, . . . , and BK15 may be a component unit which is independently activated and may be configured to have the same data bus width as data I/O lines in the PIM device 100. In an embodiment, the memory banks BK0, . . . , and BK15 may operate through interleaving such that an active operation of any one of the memory banks is performed in parallel while another memory bank is selected. Although the present embodiment illustrates an example in which the PIM device 100 includes the memory banks BK0, . . . , and BK15, the number of the memory banks is not limited to 16 and may be different in different embodiments. Each of the memory banks BK0, . . . , and BK15 may include at least one cell array which includes memory unit cells located at cross points of a plurality of rows and a plurality of columns. The memory banks BK0, . . . , and BK15 may include a first group of memory banks (e.g., odd-numbered memory banks BK0, BK2, . . . , and BK14) and a second group of memory banks (e.g., even-numbered memory banks BK1, BK3, . . . , and BK15).

A core circuit may be disposed to be adjacent to the memory banks BK0, . . . , and BK15. The core circuit may include X-decoders XDECs and Y-decoders/IO circuits YDEC/IOs. An X-decoder XDEC may also be referred to as a word line decoder or a row decoder. In an embodiment, two odd-numbered memory banks arrayed to be adjacent to each other in one row among the odd-numbered memory banks BK0, BK2, . . . , and BK14 may share one of the X-decoders XDECs with each other. For example, the first memory bank BK0 and the third memory bank BK2 adjacent to each other in a first row may share one of the X-decoders XDECs, and the fifth memory bank BK4 and the seventh memory bank BK6 adjacent to each other in the first row may also share one of the X-decoders XDECs. Similarly, two even-numbered memory banks arrayed to be adjacent to each other in one row among the even-numbered memory banks BK1, BK3, . . . , and BK15 may share one of the X-decoders XDECs with each other. For example, the second memory bank BK1 and the fourth memory bank BK3 adjacent to each other in a second row may share one of the X-decoders XDECs, and the sixth memory bank BK5 and the eighth memory bank BK7 adjacent to each other in the second row may also share one of the X-decoders XDECs. The X-decoder XDEC may receive a row address from an address latch included in a peripheral circuit PERI and may decode the row address to select and enable one of rows (i.e., word lines) coupled to the memory banks adjacent to the X-decoder XDEC.

The Y-decoders/IO circuits YDEC/IOs may be disposed to be allocated to the memory banks BK0, . . . , and BK15, respectively. For example, the first memory bank BK0 may be allocated to one of the Y-decoders/IO circuits YDEC/IOs, and the second memory bank BK1 may be allocated to another one of the Y-decoders/IO circuits YDEC/IOs. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address from an address latch included in the peripheral circuit PERI and may decode the column address to select and enable at least one of columns (i.e., bit lines) coupled to the selected memory bank. Each of the I/O circuits may include an I/O sense amplifier for sensing and amplifying a level of a read datum outputted from the corresponding memory bank during a read operation and a write driver for driving a write datum during a write operation for the corresponding memory bank.

In an embodiment, the arithmetic circuit may include MAC operators MAC0, . . . , and MAC7. Although the present embodiment illustrates an example in which the MAC operators MAC0, . . . , and MAC7 are employed as the arithmetic circuit, the present embodiment may be merely an example of the present disclosure. For example, in some other embodiments, processors other than the MAC operators MAC0, . . . , and MAC7 may be employed as the arithmetic circuit. The MAC operators MAC0, . . . , and MAC7 may be disposed such that one of the odd-numbered memory banks BK0, BK2, . . . , and BK14 and one of the even-numbered memory banks BK1, BK3, . . . , and BK15 share any one of the MAC operators MAC0, . . . , and MAC7 with each other. Specifically, one odd-numbered memory bank and one even-numbered memory bank arrayed in one column to be adjacent to each other may constitute a pair of memory banks sharing one of the MAC operators MAC0, . . . , and MAC7 with each other. One of the MAC operators MAC0, . . . , and MAC7 and a pair of memory banks sharing the one MAC operator with each other will be referred to as 'a MAC unit' hereinafter.

In an embodiment, the number of the MAC operators MAC0, . . . , and MAC7 may be equal to the number of the odd-numbered memory banks BK0, BK2, . . . , and BK14 or the number of the even-numbered memory banks BK1, BK3, . . . , and BK15. The first memory bank BK0, the second memory bank BK1, and the first MAC operator MAC0 between the first memory bank BK0 and the second memory bank BK1 may constitute a first MAC unit. In addition, the third memory bank BK2, the fourth memory bank BK3, and the second MAC operator MAC1 between the third memory bank BK2 and the fourth memory bank BK3 may constitute a second MAC unit. The first MAC operator MAC0 included in the first MAC unit may receive first data DA1 outputted from the first memory bank BK0 included in the first MAC unit and second data DA2 outputted from the second memory bank BK1 included in the first MAC unit. In addition, the first MAC operator MAC0 may perform a MAC arithmetic operation of the first data DA1 and the second data DA2. In the event that the PIM device 100 performs a neural network calculation, for example, an arithmetic operation in a deep learning process, one of the first data DA1 and the second data DA2 may be weight data and the other may be vector data. A configuration of any one of the MAC operators MAC0~MAC7 will be described in more detail hereinafter.

In the PIM device 100, the peripheral circuit PERI may be disposed in a region other than an area in which the memory banks BK0, BK1, . . . , and BK15, the MAC operators MAC0, . . . , and MAC7, and the core circuit are disposed. The peripheral circuit PERI may include a control circuit and a transmission path for a command/address signal, a control circuit and a transmission path for input/output of data, and a power supply circuit. The control circuit for the command/address signal may include a command decoder for decoding a command included in the command/address signal to generate an internal command signal, an address latch for converting an input address into a row address and a column address, a control circuit for controlling various functions of row/column operations, and a control circuit for controlling a delay locked loop (DLL) circuit. The control circuit for the input/output of data in the peripheral circuit PERI may include a control circuit for controlling a read/write operation, a read/write buffer, and an output driver. The power supply circuit in the peripheral circuit PERI may include a reference power voltage generation circuit for generating an internal reference power voltage and an internal power voltage generation circuit for generating an internal power voltage from an external power voltage.

The PIM device 100 according to the present embodiment may operate in any one mode of a memory mode and a MAC arithmetic mode. In the memory mode, the PIM device 100 may operate to perform the same operations as general memory devices. The memory mode may include a memory read operation mode and a memory write operation mode. In the memory read operation mode, the PIM device 100 may perform a read operation for reading out data from the memory banks BK0, BK1, . . . , and BK15 to output the read data, in response to an external request. In the memory write operation mode, the PIM device 100 may perform a write operation for storing data provided by an external device into the memory banks BK0, BK1, . . . , and BK15, in response to an external request.

In the MAC arithmetic mode, the PIM device 100 may perform the MAC arithmetic operation using the MAC operators MAC0, . . . , and MAC7. Specifically, the PIM device 100 may perform the read operation of the first data DA1 for each of the odd-numbered memory banks BK0, BK2, . . . , and BK14 and the read operation of the second data DA2 for each of the even-numbered memory banks BK1, BK3, . . . , and BK15, for the MAC arithmetic operation in the MAC arithmetic mode. In addition, each of the MAC operators MAC0, . . . , and MAC7 may perform the MAC arithmetic operation of the first data DA1 and the second data DA2 which are read out of the memory banks to store a result of the MAC arithmetic operation into the memory bank or to output the result of the MAC arithmetic operation. In some cases, the PIM device 100 may perform a data write operation for storing data to be used for the MAC arithmetic operation into the memory banks before the data read operation for the MAC arithmetic operation is performed in the MAC arithmetic mode.

The operation mode of the PIM device 100 according to the present embodiment may be determined by a command which is transmitted from a host or a controller to the PIM device 100. In an embodiment, if a first external command requesting a read operation or a write operation for the memory banks BK0, BK1, . . . , and BK15 is inputted to the PIM device 100, the PIM device 100 may perform the data read operation or the data write operation in the memory mode. Meanwhile, if a second external command requesting a MAC calculation corresponding to the MAC arithmetic operation is inputted to the PIM device 100, the PIM device 100 may perform the MAC arithmetic operation.

The PIM device 100 may perform a deterministic MAC arithmetic operation. The term "deterministic MAC arithmetic operation" used in the present disclosure may be defined as the MAC arithmetic operation performed in the PIM device 100 during a predetermined fixed time. Thus, the host or the controller may always predict a point in time (or a clock) when the MAC arithmetic operation terminates in the PIM device 100 at a point in time when an external command requesting the MAC arithmetic operation is transmitted from the host or the controller to the PIM device 100. No operation for informing the host or the controller of a status of the MAC arithmetic operation is required while the PIM device 100 performs the deterministic MAC arithmetic operation. In an embodiment, a latency during which the MAC arithmetic operation is performed in the PIM device 100 may be fixed for the deterministic MAC arithmetic operation.

Figure 3:
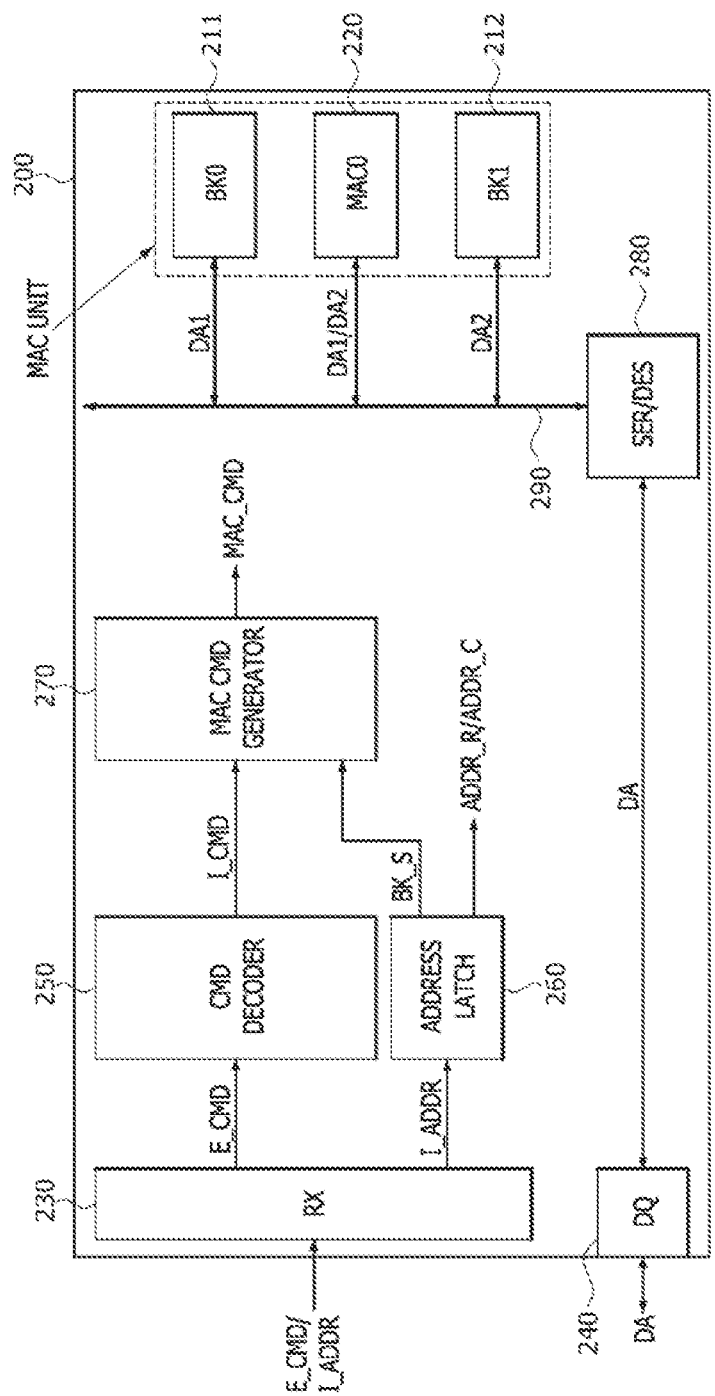
FIG. 3 is a block diagram illustrating a configuration of a PIM device according to the first embodiment of the present disclosure.
Figure 4:
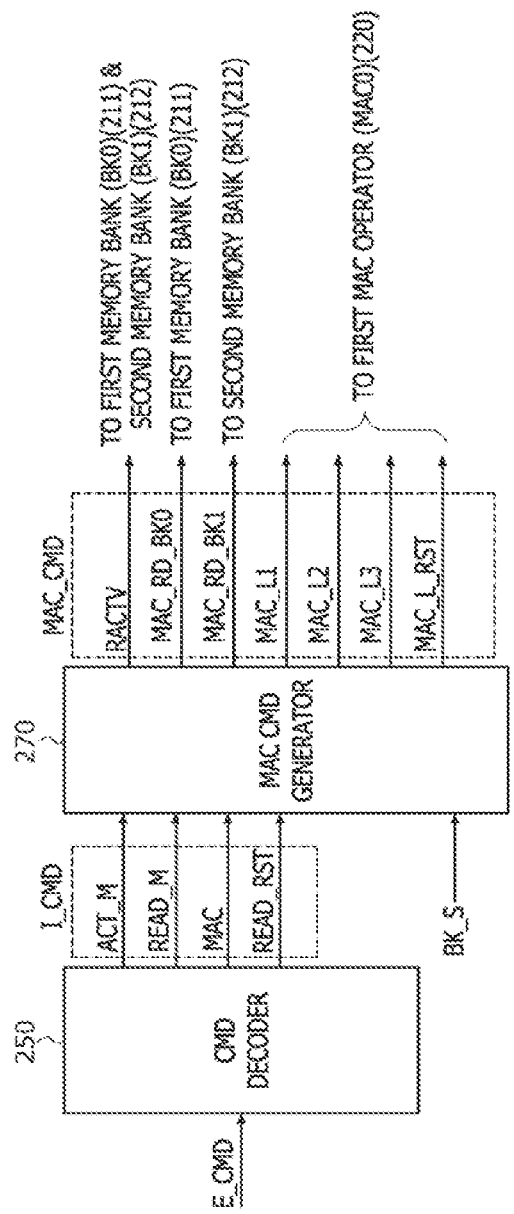
FIG. 4 illustrates internal command signals outputted from a command decoder and MAC command signals outputted from a MAC command generator in the PIM device of FIG. 3.

FIG. 3 is a block diagram illustrating a configuration of a PIM device 200 corresponding to the PIM device 100 illustrated in FIG. 3, and FIG. 4 illustrates an internal command signal I_CMD outputted from a command decoder 250 and a MAC command signal MAC_CMD outputted from a MAC command generator 270 included in the PIM device 200 of FIG. 3. FIG. 3 illustrates only the first memory bank (BK0) 211, the second memory bank (BK1) 212, and the first MAC operator (MAC0) 220 constituting the first MAC unit among the plurality of MAC units. However, FIG. 3 illustrates merely an example for simplification of the drawing. Accordingly, the following description for the first MAC unit may be equally applicable to the remaining MAC units. Referring to FIG. 3, the PIM device 200 may include a global I/O line (hereinafter, referred to as a 'GIO line') 290. The first memory bank (BK0) 211, the second memory bank (BK1) 212, and the first MAC operator (MAC0) 220 may communicate with each other through the GIO line 290. In an embodiment, the GIO line 290 may be disposed in the peripheral circuit PERI of FIG. 2.

The PIM device 200 may include a receiving driver (RX) 230, a data I/O circuit (DQ) 240, a command decoder 250, an address latch 260, a MAC command generator 270, and a serializer/deserializer (SER/DES) 280. The command decoder 250, the address latch 260, the MAC command generator 270, and the serializer/deserializer 280 may be disposed in the peripheral circuit PERI of the PIM device 100 illustrated in FIG. 2. The receiving driver 230 may receive an external command E_CMD and an input address I_ADDR from an external device. The external device may denote a host or a controller coupled to the PIM device 200. Hereinafter, it may be assumed that the external command E_CMD transmitted to the PIM device 200 is a command requesting the MAC arithmetic operation. That is, the PIM device 200 may perform the deterministic MAC arithmetic operation in response to the external command E_CMD. The data I/O circuit 240 may include an I/O pad. The data I/O circuit 240 may be coupled to data I/O line. The PIM device 200 may communicate with the external device through the data I/O circuit 240. The receiving driver 230 may separately output the external command E_CMD and the input address I_ADDR received from the external device. Data DA inputted to the PIM device 200 through the data I/O circuit 240 may be processed by the serializer/deserializer 280 and may be transmitted to the first memory bank (BK0) 211 and the second memory bank (BK1) 212 through the GIO line 290 of the PIM device 200. The data DA outputted from the first memory bank (BK0) 211, the second memory bank (BK1) 212, and the first MAC operator (MAC0) 220 through the GIO line 290 may be processed by the serializer/deserializer 280 and may be outputted to the external device through the data I/O circuit 240. The serializer/deserializer 280 may convert the data DA into parallel data if the data DA are serial data or may convert the data DA into serial data if the data DA are parallel data. For the data conversion, the serializer/deserializer 280 may include a serializer converting parallel data into serial data and a deserializer converting serial data into parallel data.

The command decoder 250 may decode the external command E_CMD outputted from the receiving driver 230 to generate and output the internal command signal I_CMD. As illustrated in FIG. 4, the internal command signal I_CMD outputted from the command decoder 250 may include first to fourth internal command signals. In an embodiment, the first internal command signal may be a memory active signal ACT_M, the second internal command signal may be a memory read signal READ_M, the third internal command signal may be a MAC arithmetic signal MAC, and the fourth internal command signal may be a result read signal READ_RST. The first to fourth internal command signals outputted from the command decoder 250 may be sequentially inputted to the MAC command generator 270.

In order to perform the deterministic MAC arithmetic operation of the PIM device 200, the memory active signal ACT_M, the memory read signal READ_M, the MAC arithmetic signal MAC, and the result read signal READ_RST outputted from the command decoder 250 may be sequentially generated at predetermined points in time (or clocks). In an embodiment, the memory active signal ACT_M, the memory read signal READ_M, the MAC arithmetic signal MAC, and the result read signal READ_RST may have predetermined latencies, respectively. For example, the memory read signal READ_M may be generated after a first latency elapses from a point in time when the memory active signal ACT_M is generated, the MAC arithmetic signal MAC may be generated after a second latency elapses from a point in time when the memory read signal READ_M is generated, and the result read signal READ_RST may be generated after a third latency elapses from a point in time when the MAC arithmetic signal MAC is generated. No signal is generated by the command decoder 250 until a fourth latency elapses from a point in time when the result read signal READ_RST is generated. The first to fourth latencies may be predetermined and fixed. Thus, the host or the controller outputting the external command E_CMD may predict the points in time when the first to fourth internal command signals constituting the internal command signal I_CMD are generated by the command decoder 250 in advance at a point in time when the external command E_CMD is outputted from the host or the controller.

The address latch 260 may convert the input address I_ADDR outputted from the receiving driver 230 into a bank selection signal BK_S and a row/column address ADDR_R/ADDR_C to output the bank selection signal BK_S and the row/column address ADDR_R/ADDR_C. The bank selection signal BK_S may be inputted to the MAC command generator 270. The row/column address ADDR_R/ADDR_C may be transmitted to the first and second memory banks 211 and 212. One of the first and second memory banks 211 and 212 may be selected by the bank selection signal BK_S. One of rows included in the selected memory bank and one of columns included in the selected memory bank may be selected by the row/column address ADDR_R/ADDR_C. In an embodiment, a point in time when the bank selection signal BK_S is inputted to the MAC command generator 270 may be the same moment as a point in time when the row/column address ADDR_R/ADDR_C is inputted to the first and second memory banks 211 and 212. In an embodiment, the point in time when the bank selection signal BK_S is inputted to the MAC command generator 270 and the point in time when the row/column address ADDR_R/ADDR_C is inputted to the first and second memory banks 211 and 212 may be a point in time when the MAC command is generated to read out data from the first and second memory banks 211 and 212 for the MAC arithmetic operation.

The MAC command generator 270 may output the MAC command signal MAC_CMD in response to the internal command signal I_CMD outputted from the command decoder 250 and the bank selection signal BK_S outputted from the address latch 260. As illustrated in FIG. 4, the MAC command signal MAC_CMD outputted from the MAC command generator 270 may include first to seventh MAC command signals. In an embodiment, the first MAC command signal may be a MAC active signal RACTV, the second MAC command signal may be a first MAC read signal MAC_RD_BK0, the third MAC command signal may be a second MAC read signal MAC_RD_BK1, the fourth MAC command signal may be a first MAC input latch signal MAC_L1, the fifth MAC command signal may be a second MAC input latch signal MAC_L2, the sixth MAC command signal may be a MAC output latch signal MAC_L3, and the seventh MAC command signal may be a MAC result latch signal MAC_L_RST.

The MAC active signal RACTV may be generated based on the memory active signal ACT_M outputted from the command decoder 250. The first MAC read signal MAC_RD_BK0 may be generated in response to the memory read signal READ_M outputted from the command decoder 250 and the bank selection signal BK_S having a first level (e.g., a logic "low" level) outputted from the address latch 260. The first MAC input latch signal MAC_1 may be generated at a point in time when a certain time elapses from a point in time when the first MAC read signal MAC_RD_BK0 is generated. For various embodiments, a certain time means a fixed time duration. The second MAC read signal MAC_RD_BK1 may be generated in response to the memory read signal READ_M outputted from the command decoder 250 and the bank selection signal BK_S having a second level (e.g., a logic "high" level) outputted from the address latch 260. The second MAC input latch signal MAC_L2 may be generated at a point in time when a certain time elapses from a point in time when the second MAC read signal MAC_RD_BK1 is generated. The MAC output latch signal MAC_L3 may be generated in response to the MAC arithmetic signal MAC outputted from the command decoder 250. Finally, the MAC result latch signal MAC_L_RST may be generated in response to the result read signal READ_RST outputted from the command decoder 250.

The MAC active signal RACTV outputted from the MAC command generator 270 may control an activation operation for the first and second memory banks 211 and 212. The first MAC read signal MAC_RD_BK0 outputted from the MAC command generator 270 may control a data read operation for the first memory bank 211. The second MAC read signal MAC_RD_BK1 outputted from the MAC command generator 270 may control a data read operation for the second memory bank 212. The first MAC input latch signal MAC_L1 and the second MAC input latch signal MAC_L2 outputted from the MAC command generator 270 may control an input data latch operation of the first MAC operator (MAC0) 220. The MAC output latch signal MAC_L3 outputted from the MAC command generator 270 may control an output data latch operation of the first MAC operator (MAC0) 220. The MAC result latch signal MAC_L_RST outputted from the MAC command generator 270 may control a reset operation of the first MAC operator (MAC0) 220.

As described above, in order to perform the deterministic MAC arithmetic operation of the PIM device 200, the memory active signal ACT_M, the memory read signal READ_M, the MAC arithmetic signal MAC, and the result read signal READ_RST outputted from the command decoder 250 may be sequentially generated at predetermined points in time (or clocks), respectively. Thus, the MAC active signal RACTV, the first MAC read signal MAC_RD_BK0, the second MAC read signal MAC_RD_BK1, the first MAC input latch signal MAC_L1, the second MAC input latch signal MAC_L2, the MAC output latch signal MAC_L3, and the MAC result latch signal MAC_L_RST may also be generated and outputted from the MAC command generator 270 at predetermined points in time after the external command E_CMD is inputted to the PIM device 200, respectively. That is, a time period from a point in time when the first and second memory banks 211 and 212 are activated by the MAC active signal RACTV until a point in time when the first MAC operator (MAC0) 220 is reset by the MAC result latch signal MAC_L_RST may be predetermined, and thus the PIM device 200 may perform the deterministic MAC arithmetic operation.

Figure 5:
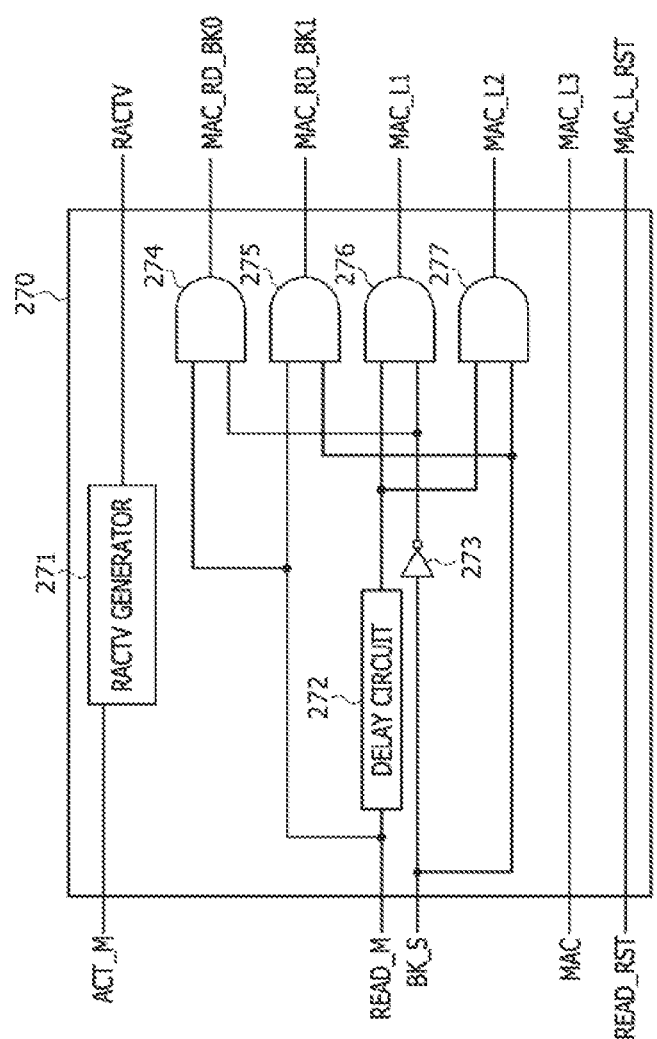
FIG. 5 illustrates an example of a configuration of a MAC command generator included in the PIM device of FIG. 3.

FIG. 5 illustrates an example of a configuration of the MAC command generator 270 included in the PIM device 200 illustrated in FIG. 3. Referring to FIG. 5, the MAC command generator 270 may sequentially receive the memory active signal ACT_M, the memory read signal READ_M, the MAC arithmetic signal MAC, and the result read signal READ_RST from the command decoder 250. In addition, the MAC command generator 270 may also receive the bank selection signal BK_S from the address latch 260. The MAC command generator 270 may output the MAC active signal RACTV, the first MAC read signal MAC_RD_BK0, the second MAC read signal MAC_RD_BK1, the first MAC input latch signal MAC_L1, the second MAC input latch signal MAC_L2, the MAC output latch signal MAC_L3, and the MAC result latch signal MAC_L_RST in series with certain time intervals. For an embodiment, a certain time interval is a time interval having a fixed duration.

In an embodiment, the MAC command generator 270 may be configured to include an active signal generator 271, a delay circuit 272, an inverter 273, and first to fourth AND gates 274, 275, 276, and 277. The active signal generator 271 may receive the memory active signal ACT_M to generate and output the MAC active signal RACTV. The MAC active signal RACTV outputted from the active signal generator 271 may be transmitted to the first and second memory banks 211 and 212 to activate the first and second memory banks 211 and 212. The delay circuit 272 may receive the memory read signal READ_M and may delay the memory read signal READ_M by a delay time DELAY_T to output the delayed signal of the memory read signal READ_M. The inverter 273 may receive the bank selection signal BK_S and may invert a logic level of the bank selection signal BK_S to output the inverted signal of the bank selection signal BK_S.

The first AND gate 274 may receive the memory read signal READ_M and an output signal of the inverter 273 and may perform a logical AND operation of the memory read signal READ_M and an output signal of the inverter 273 to generate and output the first MAC read signal MAC_RD_BK0. The second AND gate 275 may receive the memory read signal READ_M and the bank selection signal BK_S and may perform a logical AND operation of the memory read signal READ_M and the bank selection signal BK_S to generate and output the second MAC read signal MAC_RD_BK1. The third AND gate 276 may receive an output signal of the delay circuit 272 and an output signal of the inverter 273 and may perform a logical AND operation of the output signals of the delay circuit 272 and the inverter 273 to generate and output the first MAC input latch signal MAC_L1. The fourth AND gate 277 may receive an output signal of the delay circuit 272 and the bank selection signal BK_S and may perform a logical AND operation of the output signal of the delay circuit 272 and the bank selection signal BK_S to generate and output the second MAC input latch signal MAC_L2.

It may be assumed that the memory read signal READ_M inputted to the MAC command generator 270 has a logic "high" level and the bank selection signal BK_S inputted to the MAC command generator 270 has a logic "low" level. A level of the bank selection signal BK_S may change from a logic "low" level into a logic "high" level after a certain time elapses. When the memory read signal READ_M has a logic "high" level and the bank selection signal BK_S has a logic "low" level, the first AND gate 274 may output the first MAC read signal MAC_RD_BK0 having a logic "high" level and the second AND gate 275 may output the second MAC read signal MAC_RD_BK1 having a logic "low" level. The first memory bank 211 may transmit the first data DA1 to the first MAC operator 220 according to a control operation based on the first MAC read signal MAC_RD_BK0 having a logic "high" level. If a level transition of the bank selection signal BK_S occurs so that both of the memory read signal READ_M and the bank selection signal BK_S have a logic "high" level, the first AND gate 274 may output the first MAC read signal MAC_RD_BK0 having a logic "low" level and the second AND gate 275 may output the second MAC read signal MAC_RD_BK1 having a logic "high" level. The second memory bank 212 may transmit the second data DA2 to the first MAC operator 220 according to a control operation based on the second MAC read signal MAC_RD_BK1 having a logic "high" level.

Due to the delay time of the delay circuit 272, the output signals of the third and fourth AND gates 276 and 277 may be generated after the first and second MAC read signals MAC_RD_BK0 and MAC_RD_BK1 are generated. Thus, after the second MAC read signal MAC_RD_BK1 is generated, the third AND gate 276 may output the first MAC input latch signal MAC_L1 having a logic "high" level. The first MAC operator 220 may latch the first data DA1 in response to the first MAC input latch signal MAC_L1 having a logic "high" level. After a certain time elapses from a point in time when the first data DA1 are latched by the first MAC operator 220, the fourth AND gate 277 may output the second MAC input latch signal MAC_L2 having a logic "high" level. The first MAC operator 220 may latch the second data DA2 in response to the second MAC input latch signal MAC_L2 having a logic "high" level. The first MAC operator 220 may start to perform the MAC arithmetic operation after the first and second data DA1 and DA2 are latched.

The MAC command generator 270 may generate the MAC output latch signal MAC_L3 in response to the MAC arithmetic signal MAC outputted from the command decoder 250. The MAC output latch signal MAC_L3 may have the same logic level as the MAC arithmetic signal MAC. For example, if the MAC arithmetic signal MAC having a logic "high" level is inputted to the MAC command generator 270, the MAC command generator 270 may generate the MAC output latch signal MAC_L3 having a logic "high" level. The MAC command generator 270 may generate the MAC result latch signal MAC_L_RST in response to the result read signal READ_RST outputted from the command decoder 250. The MAC result latch signal MAC_L_RST may have the same logic level as the result read signal READ_RST. For example, if the result read signal READ_RST having a logic "high" level is inputted to the MAC command generator 270, the MAC command generator 270 may generate the MAC result latch signal MAC_L_RST having a logic "high" level.

Figure 6:
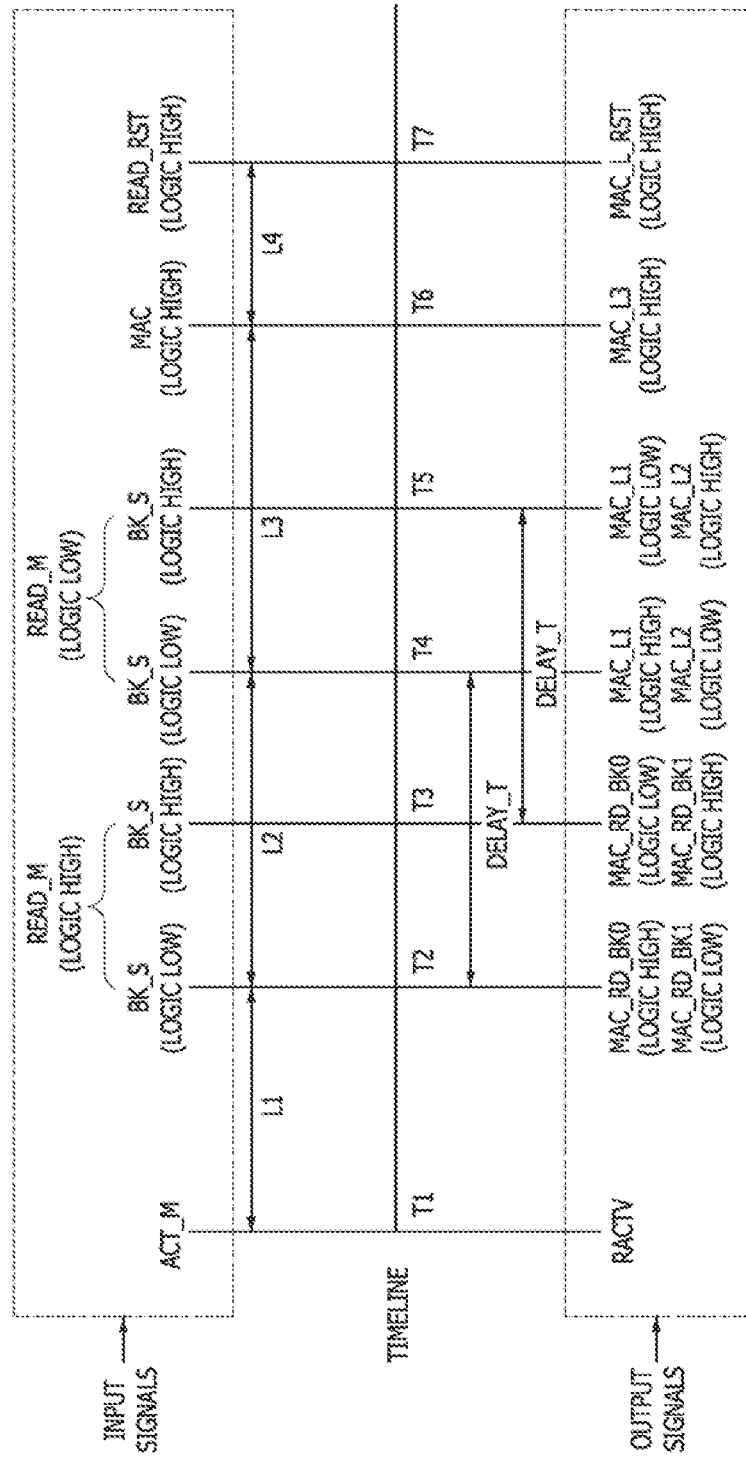
FIG. 6 illustrates input signals and output signals of the MAC command generator illustrated in FIG. 5 with a timeline.

FIG. 6 illustrates input signals and output signals of the MAC command generator 270 illustrated in FIG. 5 along a timeline. In FIG. 6, signals transmitted from the command decoder 250 to the MAC command generator 270 are illustrated in an upper dotted line box, and signals outputted from the MAC command generator 270 are illustrated in a lower dotted line box. Referring to FIGS. 5 and 6 at a first point in time "T1" of the timeline, the memory active signal ACT_M may be inputted to the MAC command generator 270 and the MAC command generator 270 may output the MAC active signal RACTV. At a second point in time "T2" when a certain time, for example, a first latency L1 elapses from the first point in time "T1", the memory read signal READ_M having a logic "high" level and the bank selection signal BK_S having a logic "low" level may be inputted to the MAC command generator 270. In response to the memory read signal READ_M having a logic "high" level and the bank selection signal BK_S having a logic "low" level, the MAC command generator 270 may output the first MAC read signal MAC_RD_BK0 having a logic "high" level and the second MAC read signal MAC_RD_BK1 having a logic "low" level in response to the memory read signal READ_M having a logic "high" level and the bank selection signal BK_S having a logic "low" level, as described with reference to FIG. 5. At a third point in time "T3" when a certain time elapses from the second point in time "T2", a logic level of the bank selection signal BK_S may change from a logic "low" level into a logic "high" level. In such a case, the MAC command generator 270 may output the first MAC read signal MAC_RD_BK0 having a logic "low" level and the second MAC read signal MAC_RD_BK1 having a logic "high" level, as described with reference to FIG. 5.

At a fourth point in time "T4" when the delay time DELAY_T elapses from the second point in time "T2", the MAC command generator 270 may output the first MAC input latch signal MAC_L1 having a logic "high" level and the second MAC input latch signal MAC_L2 having a logic "low" level. The delay time DELAY_T may be set by the delay circuit 272. The delay time DELAY_T may bet to be different according a logic design scheme of the delay circuit 272 and may be fixed once the logic design scheme of the delay circuit 272 is determined. In an embodiment, the delay time DELAY_T may be set to be equal to or greater than a second latency L2. At a fifth point in time "T5" when a certain time elapses from the fourth point in time "T4", the MAC command generator 270 may output the first MAC input latch signal MAC_1 having a logic "low" level and the second MAC input latch signal MAC_L2 having a logic "high" level. The fifth point in time "T5" may be a moment when the delay time DELAY_T elapses from the third point in time "T3".

At a sixth point in time "T6" when a certain time, for example, a third latency L3 elapses from the fourth point in time "T4", the MAC arithmetic signal MAC having a logic "high" level may be inputted to the MAC command generator 270. In response to the MAC arithmetic signal MAC having a logic "high" level, the MAC command generator 270 may output the MAC output latch signal MAC_L3 having a logic "high" level, as described with reference to FIG. 5. Subsequently, at a seventh point in time "T7" when a certain time, for example, a fourth latency L4 elapses from the sixth point in time "T6", the result read signal READ_RST having a logic "high" level may be inputted to the MAC command generator 270. In response to the result read signal READ_RST having a logic "high" level, the MAC command generator 270 may output the MAC result latch signal MAC_L_RST having a logic "high" level, as described with reference to FIG. 5.

In order to perform the deterministic MAC arithmetic operation, moments when the internal command signals ACT_M, READ_M, MAC, and READ_RST generated by the command decoder 250 are inputted to the MAC command generator 270 may be fixed and moments when the MAC command signals RACTV, MAC_RD_BK0, MAC_RD_BK1, MAC_L1, MAC_L2, MAC_L3, and MAC_L_RST are outputted from the MAC command generator 270 in response to the internal command signals ACT_M, READ_M, MAC, and READ_RST may also be fixed. Thus, all of the first latency L1 between the first point in time "T1" and the second point in time "T2", the second latency L2 between the second point in time "T2" and the fourth point in time "T4", the third latency L3 between the fourth point in time "T4" and the sixth point in time "T6", and the fourth latency L4 between the sixth point in time "T6" and the seventh point in time "T7" may have fixed values.

In an embodiment, the first latency L1 may be defined as a time it takes to activate both of the first and second memory banks based on the MAC active signal RACTV. The second latency L2 may be defined as a time it takes to read the first and second data out of the first and second memory banks BK0 and BK1 based on the first and second MAC read signals MAC_RD_BK0 and MAC_RD_BK1 and to input the first and second data DA1 and DA2 into the first MAC operator (MAC0) 220. The third latency L3 may be defined as a time it takes to latch the first and second data DA1 and DA2 in the first MAC operator (MAC0) 220 based on the first and second MAC input latch signals MAC_1 and MAC_L2 and it takes the first MAC operator (MAC0) 220 to perform the MAC arithmetic operation of the first and second data. The fourth latency L4 may be defined as a time it takes to latch the output data in the first MAC operator (MAC0) 220 based on the MAC output latch signal MAC_L3.

Figure 7:
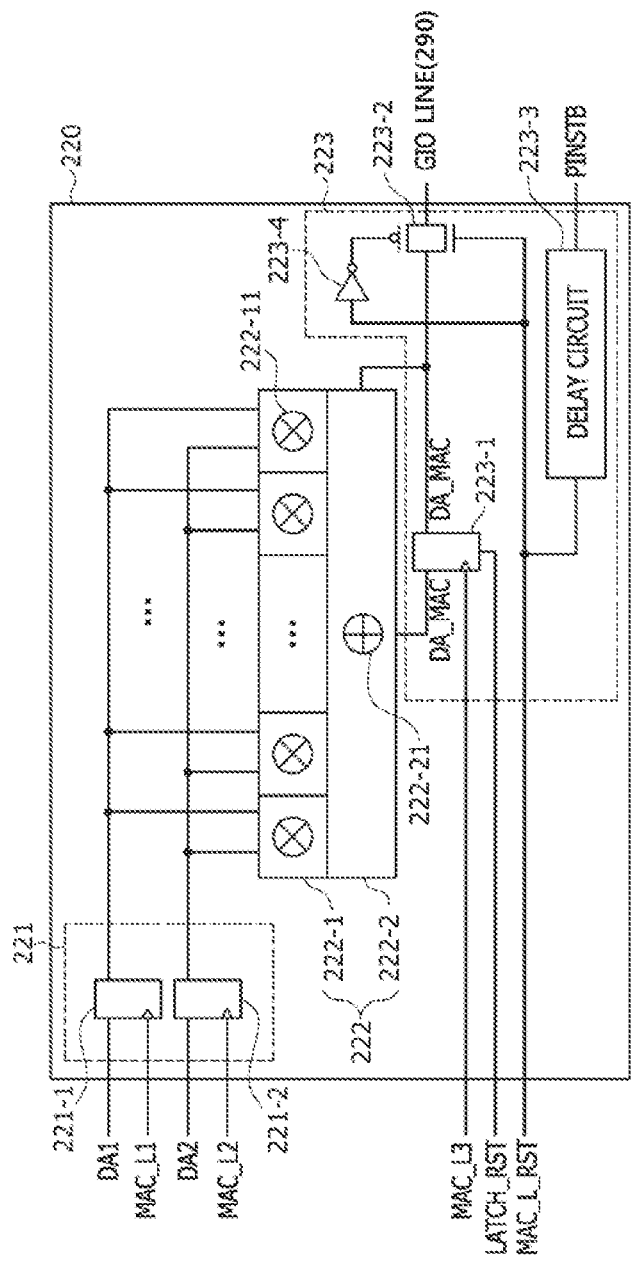
FIG. 7 illustrates an example of a configuration of a MAC operator included in the PIM device of FIG. 3.
Figure 8:
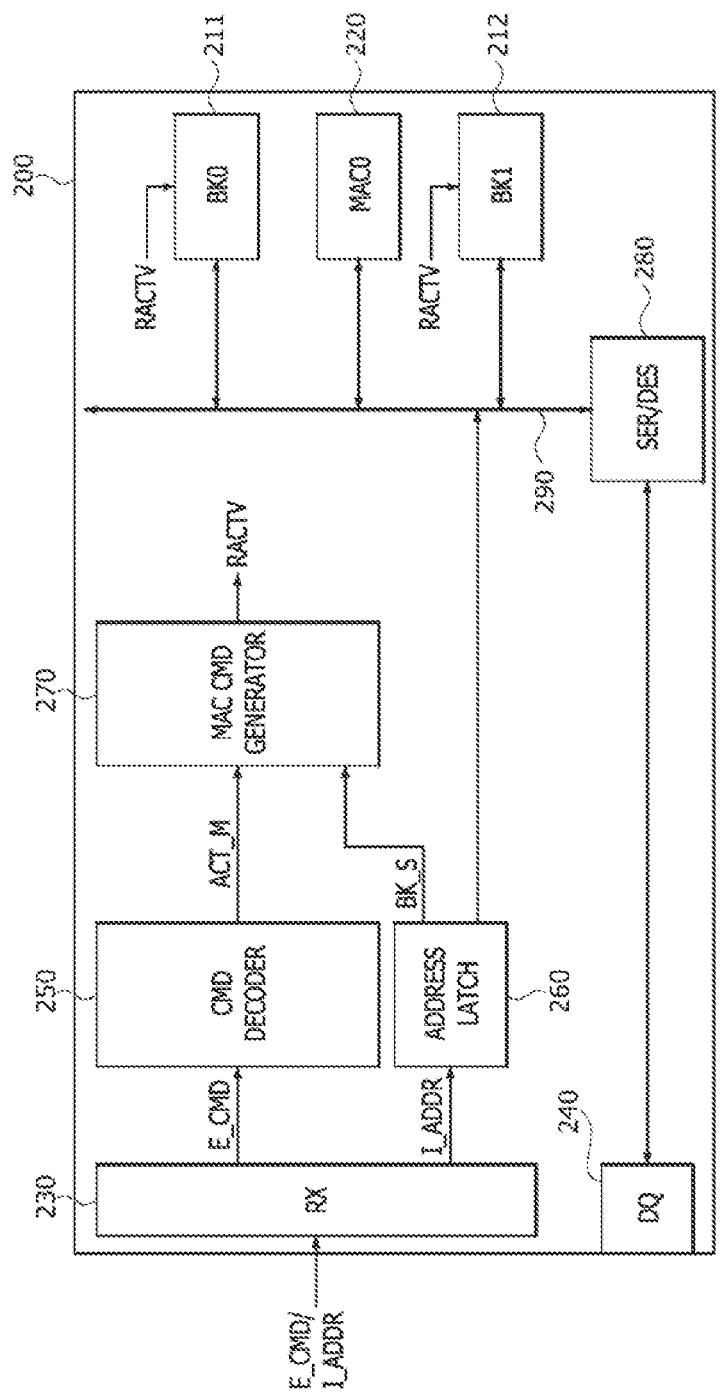
FIGS. 8 to 14 are block diagrams illustrating operations of the PIM device illustrated in FIG. 3.

FIG. 7 illustrates an example of a configuration of the first MAC operator (MAC0) 220 included in the PIM device 200 illustrated in FIG. 3. Referring to FIG. 7, the first MAC operator (MAC0) 220 may be configured to include a data input circuit 221, a MAC circuit 222, and a data output circuit 223. The data input circuit 221 may be configured to include a first input latch 221-1 and a second input latch 221-2. The MAC circuit 222 may be configured to include a multiplication logic circuit 222-1 and an addition logic circuit 222-2. The data output circuit 223 may be configured to include an output latch 223-1, a transfer gate 223-2, a delay circuit 223-3, and an inverter 223-4. In an embodiment, the first input latch 221-1, the second input latch 221-2, and the output latch 223-1 may be realized using flip-flops.

The data input circuit 221 of the first MAC operator (MAC0) 220 may be synchronized with the first and second MAC input latch signals MAC_L1 and MAC_L2 to receive and output the first and second data DA1 and DA2 inputted through the GIO line 290 to the MAC circuit 222. Specifically, the first data DA1 may be transmitted from the first memory bank BK0 (211 of FIG. 3) to the first input latch 221-1 of the data input circuit 221 through the GIO line 290, in response to the first MAC read signal MAC_RD_BK0 having a logic "high" level outputted from the MAC command generator (270 of FIG. 3). The second data DA2 may be transmitted from the second memory bank BK1 (212 of FIG. 2) to the second input latch 221-2 of the data input circuit 221 through the GIO line 290, in response to the second MAC read signal MAC_RD_BK1 having a logic "high" level outputted from the MAC command generator 270. The first input latch 221-1 may output the first data DA1 to the MAC circuit 222 in synchronization with the first MAC input latch signal MAC_1 having a logic "high" level outputted from the MAC command generator 270 (270 of FIG. 3). The second input latch 221-2 may output the second data DA2 to the MAC circuit 222 in synchronization with the second MAC input latch signal MAC_L2 having a logic "high" level outputted from the MAC command generator (270 of FIG. 3). As described with reference to FIG. 5, the second MAC input latch signal MAC_L2 may be generated at a moment (corresponding to the fifth point in time "T5" of FIG. 6) when a certain time elapses from a moment (corresponding to the fourth point in time "T4" of FIG. 6) when the first MAC input latch signal MAC_1 is generated. Thus, after the first data DA1 is inputted to the MAC circuit 222, the second data DA2 may then be inputted to the MAC circuit 222.

The MAC circuit 222 may perform a multiplying calculation and an accumulative adding calculation for the first and second data DA1 and DA2. The multiplication logic circuit 222-1 of the MAC circuit 222 may include a plurality of multipliers 222-11. Each of the plurality of multipliers 222-11 may perform a multiplying calculation of the first data DA1 outputted from the first input latch 221-1 and the second data DA2 outputted from the second input latch 221-2 and may output the result of the multiplying calculation. Bit values constituting the first data DA1 may be separately inputted to the multipliers 222-11. Similarly, bit values constituting the second data DA2 may also be separately inputted to the multipliers 222-11. For example, if each of the first and second data DA1 and DA2 is comprised of an 'N'-bit binary stream and the number of the multipliers 222-11 is 'M', the first data DA1 having 'N/M' bits and the second data DA2 having 'N/M' bits may be inputted to each of the multipliers 222-11. That is, each of the multipliers 222-11 may be configured to perform a multiplying calculation of first 'N/M'-bit data and second 'N/M'-bit data. Multiplication result data outputted from each of the multipliers 222-11 may have '2N/M' bits.

The addition logic circuit 222-2 of the MAC circuit 222 may include a plurality of adders 222-21. Although not shown in the drawings, the plurality of adders 222-21 may be disposed to provide a tree structure including a plurality of stages. Each of the adders 222-21 disposed at a first stage may receive two sets of multiplication result data from two of the multipliers 222-11 included in the multiplication logic circuit 222-1 and may perform an adding calculation of the two sets of multiplication result data to output addition result data. Each of the adders 222-21 disposed at a second stage may receive two sets of addition result data from two of the adders 222-21 disposed at the first stage and may perform an adding calculation of the two sets of addition result data to output addition result data. The adders 222-21 disposed at a last stage may receive two sets of addition result data from two adders 222-21 disposed at the previous stage and may perform an adding calculation of the two sets of addition result data to output the addition result data. The adders 222-21 constituting the addition logic circuit 222-2 may include an adder for performing an accumulative adding calculation of the addition result data outputted from the adder 222-21 disposed at the last stage and previous MAC result data stored in the output latch 223-1 of the data output circuit 223.

The data output circuit 223 may output MAC result data DA_MAC outputted from the MAC circuit 222 to the GIO line 290. Specifically, the output latch 223-1 of the data output circuit 223 may latch the MAC result data DA_MAC outputted from the MAC circuit 222 and may output the latched data of the MAC result data DA_MAC in synchronization with the MAC output latch signal MAC_L3 having a logic "high" level outputted from the MAC command generator (270 of FIG. 3). The MAC result data DA_MAC outputted from the output latch 223-1 may be fed back to the MAC circuit 222 for the accumulative adding calculation. In addition, the MAC result data DA_MAC may be inputted to the transfer gate 223-2, and the transfer gate 223-2 may output the MAC result data DA_MAC to the GIO line 290. The output latch 223-1 may be initialized if a latch reset signal LATCH_RST is inputted to the output latch 223-1. In such a case, all of data latched by the output latch 223-1 may be removed. In an embodiment, the latch reset signal LATCH_RST may be activated by generation of the MAC result latch signal MAC_L_RST having a logic "high" level and may be inputted to the output latch 223-1.

The MAC result latch signal MAC_L_RST outputted from the MAC command generator 270 may be inputted to the transfer gate 223-2, the delay circuit 223-3, and the inverter 223-4. The inverter 223-4 may inversely buffer the MAC result latch signal MAC_L_RST to output the inversely buffered signal of the MAC result latch signal MAC_L_RST to the transfer gate 223-2. The transfer gate 223-2 may transfer the MAC result data DA_MAC from the output latch 223-1 to the GIO line 290 in response to the MAC result latch signal MAC_L_RST having a logic "high" level. The delay circuit 223-3 may delay the MAC result latch signal MAC_L_RST by a certain time to generate and output a latch control signal PINSTB.

FIGS. 8 to 14 are block diagrams illustrating operations of the PIM device 200 illustrated in FIG. 3. In FIGS. 8 to 14, the same reference numerals or the same reference symbols as used in FIG. 3 denote the same elements. First, referring to FIG. 8, if the external command E_CMD requesting the MAC arithmetic operation and the input address I_ADDR are transmitted from an external device to the receiving driver 230, the receiving driver 230 may output the external command E_CMD and the input address I_ADDR to the command decoder 250 and the address latch 260, respectively. The command decoder 250 may decode the external command E_CMD to generate and transmit the memory active signal ACT_M to the MAC command generator 270. The address latch 260 receiving the input address I_ADDR may generate and transmit the bank selection signal BK_S to the MAC command generator 270. The MAC command generator 270 may generate and output the MAC active signal RACTV in response to the memory active signal ACT_M and the bank selection signal BK_S. The MAC active signal RACTV may be transmitted to the first memory bank (BK0) 211 and the second memory bank (BK1) 212. The first memory bank (BK0) 211 and the second memory bank (BK1) 212 may be activated by the MAC active signal RACTV.

Figure 9:
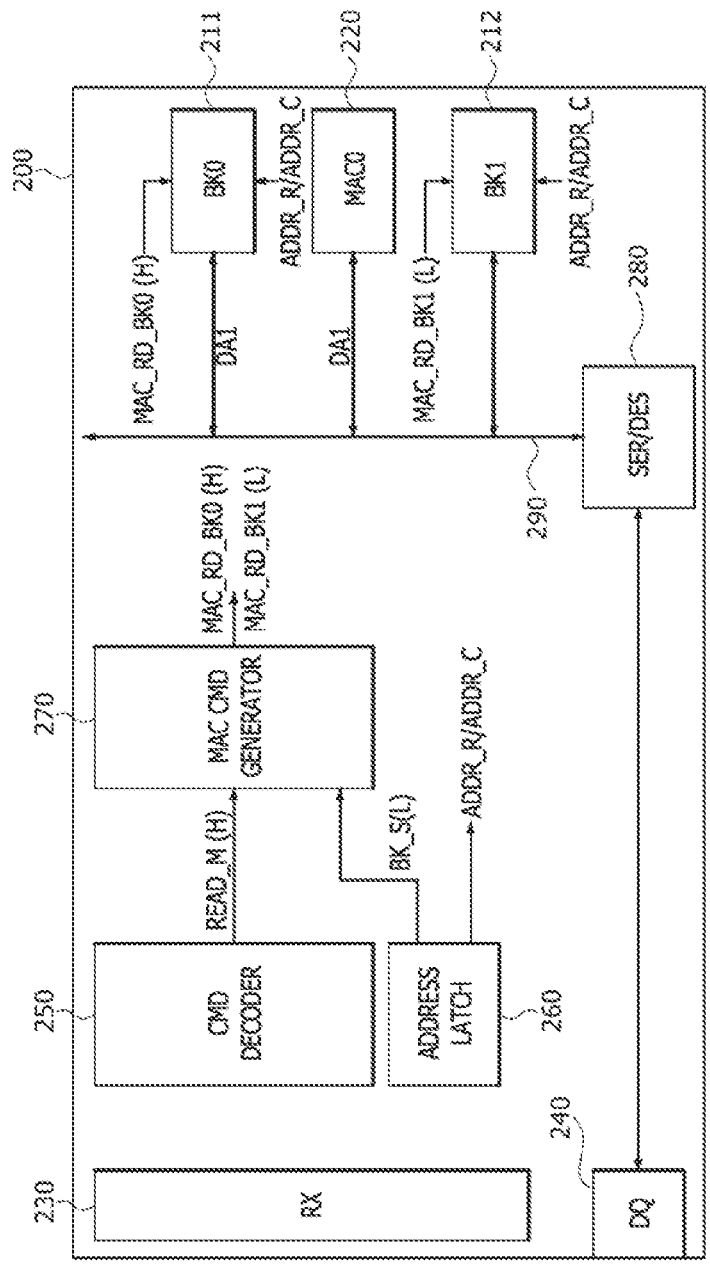

Next, referring to FIG. 9, the command decoder 250 may generate and output the memory read signal READ_M having a logic "high(H)" level to the MAC command generator 270. In addition, the address latch 260 may generate and output the bank selection signal BK_S having a logic "low(L)" level to the MAC command generator 270.

In response to the memory read signal READ_M having a logic "high(H)" level and the bank selection signal BK_S having a logic "low(L)" level, the MAC command generator 270 may generate and output the first MAC read signal MAC_RD_BK0 having a logic "high(H)" level and the second MAC read signal MAC_RD_BK1 having a logic "low(L)" level, as described with reference to FIG. 4. The first MAC read signal MAC_RD_BK0 having a logic "high (H)" level, together with the row/column address ADDR_R/ADDR_C, may be transmitted to the first memory bank (BK0) 211. The second MAC read signal MAC_RD_BK1 having a logic "low(L)" level, together with the row/column address ADDR_R/ADDR_C, may be transmitted to the second memory bank (BK1) 212. The first data DA1 may be read out of the first memory bank (BK0) 211 by the first MAC read signal MAC_RD_BK0 having a logic "high(H)" level and may be transmitted to the first MAC operator (MAC0) 220 through the GIO line 290.

Figure 10:
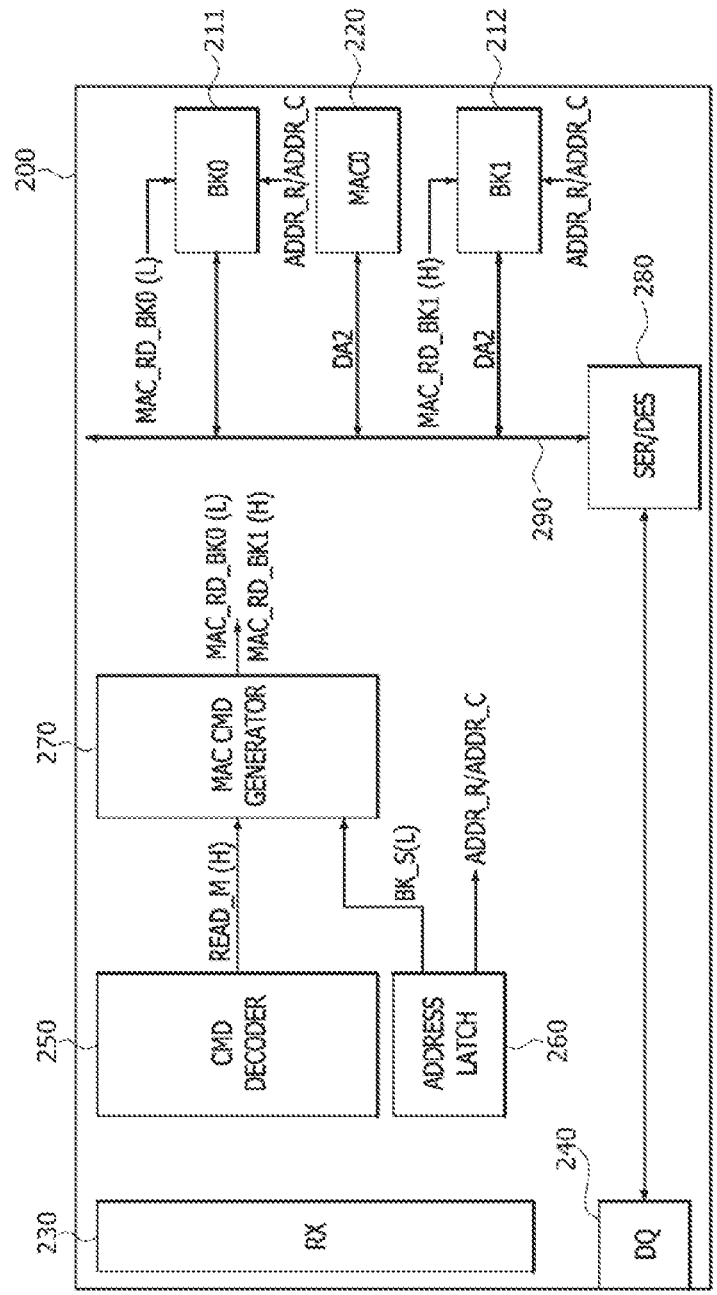

Next, referring to FIG. 10, a logic level of the bank selection signal BK_S may change from a logic "low(L)" level into a logic "high(H)" level while the memory read signal READ_M maintains a logic "high(H)" level. In such a case, as described with reference to FIG. 5, the MAC command generator 270 may generate and output the first MAC read signal MAC_RD_BK0 having a logic "low(L)" level and the second MAC read signal MAC_RD_BK1 having a logic "high(H)" level. The first MAC read signal MAC_RD_BK0 having a logic "low(L)" level, together with the row/column address ADDR_R/ADDR_C, may be transmitted to the first memory bank (BK0) 211. The second MAC read signal MAC_RD_BK1 having a logic "high(H)" level, together with the row/column address ADDR_R/ADDR_C, may be transmitted to the second memory bank (BK1) 212. The second data DA2 may be read out of the second memory bank (BK1) 212 by the second MAC read signal MAC_RD_BK1 having a logic "high(H)" level and may be transmitted to the first MAC operator (MAC0) 220 through the GIO line 290.

Figure 11:
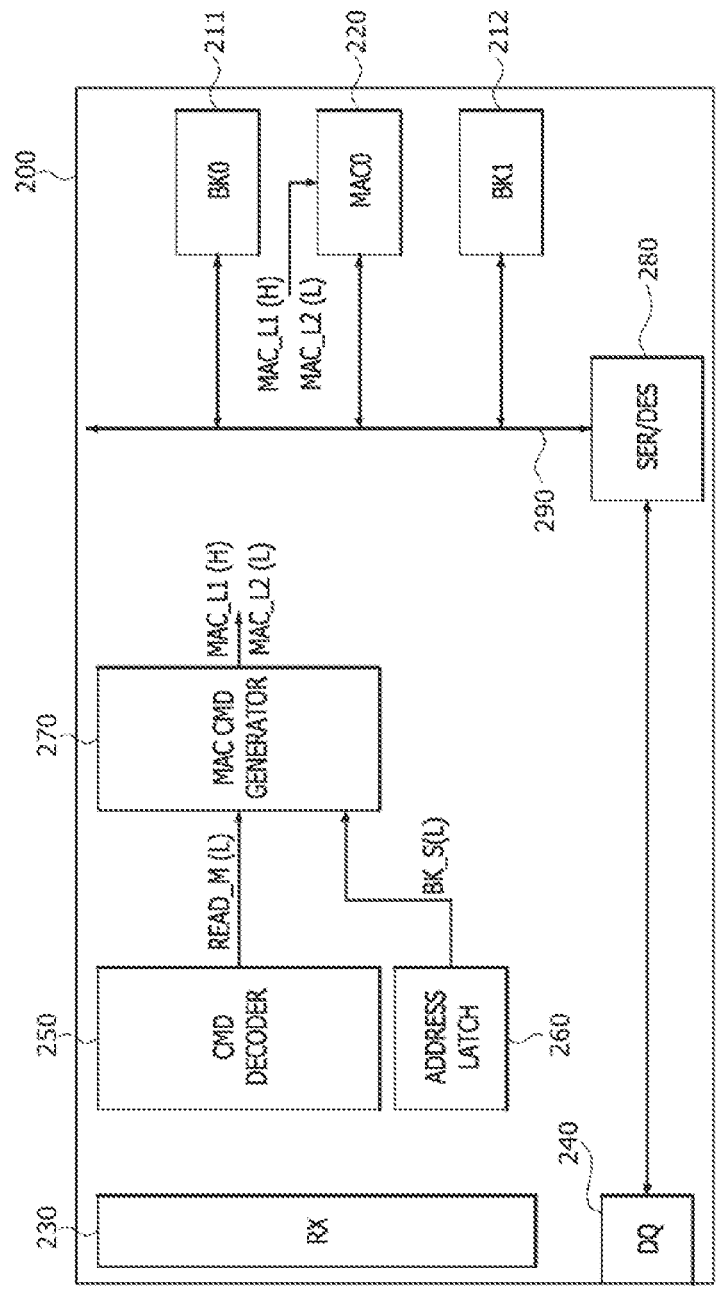

Next, referring to FIG. 11, a logic level of the memory read signal READ_M transmitted from the command decoder 250 to the MAC command generator 270 may change from a logic "high(H)" level into a logic "low(L)" level. In addition, a logic level of the bank selection signal BK_S transmitted from the address latch 260 to the MAC command generator 270 may change from a logic "high(H)" level into a logic "low(L)" level. In such a case, the MAC command generator 270 may generate and output the first MAC input latch signal MAC_L1 having a logic "high(H)" level and the second MAC input latch signal MAC_L2 having a logic "low(L)" level. A point in time when the first MAC input latch signal MAC_L1 having a logic "high(H)" level and the second MAC input latch signal MAC_L2 having a logic "low(L)" level are outputted from the MAC command generator 270 may be determined by a delay time of the delay circuit (271 of FIG. 4), as described with reference to FIG. 5. The first MAC input latch signal MAC_L1 having a logic "high(H)" level and the second MAC input latch signal MAC_L2 having a logic "low(L)" level outputted from the MAC command generator 270 may be transmitted to the first MAC operator (MAC0) 220. As described with reference to FIG. 7, the first MAC operator (MAC0) 220 may perform a latch operation of the first data DA1.

Figure 12:
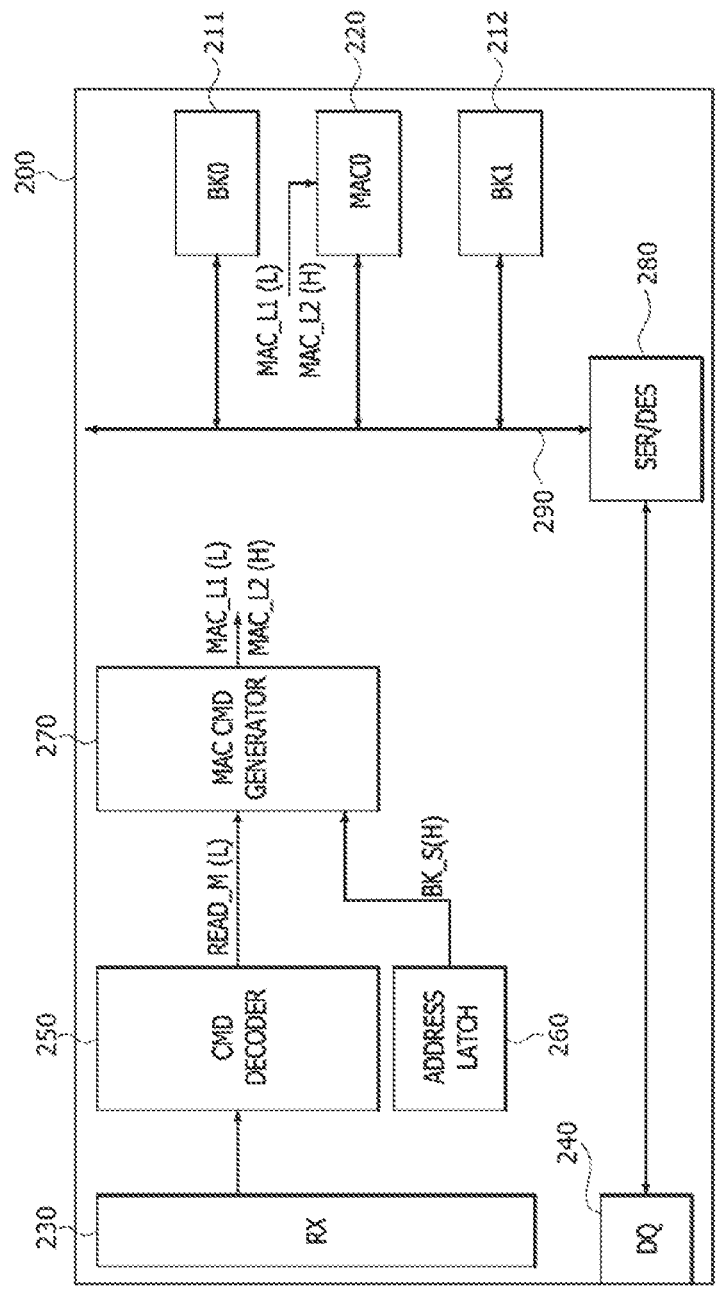

Next, referring to FIG. 12, a logic level of the bank selection signal BK_S transmitted from the address latch 260 to the MAC command generator 270 may change from a logic "low(L)" level into a logic "high(H)" level while the memory read signal READ_M maintains a logic "low(L)" level. In such a case, the MAC command generator 270 may generate and output the first MAC input latch signal MAC_1 having a logic "low(L)" level and the second MAC input latch signal MAC_L2 having a logic "high(H)" level. A point in time when the first MAC input latch signal MAC_1 having a logic "low(L)" level and the second MAC input latch signal MAC_L2 having a logic "high(H)" level are outputted from the MAC command generator 270 may be determined by a delay time of the delay circuit (271 of FIG. 5), as described with reference to FIG. 5. The first MAC input latch signal MAC_1 having a logic "low(L)" level and the second MAC input latch signal MAC_L2 having a logic "high(H)" level outputted from the MAC command generator 270 may be transmitted to the first MAC operator (MAC0) 220. As described with reference to FIG. 7, the first MAC operator (MAC0) 220 may perform a latch operation of the second data DA2. After the latch operations of the first and second data DA1 and DA2 terminate, the first MAC operator (MAC0) 220 may perform the MAC arithmetic operation and may generate the MAC result data DA_MAC. The MAC result data DA_MAC generated by the first MAC operator (MAC0) 220 may be inputted to the output latch 223-1 included in the first MAC operator (MAC0) 220.

Figure 13:
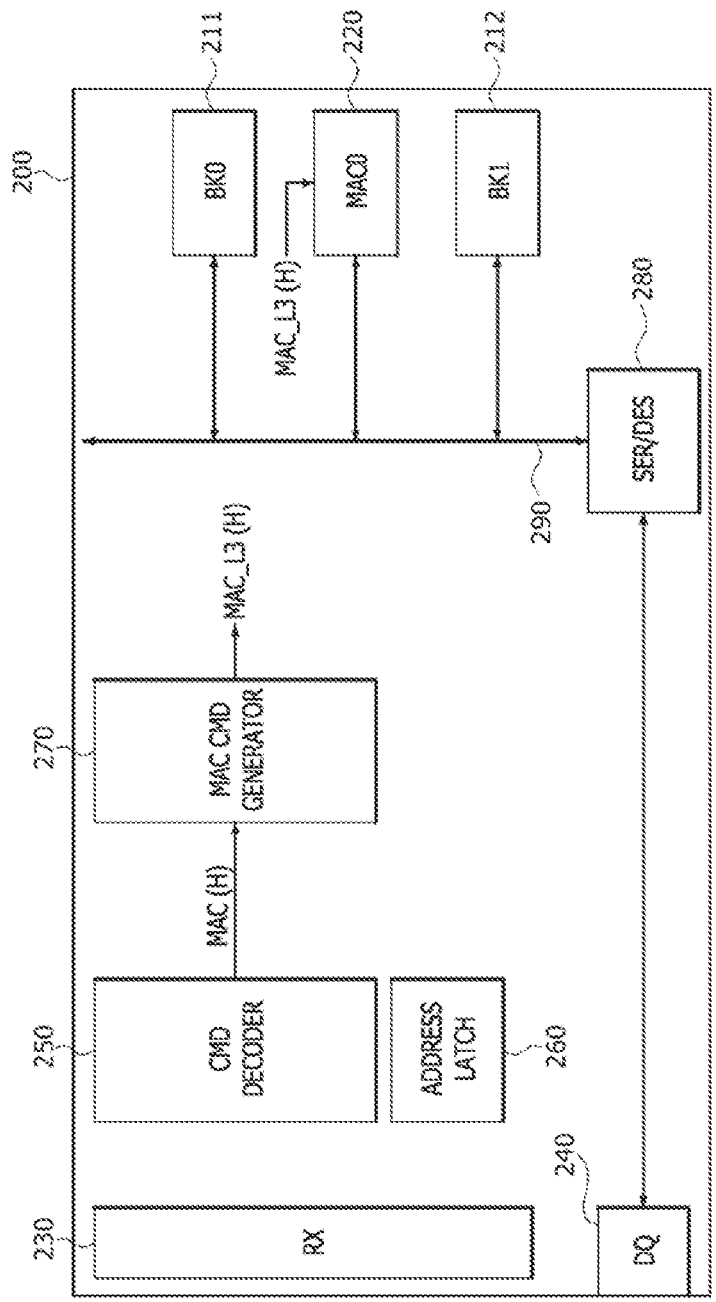

Next, referring to FIG. 13, the command decoder 250 may output and transmit the MAC arithmetic signal MAC having a logic "high(H)" level to the MAC command generator 270. The MAC command generator 270 may generate and output the MAC output latch signal MAC_L3 having a logic "high" level in response to the MAC arithmetic signal MAC having a logic "high(H)" level. The MAC output latch signal MAC_L3 having a logic "high" level may be transmitted to the first MAC operator (MAC0) 220. As described with reference to FIG. 7, the output latch (223-1 of FIG. 7) of the first MAC operator (MAC0) 220 may be synchronized with the MAC output latch signal MAC_L3 having a logic "high" level to transfer the MAC result data DA_MAC outputted from the MAC circuit 222 of the first MAC operator (MAC0) 220 to the transfer gate (233-2 of FIG. 7) of the first MAC operator (MAC0) 220. The MAC result data DA_MAC outputted from the output latch (223-1 of FIG. 7) may be fed back to the addition logic circuit (222-2 of FIG. 7) for the accumulative adding calculation.

Figure 14:
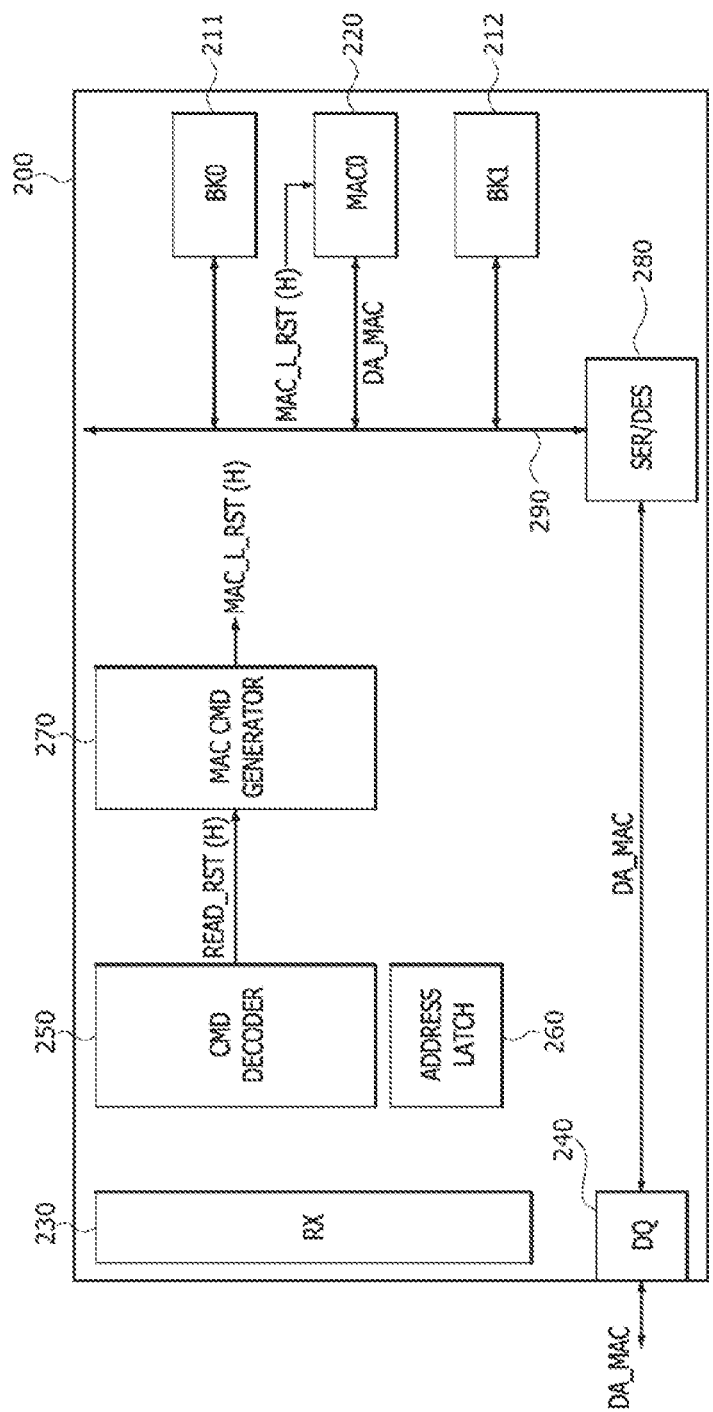

Next, referring to FIG. 14, the command decoder 250 may output and transmit the result read signal READ_RST having a logic "high(H)" level to the MAC command generator 270. The MAC command generator 270 may generate and output the MAC result latch signal MAC_L_RST having a logic "high" level in response to the result read signal READ_RST having a logic "high(H)" level. The MAC result latch signal MAC_L_RST having a logic "high" level may be transmitted to the first MAC operator (MAC0) 220. As described with reference to FIG. 7, the first MAC operator (MAC0) 220 may output the MAC result data DA_MAC to the GIO line 290 in response to the MAC result latch signal MAC_L_RST having a logic "high" level and may also reset the output latch (223-1 of FIG. 6) included in the first MAC operator (MAC0) 220 in response to the MAC result latch signal MAC_L_RST having a logic "high" level. The MAC result data DA_MAC transmitted to the GIO line 290 may be outputted to an external device through the serializer/deserializer 280 and the data I/O circuit 240.

Figure 15:
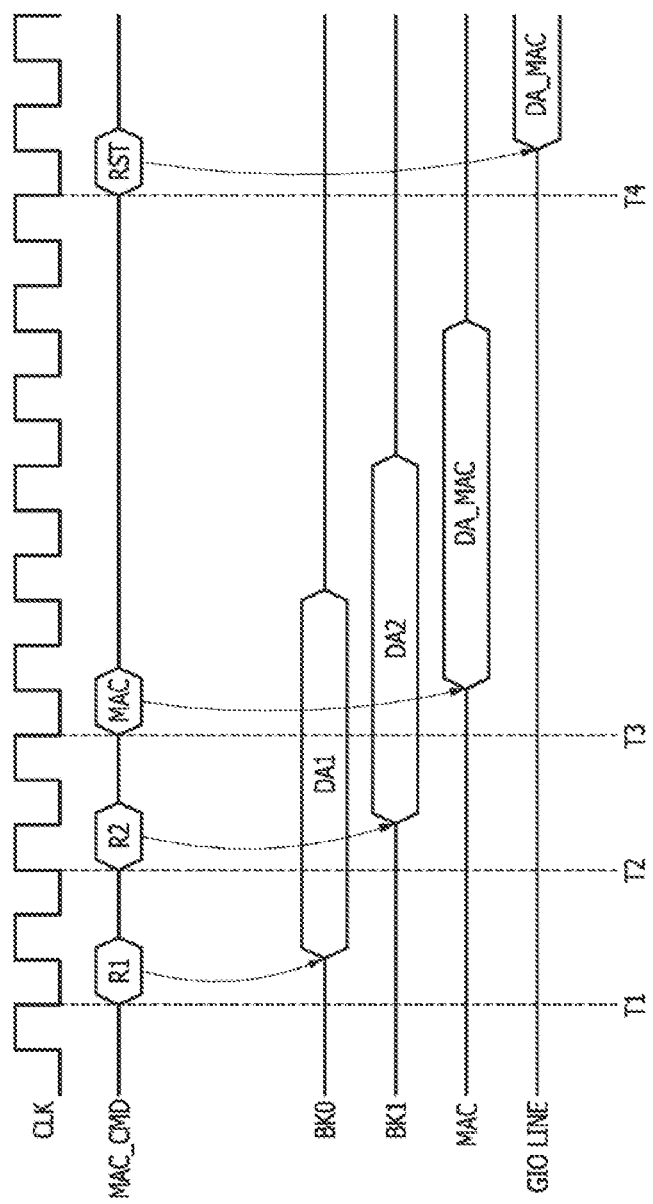
FIG. 15 is a timing diagram illustrating an operation of the PIM device illustrated in FIG. 3.

FIG. 15 is a timing diagram illustrating an operation of the PIM device 200 illustrate in FIG. 3. Referring to FIG. 15, at a first point in time "T1", the MAC command generator 270 may be synchronized with a falling edge of a clock signal CLK to generate and output the first MAC read signal MAC_RD_BK0 (R1) having a logic "high(H)" level. The first memory bank (BK0) 211 may be selected by the first MAC read signal MAC_RD_BK0 (R1) having a logic "high(H)" level so that the first data DA1 are read out of the first memory bank (BK0) 211. At a second point in time "T2", the MAC command generator 270 may be synchronized with a falling edge of the clock signal CLK to generate and output the second MAC read signal MAC_RD_BK1 (R2) having a logic "high(H)" level. The second memory bank (BK1) 212 may be selected by the second MAC read signal MAC_RD_BK1 (R2) having a logic "high(H)" level so that the second data DA2 are read out of the second memory bank (BK1) 212. At a third point in time "T3", the MAC command generator 270 may be synchronized with a falling edge of the clock signal CLK to generate and output the MAC arithmetic signal MAC having a logic "high(H)" level. The first MAC operator (MAC0) 220 may perform the multiplying calculations and the adding calculations of the first and second data DA1 and DA2 to generate the MAC result data DA_MAC, in response to the MAC arithmetic signal MAC having a logic "high(H)" level. At a fourth point in time "T4", the MAC command generator 270 may be synchronized with a falling edge of the clock signal CLK to generate and output the MAC result latch signal MAC_L_RST (RST) having a logic "high" level. The MAC result data DA_MAC generated by the first MAC operator (MAC0) 220 may be transmitted to the GIO line 290 by the MAC result latch signal MAC_L_RST (RST) having a logic "high" level.

Figure 16:
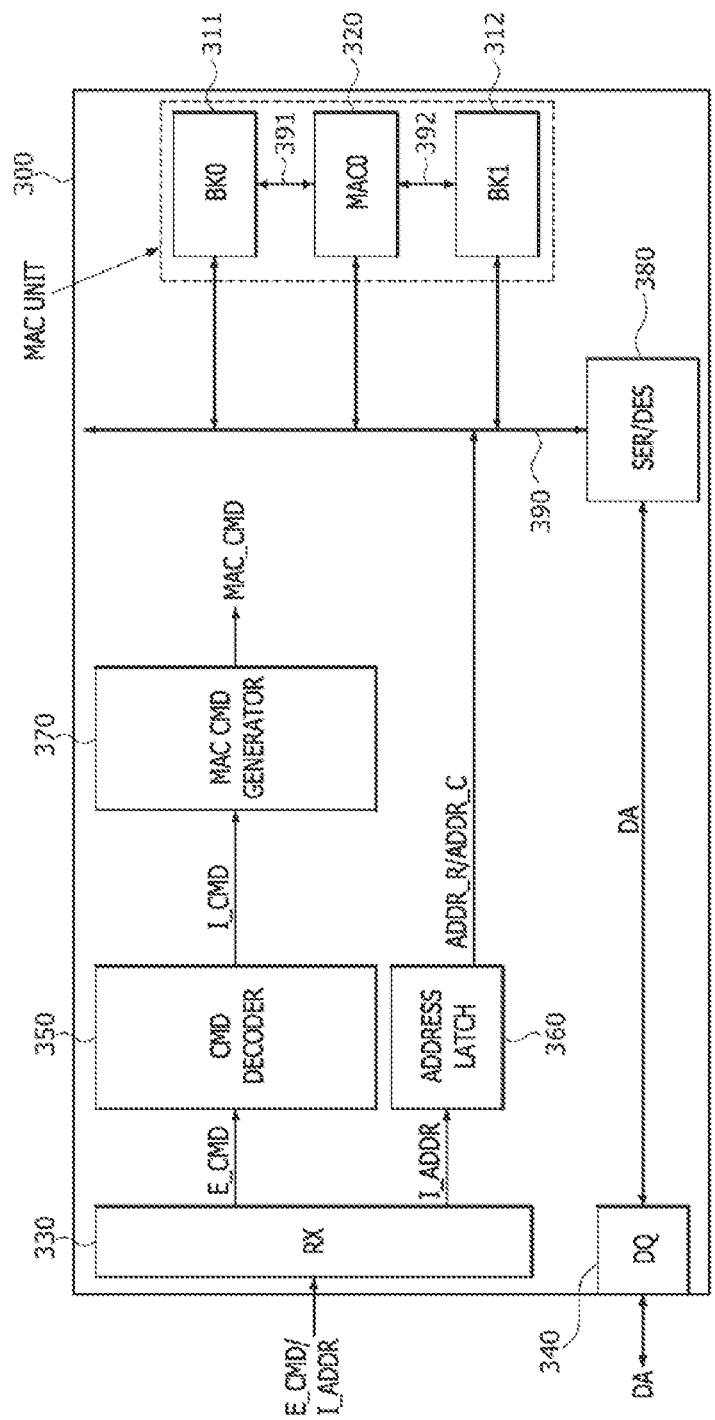
FIG. 16 is a block diagram illustrating another configuration of a PIM device according to the first embodiment of the present disclosure.
Figure 17:
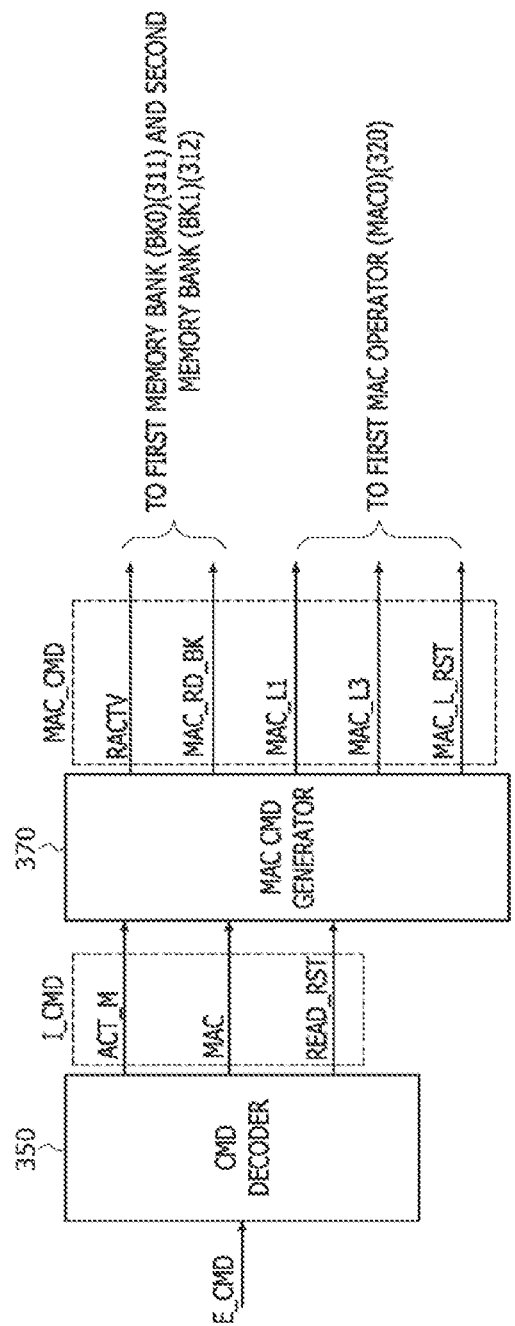
FIG. 17 illustrates internal command signals outputted from a command decoder and MAC command signals outputted from a MAC command generator in the PIM device of FIG. 16.

FIG. 16 is a block diagram illustrating another configuration of a PIM device 300 according to an embodiment of the present disclosure, and FIG. 17 illustrates an internal command signal I_CMD outputted from a command decoder 350 of the PIM device 300 and a MAC command signal MAC_CMD outputted from a MAC command generator 370 of the PIM device 300. FIG. 16 illustrates only a first memory bank (BK0) 311, a second memory bank (BK1) 312, and a first MAC operator (MAC0) 320 constituting a first MAC unit among the plurality of MAC units. However, FIG. 16 illustrates merely an example for simplification of the drawing. Accordingly, the following description for the first MAC unit may be equally applicable to the remaining MAC units.

Referring to FIG. 16, the PIM device 300 may be configured to include the first memory bank (BK0) 311, the second memory bank (BK1) 312, and the first MAC operator (MAC0) 320. The PIM device 300 according to the present embodiment may include a GIO line 390, a first bank input/output (BIO) line 391, and a second BIO line 392 acting as data transmission lines. Data communication of the first memory bank (BK0) 311, the second memory bank (BK1) 312, and the first MAC operator (MAC0) 320 may be achieved through the GIO line 390. Only the data transmission between the first memory bank (BK0) 311 and the first MAC operator (MAC0) 320 may be achieved through the first BIO line 391, and only the data transmission between the second memory bank (BK1) 312 and the first MAC operator (MAC0) 320 may be achieved through the second BIO line 392. Thus, the first MAC operator (MAC0) 320 may directly receive first data and second data from the first and second memory banks (BK0 and BK1) 311 and 312 through the first BIO line 391 and the second BIO line 392 without using the GIO line 390.

The PIM device 300 may further include a receiving driver (RX) 330, a data I/O circuit (DQ) 340, the command decoder 350, an address latch 360, the MAC command generator 370, and a serializer/deserializer (SER/DES) 380. The command decoder 350, the address latch 360, the MAC command generator 370, and the serializer/deserializer 380 may be disposed in the peripheral circuit PERI of the PIM device 100 illustrated in FIG. 2. The receiving driver 330 may receive an external command E_CMD and an input address I_ADDR from an external device. The external device may denote a host or a controller coupled to the PIM device 300. Hereinafter, it may be assumed that the external command E_CMD transmitted to the PIM device 300 is a command requesting the MAC arithmetic operation. That is, the PIM device 300 may perform the deterministic MAC arithmetic operation in response to the external command E_CMD. The data I/O circuit 340 may include a data I/O pad. The data I/O pad may be coupled with an data I/O line. The PIM device 300 communicates with the external device through the data I/O circuit 340.

The receiving driver 330 may separately output the external command E_CMD and the input address I_ADDR received from the external device. Data DA inputted to the PIM device 300 through the data I/O circuit 340 may be processed by the serializer/deserializer 380 and may be transmitted to the first memory bank (BK0) 311 and the second memory bank (BK1) 312 through the GIO line 390 of the PIM device 300. The data DA outputted from the first memory bank (BK0) 311, the second memory bank (BK1) 312, and the first MAC operator (MAC0) 320 through the GIO line 390 may be processed by the serializer/deserializer 380 and may be outputted to the external device through the data I/O circuit 340. The serializer/deserializer 380 may convert the data DA into parallel data if the data DA are serial data or may convert the data DA into serial data if the data DA are parallel data. For the data conversion, the serializer/deserializer 380 may include a serializer for converting parallel data into serial data and a deserializer for converting serial data into parallel data.

The command decoder 350 may decode the external command E_CMD outputted from the receiving driver 330 to generate and output the internal command signal I_CMD. As illustrated in FIG. 17, the internal command signal I_CMD outputted from the command decoder 350 may include first to third internal command signals. In an embodiment, the first internal command signal may be a memory active signal ACT_M, the second internal command signal may be a MAC arithmetic signal MAC, and the third internal command signal may be a result read signal READ_RST. The first to third internal command signals outputted from the command decoder 350 may be sequentially inputted to the MAC command generator 370.

In order to perform the deterministic MAC arithmetic operation of the PIM device 300, the memory active signal ACT_M, the MAC arithmetic signal MAC, and the result read signal READ_RST outputted from the command decoder 350 may be sequentially generated at predetermined points in time (or clocks). In an embodiment, the memory active signal ACT_M, the MAC arithmetic signal MAC, and the result read signal READ_RST may have predetermined latencies, respectively. For example, the MAC arithmetic signal MAC may be generated after a first latency elapses from a point in time when the memory active signal ACT_M is generated, and the result read signal READ_RST may be generated after a third latency elapses from a point in time when the MAC arithmetic signal MAC is generated. No signal is generated by the command decoder 350 until a fourth latency elapses from a point in time when the result read signal READ_RST is generated. The first to fourth latencies may be predetermined and fixed. Thus, the host or the controller outputting the external command E_CMD may predict the points in time when the first to third internal command signals constituting the internal command signal I_CMD are generated by the command decoder 350 in advance at a point in time when the external command E_CMD is outputted from the host or the controller. That is, the host or the controller may predict a point in time (or a clock) when the MAC arithmetic operation terminates in the PIM device 300 after the external command E_CMD requesting the MAC arithmetic operation is transmitted from the host or the controller to the PIM device 300, even without receiving any signals from the PIM device 300.

The address latch 360 may convert the input address I_ADDR outputted from the receiving driver 330 into a row/column address ADDR_R/ADDR_C to output the row/column address ADDR_R/ADDR_C. The row/column address ADDR_R/ADDR_C outputted from the address latch 360 may be transmitted to the first and second memory banks 311 and 312. According to the present embodiment, the first data and the second data to be used for the MAC arithmetic operation may be simultaneously read out of the first and second memory banks (BK0 and BK1) 311 and 312, respectively. Thus, it may be unnecessary to generate a bank selection signal for selecting any one of the first and second memory banks 311 and 312. In an embodiment, a point in time when the row/column address ADDR_R/ADDR_C is inputted to the first and second memory banks 311 and 312 may be a point in time when a MAC command (i.e., the MAC arithmetic signal MAC) requesting a data read operation for the first and second memory banks 311 and 312 for the MAC arithmetic operation is generated.

The MAC command generator 370 may output the MAC command signal MAC_CMD in response to the internal command signal I_CMD outputted from the command decoder 350. As illustrated in FIG. 16, the MAC command signal MAC_CMD outputted from the MAC command generator 370 may include first to fifth MAC command signals. In an embodiment, the first MAC command signal may be a MAC active signal RACTV, the second MAC command signal may be a MAC read signal MAC_RD_BK, the third MAC command signal may be a MAC input latch signal MAC_L1, the fourth MAC command signal may be a MAC output latch signal MAC_L3, and the fifth MAC command signal may be a MAC result latch signal MAC_L_RST.

The MAC active signal RACTV may be generated based on the memory active signal ACT_M outputted from the command decoder 350. The MAC read signal MAC_RD_BK, the MAC input latch signal MAC_L1, the MAC output latch signal MAC_L3, and the MAC result latch signal MAC_L_RST may be sequentially generated based on the MAC arithmetic signal MAC outputted from the command decoder 350. That is, the MAC input latch signal MAC_L1 may be generated at a point in time when a certain time elapses from a point in time when the MAC read signal MAC_RD_BK is generated. The MAC output latch signal MAC_L3 may be generated at a point in time when a certain time elapses from a point in time when the MAC input latch signal MAC_L1 is generated. Finally, the MAC result latch signal MAC_L_RST may be generated based on the result read signal READ_RST outputted from the command decoder 350.

The MAC active signal RACTV outputted from the MAC command generator 370 may control an activation operation for the first and second memory banks 311 and 312. The MAC read signal MAC_RD_BK outputted from the MAC command generator 370 may control a data read operation for the first and second memory banks 311 and 312. The MAC input latch signal MAC_L1 outputted from the MAC command generator 370 may control an input data latch operation of the first MAC operator (MAC0) 320. The MAC output latch signal MAC_L3 outputted from the MAC command generator 370 may control an output data latch operation of the first MAC operator (MAC0) 320. The MAC result latch signal MAC_L_RST outputted from the MAC command generator 370 may control an output operation of MAC result data of the first MAC operator (MAC0) 320 and a reset operation of the first MAC operator (MAC0) 320.

As described above, in order to perform the deterministic MAC arithmetic operation of the PIM device 300, the memory active signal ACT_M, the MAC arithmetic signal MAC, and the result read signal READ_RST outputted from the command decoder 350 may be sequentially generated at predetermined points in time (or clocks), respectively. Thus, the MAC active signal RACTV, the MAC read signal MAC_RD_BK, the MAC input latch signal MAC_L1, the MAC output latch signal MAC_L3, and the MAC result latch signal MAC_L_RST may also be generated and outputted from the MAC command generator 370 at predetermined points in time after the external command E_CMD is inputted to the PIM device 300, respectively. That is, a time period from a point in time when the first and second memory banks 311 and 312 are activated by the MAC active signal RACTV until a point in time when the first MAC operator (MAC0) 320 is reset by the MAC result latch signal MAC_L_RST may be predetermined.

Figure 18:
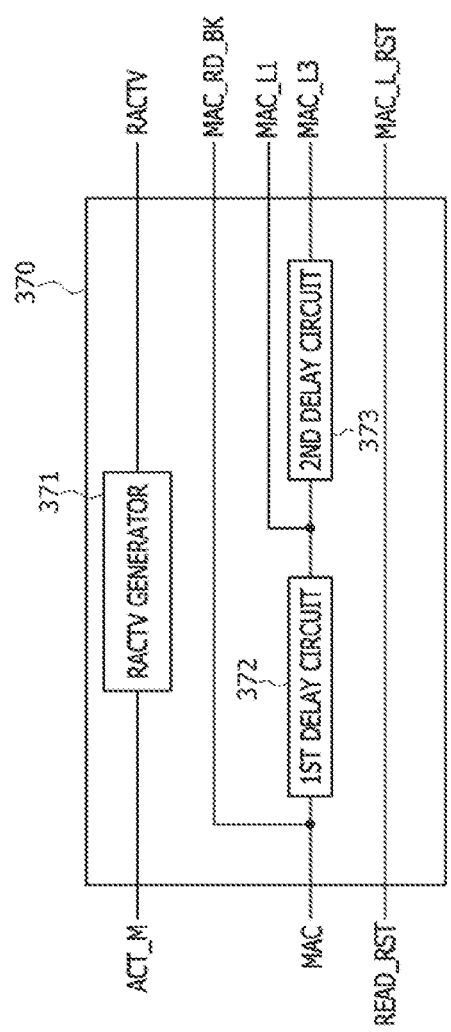
FIG. 18 illustrates an example of a configuration of a MAC command generator included in the PIM device of FIG. 16.

FIG. 18 illustrates an example of a configuration of the MAC command generator 370 included in the PIM device 300 illustrated in FIG. 16. Referring to FIG. 18, the MAC command generator 370 may sequentially receive the memory active signal ACT_M, the MAC arithmetic signal MAC, and the result read signal READ_RST from the command decoder 350. In addition, the MAC command generator 370 may sequentially generate and output the MAC active signal RACTV, the MAC read signal MAC_RD_BK, the MAC input latch signal MAC_L1, the MAC output latch signal MAC_L3, and the MAC result latch signal MAC_L_RST. The MAC active signal RACTV, the MAC read signal MAC_RD_BK, the MAC input latch signal MAC_L1, the MAC output latch signal MAC_L3, and the MAC result latch signal MAC_L_RST may be outputted in series with certain time intervals.

In an embodiment, the MAC command generator 370 may be configured to include an active signal generator 371, a first delay circuit 372, and a second delay circuit 373. The active signal generator 371 may receive the memory active signal ACT_M to generate and output the MAC active signal RACTV. The MAC active signal RACTV outputted from the active signal generator 371 may be transmitted to the first and second memory banks 311 and 312 to activate the first and second memory banks 311 and 312. The MAC command generator 370 may receive the MAC arithmetic signal MAC outputted from the command decoder 350 to output the MAC arithmetic signal MAC as the MAC read signal MAC_RD_BK. The first delay circuit 372 may receive the MAC arithmetic signal MAC and may delay the MAC arithmetic signal MAC by a first delay time DELAY_T1 to generate and output the MAC input latch signal MAC_L1. The second delay circuit 373 may receive an output signal of the first delay circuit 372 and may delay the output signal of the first delay circuit 372 by a second delay time DELAY_T2 to generate and output the MAC output latch signal MAC_L3. The MAC command generator 370 may generate the MAC result latch signal MAC_L_RST in response to the result read signal READ_RST outputted from the command decoder 350.

The MAC command generator 370 may generate and output the MAC active signal RACTV in response to the memory active signal ACT_M outputted from the command decoder 350. Subsequently, the MAC command generator 370 may generate and output the MAC read signal MAC_RD_BK in response to the MAC arithmetic signal MAC outputted from the command decoder 350. The MAC arithmetic signal MAC may be inputted to the first delay circuit 372. The MAC command generator 370 may delay the MAC arithmetic signal MAC by a certain time determined by the first delay circuit 372 to generate and output an output signal of the first delay circuit 372 as the MAC input latch signal MAC_L1. The output signal of the first delay circuit 372 may be inputted to the second delay circuit 373. The MAC command generator 370 may delay the MAC input latch signal MAC_L1 by a certain time determined by the second delay circuit 373 to generate and output an output signal of the second delay circuit 373 as the MAC output latch signal MAC_L3. Subsequently, the MAC command generator 370 may generate and output the MAC result latch signal MAC_L_RST in response to the result read signal READ_RST outputted from the command decoder 350.

Figure 19:
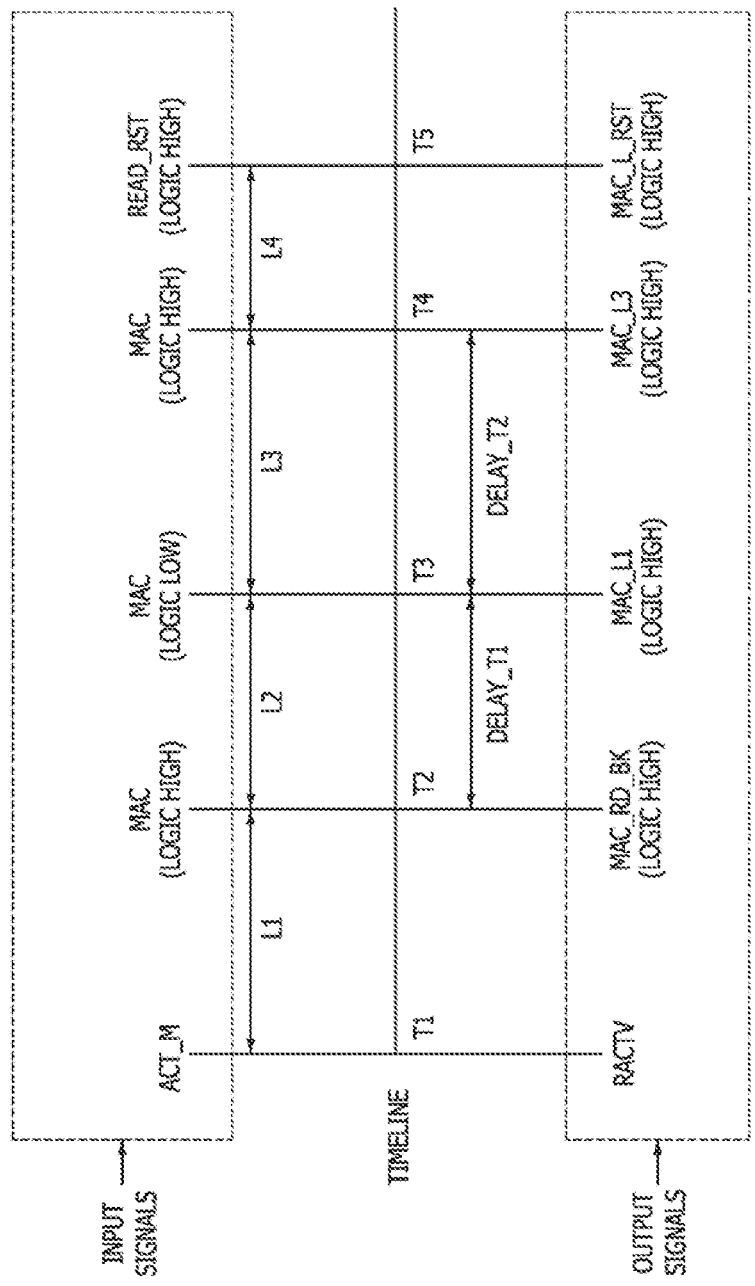
FIG. 19 illustrates input signals and output signals of the MAC command generator illustrated in FIG. 18 with a timeline.

FIG. 19 illustrates input signals and output signals of the MAC command generator 370 illustrated in FIG. 18 with a timeline. In FIG. 19, signals transmitted from the command decoder 350 to the MAC command generator 370 are illustrated in an upper dotted line box, and signals outputted from the MAC command generator 370 are illustrated in a lower dotted line box. Referring to FIGS. 18 and 19, at a first point in time "T1" of the timeline, the memory active signal ACT_M may be inputted to the MAC command generator 370 and the MAC command generator 370 may output the MAC active signal RACTV. At a second point in time "T2" when a certain time, for example, a first latency L1 elapses from the first point in time "T1", the MAC arithmetic signal MAC having a logic "high" level may be inputted to the MAC command generator 370. In response to the MAC arithmetic signal MAC having a logic "high" level, the MAC command generator 370 may output the MAC read signal MAC_RD_BK having a logic "high" level. At a third point in time "T3" when a certain time elapses from the second point in time "T2", a logic level of the MAC arithmetic signal MAC may change from a logic "high" level into a logic "low" level.

At the third point in time "T3" when the first delay time DELAY_T1 elapses from the second point in time "T2", the MAC command generator 370 may output the MAC input latch signal MAC_1 having a logic "high" level. The first delay time DELAY_T1 may correspond to a delay time determined by the first delay circuit 372 illustrated in FIG. 18. The first delay time DELAY_T1 may be set to be different according to a logic design scheme of the first delay circuit 372. In an embodiment, the first delay time DELAY_T1 may be set to be equal to or greater than a second latency L2. At a fourth point in time "T4" when a certain time elapses from the third point in time "T3", the MAC command generator 370 may output the MAC output latch signal MAC_L3 having a logic "high" level. The fourth point in time "T4" may be a moment when the second delay time DELAY_T2 elapses from the third point in time "T3". The second delay time DELAY_T2 may correspond to a delay time determined by the second delay circuit 373 illustrated in FIG. 18. The second delay time DELAY_T2 may be set to be different according to a logic design scheme of the second delay circuit 373. In an embodiment, the second delay time DELAY_T2 may be set to be equal to or greater than a third latency L3. At a fifth point in time "T5" when a certain time, for example, a fourth L4 elapses from the fourth point in time "T4", the result read signal READ_RST having a logic "high" level may be inputted to the MAC command generator 370. In response to the result read signal READ_RST having a logic "high" level, the MAC command generator 370 may output the MAC result latch signal MAC_L_RST having a logic "high" level, as described with reference to FIG. 18.

In order to perform the deterministic MAC arithmetic operation, moments when the internal command signals ACT_M, MAC, and READ_RST generated by the command decoder 350 are inputted to the MAC command generator 370 may be fixed and moments when the MAC command signals RACTV, MAC_RD_BK, MAC_L1, MAC_L3, and MAC_L_RST are outputted from the MAC command generator 370 in response to the internal command signals ACT_M, MAC, and READ_RST may also be fixed. Thus, all of the first latency L1 between the first point in time "T1" and the second point in time "T2", the second latency L2 between the second point in time "T2" and the third point in time "T3", the third latency L3 between the third point in time "T3" and the fourth point in time "T4", and the fourth latency L4 between the fourth point in time "T4" and the fifth point in time "T5" may have fixed values.

In an embodiment, the first latency L1 may be defined as a time it takes to activate both of the first and second memory banks based on the MAC active signal RACTV. The second latency L2 may be defined as a time it takes to read the first and second data out of the first and second memory banks (BK0 and BK1) 311 and 312 based on the MAC read signals MAC_RD_BK and to input the first and second data DA1 and DA2 into the first MAC operator (MAC0) 320. The third latency L3 may be defined as a time it takes to latch the first and second data DA1 and DA2 in the first MAC operator (MAC0) 320 based on the MAC input latch signals MAC_1 and it takes the first MAC operator (MAC0) 320 to perform the MAC arithmetic operation of the first and second data. The fourth latency L4 may be defined as a time it takes to latch the output data in the first MAC operator (MAC0) 320 based on the MAC output latch signal MAC_L3.

Figure 20:
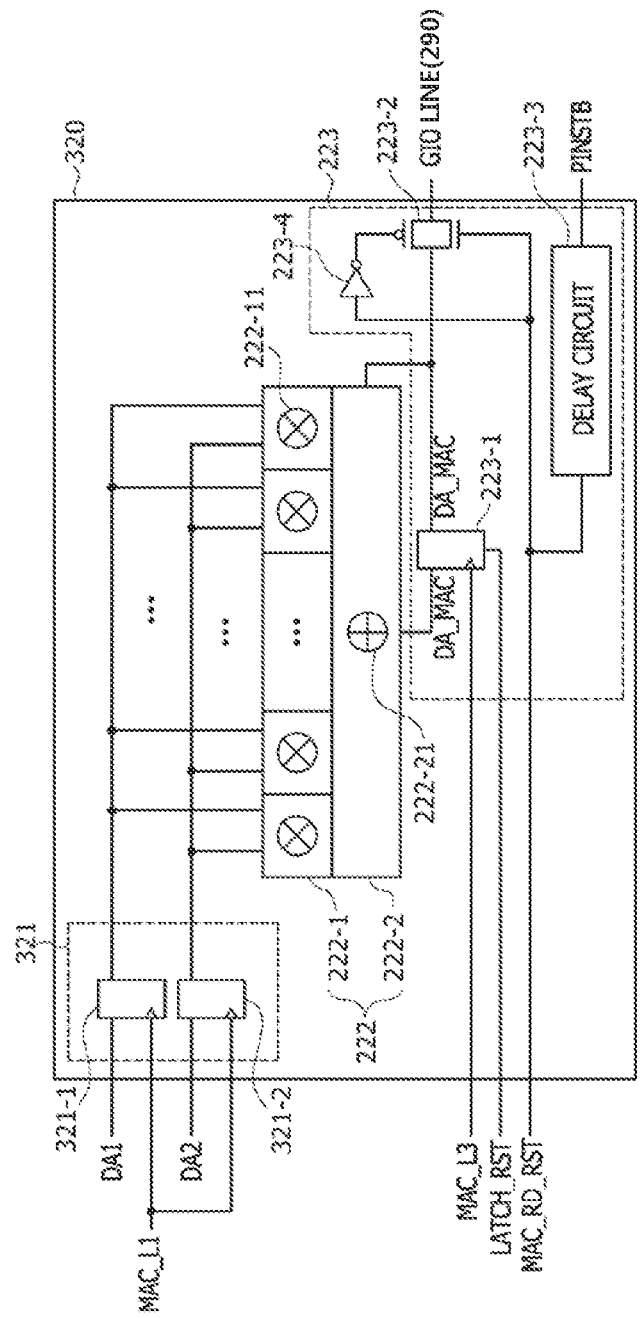
FIG. 20 illustrates an example of a configuration of a MAC operator included in the PIM device of FIG. 16.
Figure 21:
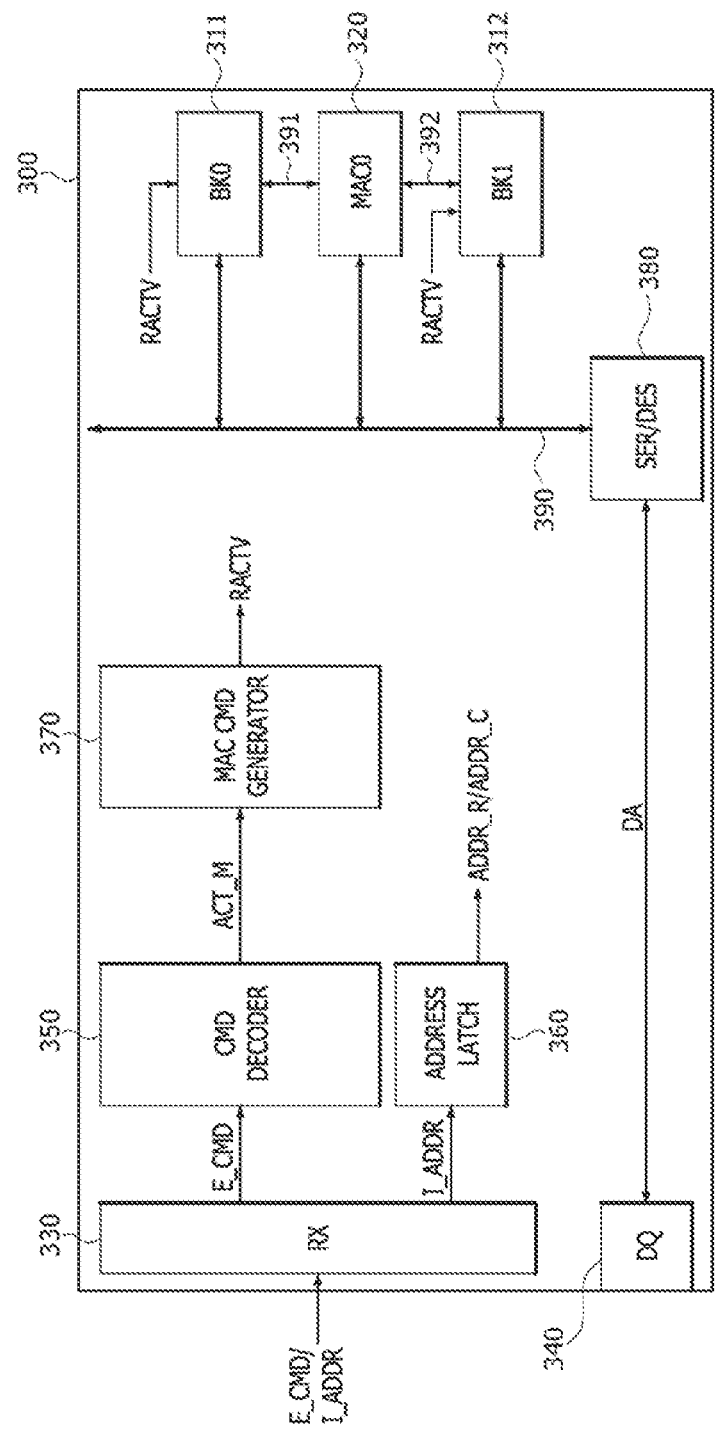
FIGS. 21 to 25 are block diagrams illustrating operations of the PIM device illustrated in FIG. 16.

FIG. 20 illustrates an example of a configuration of the first MAC operator (MAC0) 320 included in the PIM device 300 of FIG. 16. The first MAC operator (MAC0) 320 included in the PIM device 300 may have the same configuration as the first MAC operator (MAC0) 220 described with reference to FIG. 7 except for a signal applied to clock terminals of first and second input latches 321-1 and 321-2 constituting a data input circuit 321. Thus, in FIG. 20, the same reference numerals or the same reference symbols as used in FIG. 7 denote the same elements, and descriptions of the same elements as set forth with reference to FIG. 7 will be omitted hereinafter.

Describing in detail the differences between the first MAC operator (MAC0) 220 and the first MAC operator (MAC0) 320, in case of the first MAC operator (MAC0) 220 illustrated in FIG. 7, the first input latch (221-1 of FIG. 7) and the second input latch (221-2 of FIG. 7) of the data input circuit (221 of FIG. 7) may be synchronized with the first and second MAC input latch signals MAC_L1 and MAC_L2, respectively, sequentially generated with a certain time interval to output the first data DA1 and the second data DA2. In contrast, in case of the first MAC operator (MAC0) 320, the MAC input latch signal MAC_L1 may be inputted to both of the clock terminals of the first and second input latches 321-1 and 321-2 constituting a data input circuit 321. Thus, both of the first and second input latches 321-1 and 321-2 may be synchronized with the MAC input latch signal MAC_1 to output the first data DA1 and the second data DA2, respectively. Accordingly, the first MAC operator (MAC0) 320 may transmit the first and second data DA1 and DA2 to the MAC circuit 222 in parallel without any time interval between the first and second data DA1 and DA2. As a result, the MAC arithmetic operation of the MAC circuit 222 may be quickly performed without any delay of data input time.

FIGS. 21 to 25 are block diagrams illustrating operations of the PIM device 300 illustrated in FIG. 16. In FIGS. 21 to 25, the same reference numerals or the same reference symbols as used in FIG. 16 denote the same elements. First, referring to FIG. 21, if the external command E_CMD requesting the MAC arithmetic operation and the input address I_ADDR are transmitted from an external device to the receiving driver 330, the receiving driver 330 may output the external command E_CMD and the input address I_ADDR to the command decoder 350 and the address latch 360, respectively. The command decoder 350 may decode the external command E_CMD to generate and transmit the memory active signal ACT_M to the MAC command generator 370. The MAC command generator 370 may generate and output the MAC active signal RACTV in response to the memory active signal ACT_M. The MAC active signal RACTV may be transmitted to the first memory bank (BK0) 311 and the second memory bank (BK1) 312. Both of the first memory bank (BK0) 311 and the second memory bank (BK1) 312 may be activated by the MAC active signal RACTV.

Figure 22:
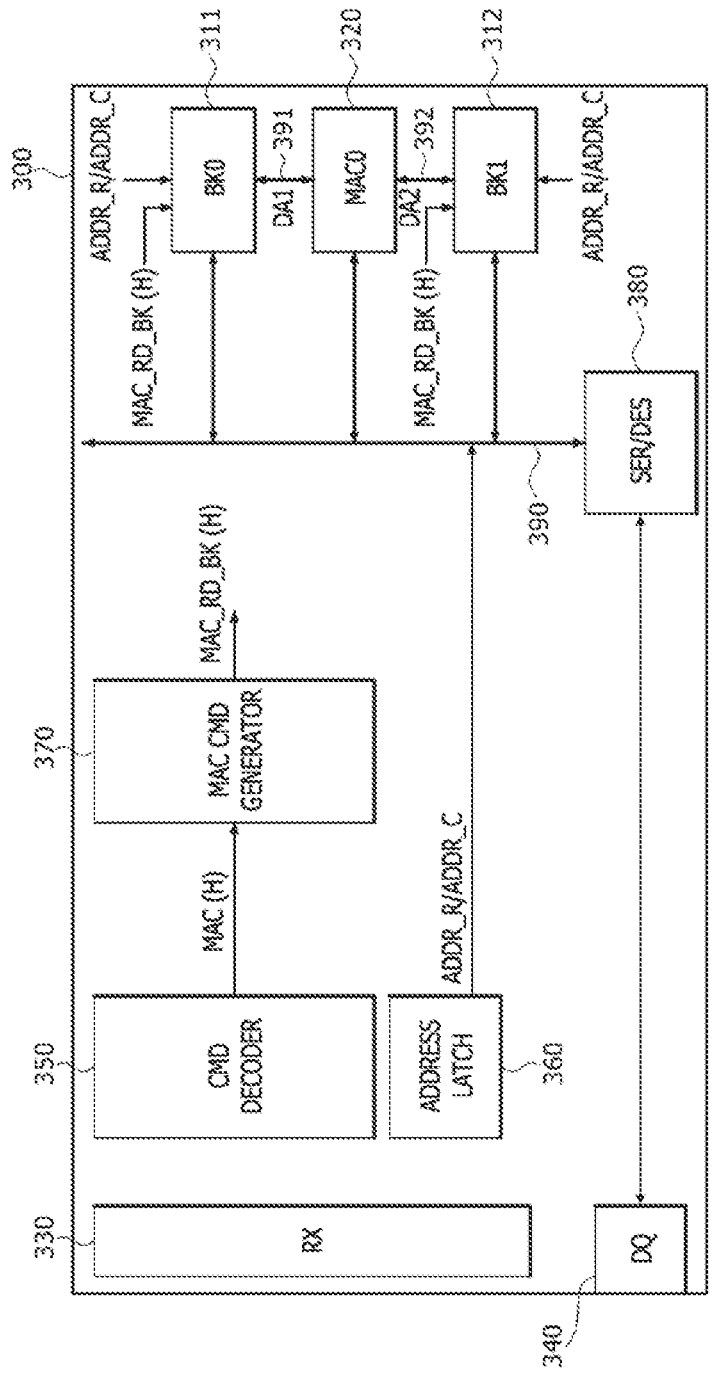

Next, referring to FIG. 22, the command decoder 350 may generate and output the MAC arithmetic signal MAC having a logic "high(H)" level to the MAC command generator 370. In response to the MAC arithmetic signal MAC having a logic "high(H)" level, the MAC command generator 370 may generate and output the MAC read signal MAC_RD_BK having a logic "high(H)" level. The MAC read signal MAC_RD_BK having a logic "high(H)" level, together with the row/column address ADDR_R/ADDR_C, may be transmitted to the first memory bank (BK0) 311 and the second memory bank (BK1) 312. The first data DA1 may be read out of the first memory bank (BK0) 311 by the MAC read signal MAC_RD_BK having a logic "high(H)" level and may be transmitted to the first MAC operator (MAC0) 320 through the first BIO line 391. In addition, the second data DA2 may be read out of the second memory bank (BK1) 312 by the MAC read signal MAC_RD_BK having a logic "high(H)" level and may be transmitted to the first MAC operator (MAC0) 320 through the second BIO line 392.

Figure 23:
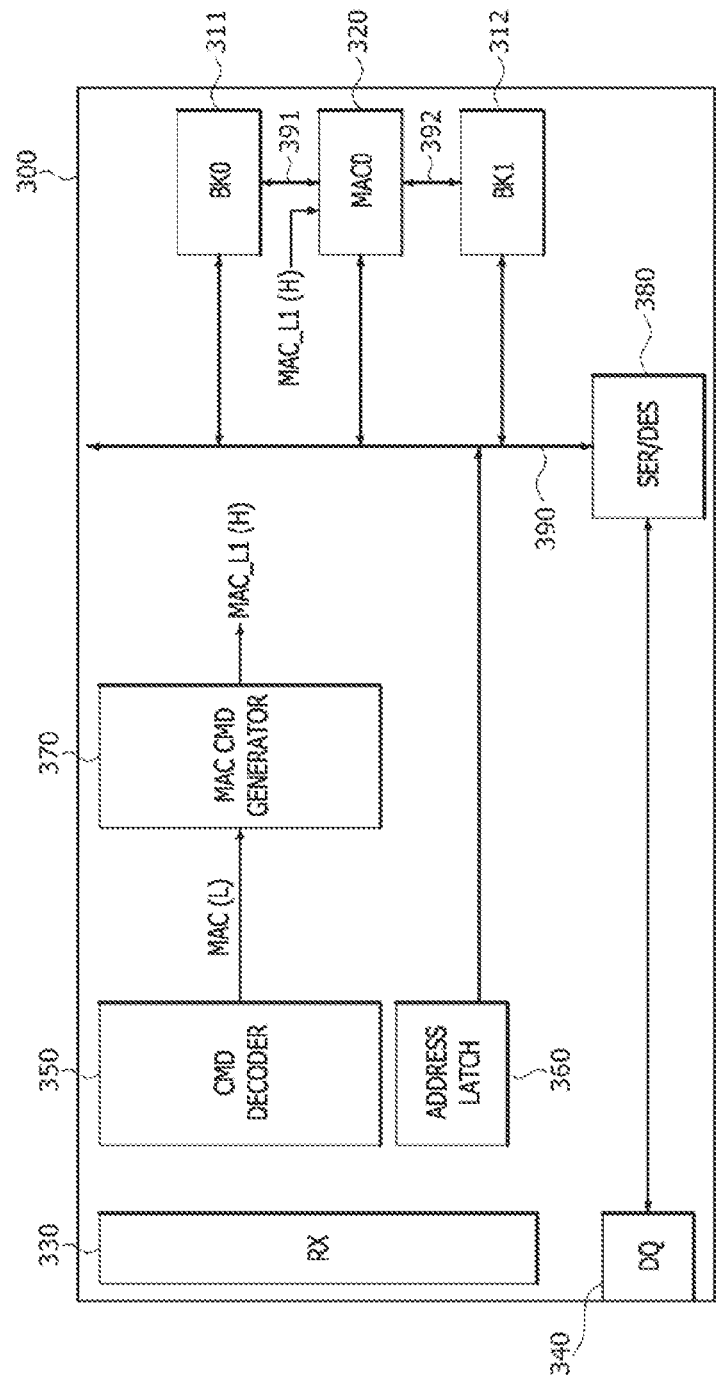

Next, referring to FIG. 23, a logic level of the MAC arithmetic signal MAC outputted from the command decoder 350 may change from a logic "high(H)" level into a logic "low(L)" level at a point in time when the first delay time DELAY_T1 determined by the first delay circuit (372 of FIG. 18) elapses from a point in time when the MAC read signal MAC_RD_BK is outputted from the MAC command generator 370. The MAC command generator 370 may generate and output the MAC input latch signal MAC_1 having a logic "high(H)" level in response to the MAC arithmetic signal MAC having a logic "low(L)" level. The MAC input latch signal MAC_L1 having a logic "high(H)" level may be transmitted to the first MAC operator (MAC0) 320. The first MAC operator (MAC0) 320 may be synchronized with the MAC input latch signal MAC_1 having a logic "high(H)" level to perform a latch operation of the first and second data DA1 and DA2 outputted from the first and second memory banks (BK0 and BK1) 311 and 312. If the latch operation of the first and second data DA1 and DA2 terminates, the first MAC operator (MAC0) 320 may perform the MAC arithmetic operation and may generate the MAC result data DA_MAC. The MAC result data DA_MAC generated by the first MAC operator (MAC0) 320 may be inputted to the output latch (223-1 of FIG. 20) included in the first MAC operator (MAC0) 320.

Figure 24:
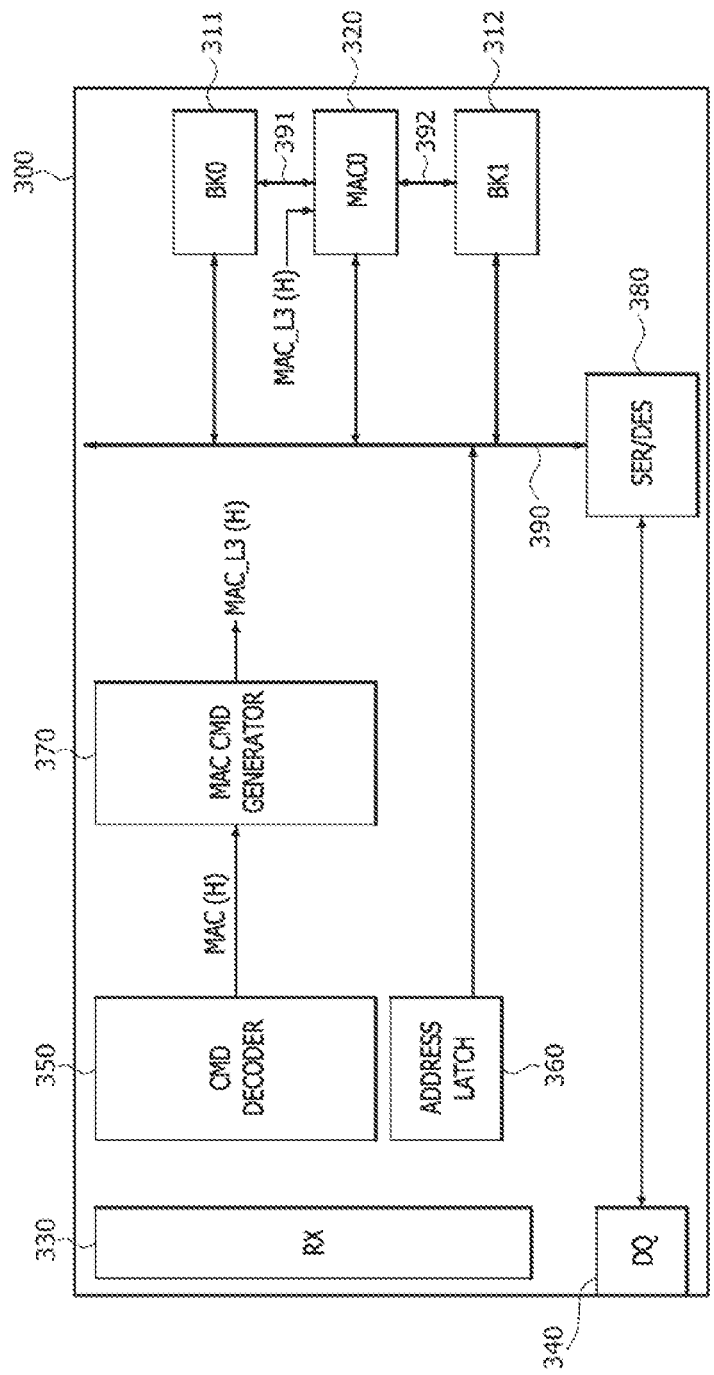

Next, referring to FIG. 24, a logic level of the MAC arithmetic signal MAC outputted from the command decoder 350 may change from a logic "low(L)" level into a logic "high(H)" level at a point in time when the second delay time DELAY_T2 determined by the second delay circuit (373 of FIG. 18) elapses from a point in time when the MAC input latch signal MAC_1 having a logic "high (H)" level is outputted from the MAC command generator 370. The MAC command generator 370 may generate and output the MAC output latch signal MAC_L3 having a logic "high(H)" level in response to the MAC arithmetic signal MAC having a logic "high(H)" level. The MAC output latch signal MAC_L3 having a logic "high(H)" level may be transmitted to the first MAC operator (MAC0) 320. The output latch (223-1 of FIG. 20) included in the first MAC operator (MAC0) 320 may be synchronized with the MAC output latch signal MAC_L3 having a logic "high(H)" level to transfer the MAC result data DA_MAC generated by the MAC circuit (222 of FIG. 20) to the transfer gate (223-2 of FIG. 20) included in the first MAC operator (MAC0) 320. The MAC result data DA_MAC outputted from the output latch (223-1 of FIG. 20) may be fed back to the addition logic circuit (222-2 of FIG. 20) for the accumulative adding calculation executed by the MAC circuit (222 of FIG. 20).

Figure 25:
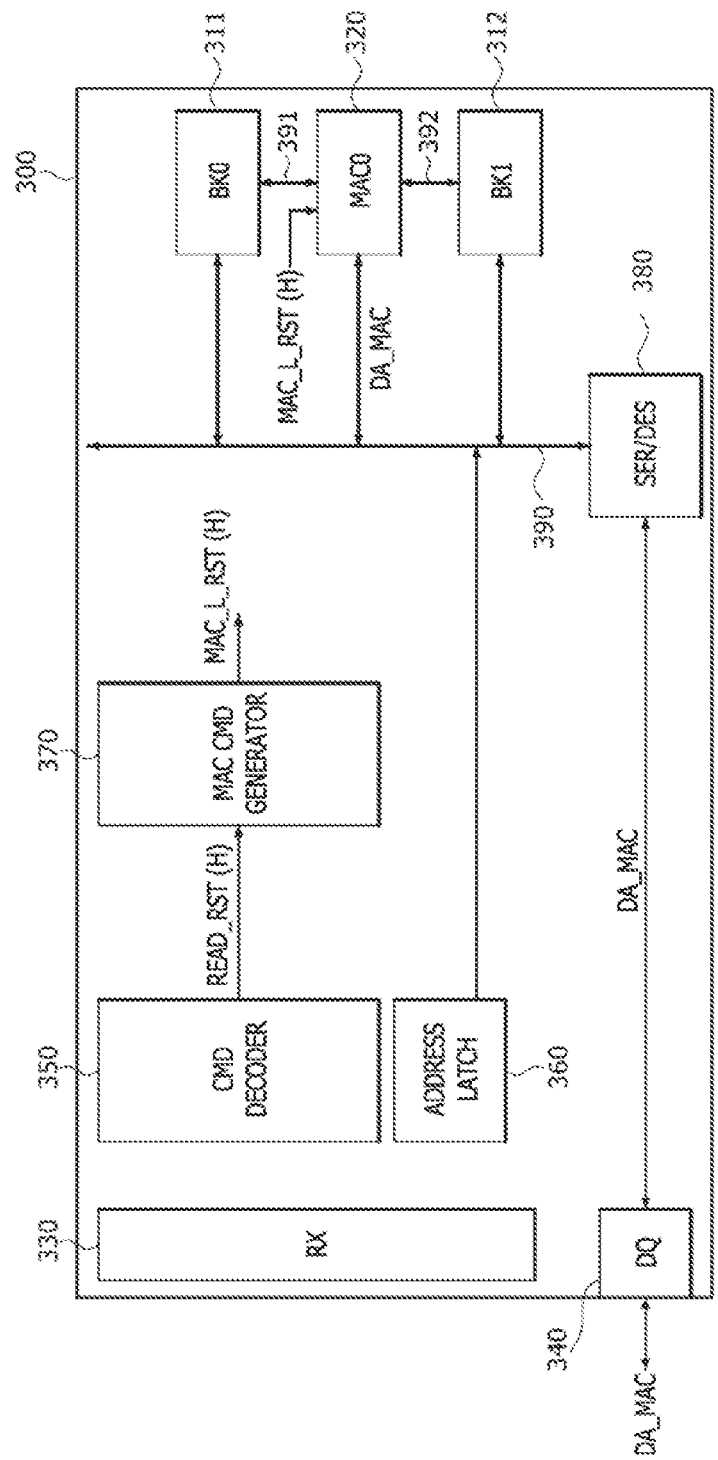

Next, referring to FIG. 25, the command decoder 350 may output and transmit the result read signal READ_RST having a logic "high(H)" level to the MAC command generator 370. The MAC command generator 370 may generate and output the MAC result latch signal MAC_L_RST having a logic "high" level in response to the (4 result read signal READ_RST having a logic "high(H)" level. The MAC result latch signal MAC_L_RST having a logic "high" level may be transmitted to the first MAC operator (MAC0) 320. As described with reference to FIG. 20, the first MAC operator (MAC0) 320 may output the MAC result data DA_MAC to the GIO line 390 in response to the MAC result latch signal MAC_L_RST having a logic "high" level and may also reset the output latch (223-1 of FIG. 20) included in the first MAC operator (MAC0) 320 in response to the MAC result latch signal MAC_L_RST having a logic "high" level. The MAC result data DA_MAC transmitted to the GIO line 390 may be outputted to an external device through the serializer/deserializer 380 and the data I/O line 340. Although not shown in the drawings, the MAC result data DA_MAC outputted from the first MAC operator (MAC0) 320 may be written into the first memory bank (BK0) 311 through the first BIO line 391 without using the GIO line 390 or may be written into the second memory bank (BK1) 312 through the second BIO line 392 without using the GIO line 390.

Figure 26:
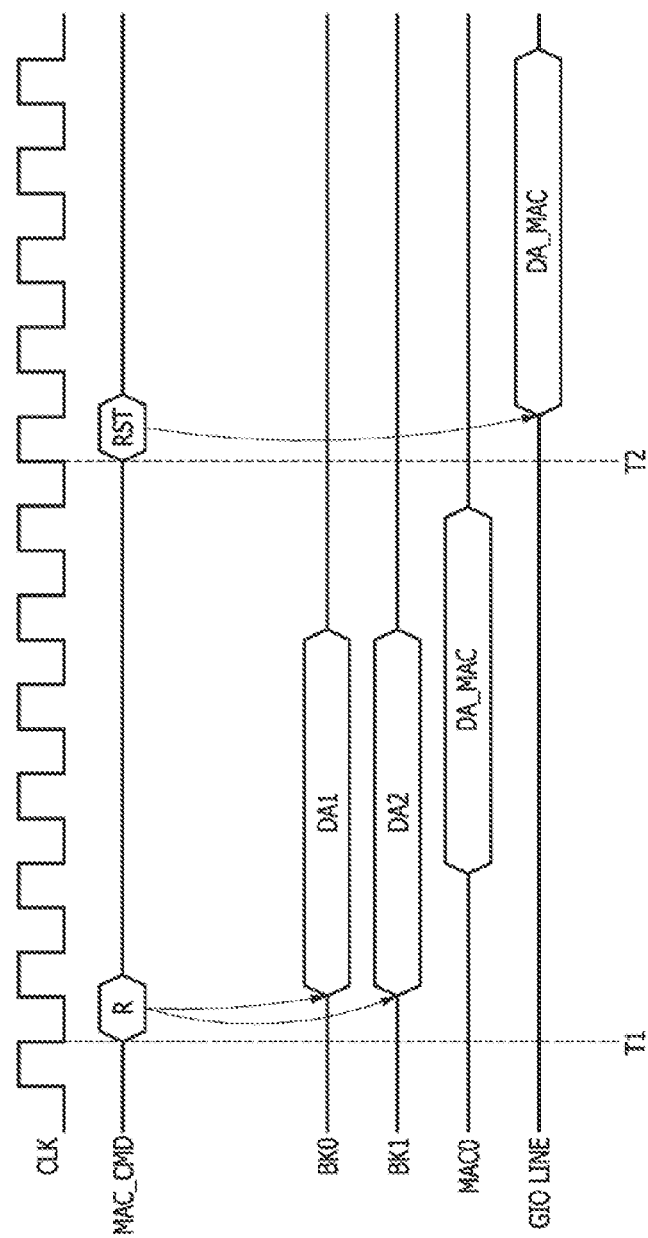
FIG. 26 is a timing diagram an operation of the PIM device illustrated in FIG. 16.

FIG. 26 is a timing diagram illustrating an operation of the PIM device 300 illustrated in FIG. 16. Referring to FIG. 26, at a first point in time "T1", the MAC command generator 370 may be synchronized with a falling edge of a clock signal CLK to generate and output the MAC read signal MAC_RD_BK (R) having a logic "high(H)" level. The first and second memory banks (BK0 and BK1) 311 and 312 may be selected by the MAC read signal MAC_RD_BK (R) having a logic "high(H)" level so that the first data DA1 and the second data DA2 are read out of the first and second memory banks (BK0 and BK1) 311 and 312. If a certain time elapses from a point in time when first data DA1 and the second data DA2 are read out, the first MAC operator (MAC0) 320 may perform the MAC arithmetic operation of the first and second data DA1 and DA2 to generate the MAC result data DA_MAC. At a second point in time "T2", the MAC command generator 370 may be synchronized with a falling edge of the clock signal CLK to generate and output the MAC result latch signal MAC_L_RST (RST) having a logic "high" level. The MAC result data DA_MAC may be transmitted to the GIO line 390 by the MAC result latch signal MAC_L_RST (RST) having a logic "high" level.

Figure 27:
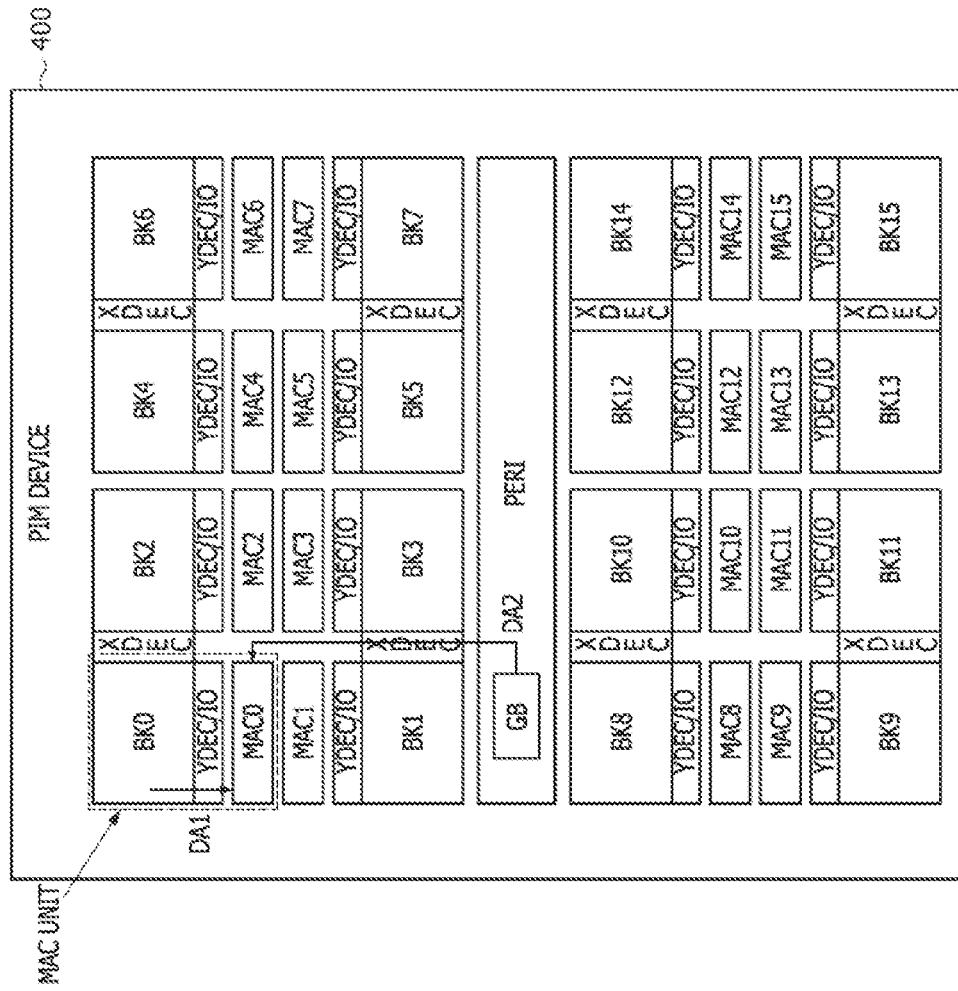
FIG. 27 is a schematic diagram illustrating an arrangement of memory banks and multiplication/accumulation (MAC) operators included in a PIM device according to a second embodiment of the present disclosure.

FIG. 27 illustrates a disposal structure indicating placement of memory banks and MAC operators included in a PIM device 400 according to another embodiment of the present disclosure. Referring to FIG. 27, the PIM device 400 may include memory devices such as a plurality of memory banks (e.g., first to sixteenth memory banks BK0, . . . , and BK15), processing devices such as a plurality of MAC operators (e.g., first to sixteenth MAC operators MAC0, . . . , and MAC15), and a global buffer GB. A core circuit may be disposed to be adjacent to the memory banks BK0, . . . , and BK15. The core circuit may include X-decoders XDECs and Y-decoders/IO circuits YDEC/IOs. The memory banks BK0, . . . , and BK15 and the core circuit may have the same configuration as described with reference to FIG. 2. Thus, descriptions of the memory banks BK0, . . . , and BK15 and the core circuit will be omitted hereinafter. The MAC operators MAC0, . . . , and MAC15 may be disposed to be allocated to the memory banks BK0, . . . , and BK15, respectively. That is, in the PIM device 400, two or more memory banks do not share one MAC operator with each other. Thus, the number of the MAC operators MAC0, . . . , and MAC15 included in the PIM device 400 may be equal to the number of the memory banks BK0, . . . , and BK15 included in the PIM device 400. One of the memory banks BK0, . . . , and BK15 together with one of the MAC operators MAC0, . . . , and MAC15 may constitute one MAC unit. For example, the first memory bank BK0 and the first MAC operator MAC0 may constitute a first MAC unit, and the second memory bank BK1 and the second MAC operator MAC1 may constitute a second MAC unit. Similarly, the sixteenth memory bank BK15 and the sixteenth MAC operator MAC15 may constitute a sixteenth MAC unit. In each of the first to sixteenth MAC units, the MAC operator may receive first data DA1 to be used for the MAC arithmetic operation from the respective memory bank.

The PIM device 400 may further include a peripheral circuit PERI. The peripheral circuit PERI may be disposed in a region other than an area in which the memory banks BK0, BK1, . . . , and BK15; the MAC operators MAC0, . . . , and MAC15; and the core circuit are disposed. The peripheral circuit PERI may be configured to include a control circuit relating to a command/address signal, a control circuit relating to input/output of data, and a power supply circuit. The peripheral circuit PERI of the PIM device 400 may have substantially the same configuration as the peripheral circuit PERI of the PIM device 100 illustrated in FIG. 2. A difference between the peripheral circuit PERI of the PIM device 400 and the peripheral circuit PERI of the PIM device 100 is that the global buffer GB is disposed in the peripheral circuit PERI of the PIM device 400. The global buffer GB may receive second data DA2 to be used for the MAC operation from an external device and may store the second data DA2. The global buffer GB may output the second data DA2 to each of the MAC operators MAC0, . . . , and MAC15 through a GIO line. In the event that the PIM device 400 performs neural network calculation, for example, an arithmetic operation in a deep learning process, the first data DA1 may be weight data and the second data DA2 may be vector data.

The PIM device 400 according to the present embodiment may operate in a memory mode or a MAC arithmetic mode. In the memory mode, the PIM device 400 may operate to perform the same operations as general memory devices. The memory mode may include a memory read operation mode and a memory write operation mode. In the memory read operation mode, the PIM device 400 may perform a read operation for reading out data from the memory banks BK0, BK1, . . . , and BK15 to output the read data, in response to an external request. In the memory write operation mode, the PIM device 400 may perform a write operation for storing data provided by an external device into the memory banks BK0, BK1, . . . , and BK15, in response to an external request. In the MAC arithmetic mode, the PIM device 400 may perform the MAC arithmetic operation using the MAC operators MAC0, . . . , and MAC15. In the PIM device 400, the MAC arithmetic operation may be performed in a deterministic way, and the deterministic MAC arithmetic operation of the PIM device 400 will be described more fully hereinafter. Specifically, the PIM device 400 may perform the read operation of the first data DA1 for each of the memory banks BK0, . . . , and BK15 and the read operation of the second data DA2 for the global buffer GB, for the MAC arithmetic operation in the MAC arithmetic mode. In addition, each of the MAC operators MAC0, . . . , and MAC15 may perform the MAC arithmetic operation of the first data DA1 and the second data DA2 to store a result of the MAC arithmetic operation into the memory bank or to output the result of the MAC arithmetic operation to an external device. In some cases, the PIM device 400 may perform a data write operation for storing data to be used for the MAC arithmetic operation into the memory banks before the data read operation for the MAC arithmetic operation is performed in the MAC arithmetic mode.

The operation mode of the PIM device 400 according to the present embodiment may be determined by a command which is transmitted from a host or a controller to the PIM device 400. In an embodiment, if a first external command requesting a read operation or a write operation for the memory banks BK0, BK1, . . . , and BK15 is transmitted from the host or the controller to the PIM device 400, the PIM device 400 may perform the data read operation or the data write operation in the memory mode. Alternatively, if a second external command requesting the MAC arithmetic operation is transmitted from the host or the controller to the PIM device 400, the PIM device 400 may perform the data read operation and the MAC arithmetic operation.

The PIM device 400 may perform the deterministic MAC arithmetic operation. Thus, the host or the controller may always predict a point in time (or a clock) when the MAC arithmetic operation terminates in the PIM device 400 from a point in time when an external command requesting the MAC arithmetic operation is transmitted from the host or the controller to the PIM device 400. Because the timing is predictable, no operation for informing the host or the controller of a status of the MAC arithmetic operation is required while the PIM device 400 performs the deterministic MAC arithmetic operation. In an embodiment, a latency during which the MAC arithmetic operation is performed in the PIM device 400 may be set to a fixed value for the deterministic MAC arithmetic operation.

Figure 28:
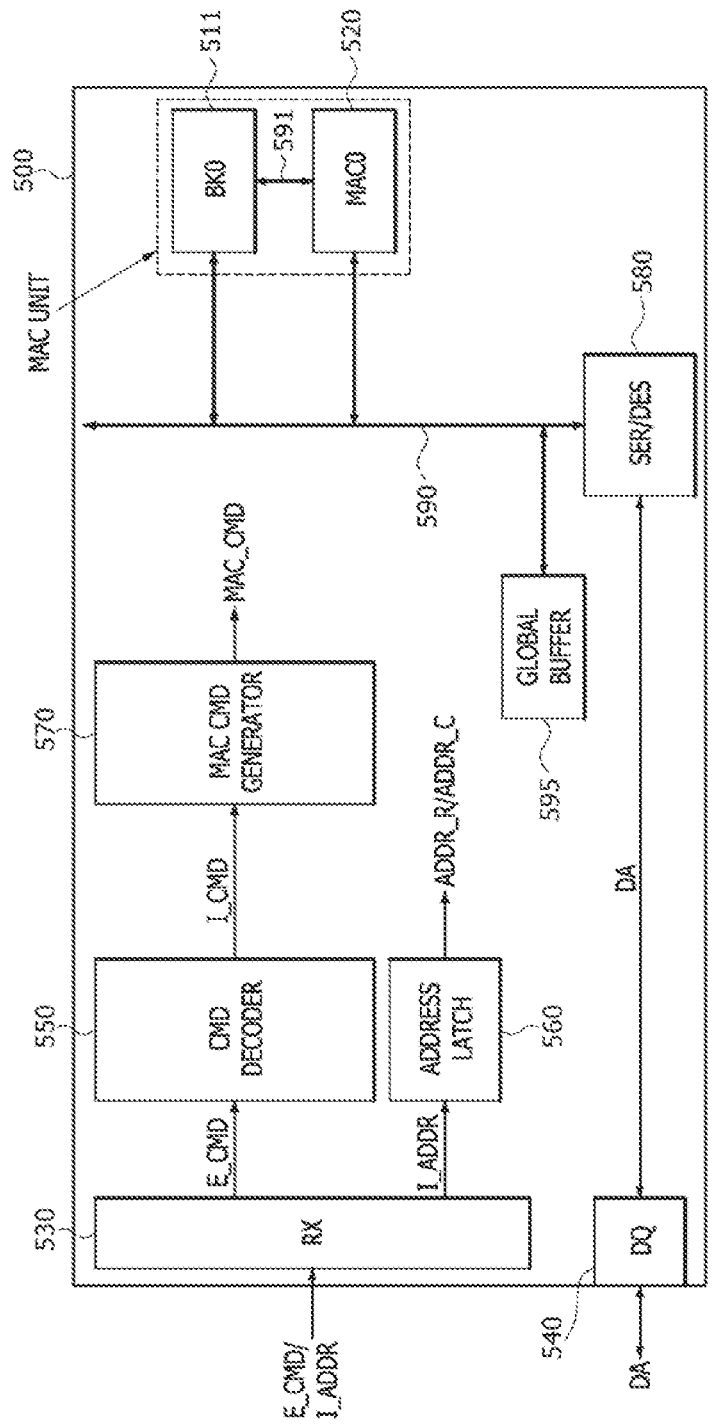
FIG. 28 is a block diagram illustrating a configuration of a PIM device according to the second embodiment of the present disclosure.

FIG. 28 is a block diagram illustrating an example of a detailed configuration of a PIM device 500 corresponding to the PIM device 400 illustrated in FIG. 27. FIG. 28 illustrates only a first memory bank (BK0) 511 and a first MAC operator (MAC0) 520 constituting a first MAC unit among a plurality of MAC units. However, FIG. 28 illustrates merely an example for simplification of the drawing. Accordingly, the following description for the first MAC unit may be equally applicable to the remaining MAC units. Referring to FIG. 28, the PIM device 500 may be configured to include the first memory bank (BK0) 511 and the first MAC operator (MAC0) 520 constituting the first MAC unit as well as a global buffer 595. The PIM device 500 may further include a GIO line 590 and a BIO line 591 used as data transmission lines. The first memory bank (BK0) 511 and the first MAC operator (MAC0) 520 may communicate with the global buffer 595 through the GIO line 590. Only the data transmission between the first memory bank (BK0) 511 and the first MAC operator (MAC0) 520 may be achieved through the BIO line 591. The BIO line 591 is dedicated specifically for data transmission between the first memory bank (BK0) 511 and the first MAC operator (MAC0) 520. Thus, the first MAC operator (MAC0) 520 may receive the first data DA1 to be used for the MAC arithmetic operation from the first memory bank (BK0) 511 through the BIO line 591 and may receive the second data DA2 to be used for the MAC arithmetic operation from the global buffer 595 through the GIO line 590.

The PIM device 500 may include a receiving driver (RX) 530, a data I/O circuit (DQ) 540, a command decoder 550, an address latch 560, a MAC command generator 570, and a serializer/deserializer (SER/DES) 580. The command decoder 550, the address latch 560, the MAC command generator 570, and the serializer/deserializer 580 may be disposed in the peripheral circuit PERI of the PIM device 400 illustrated in FIG. 27. The receiving driver 530 may receive an external command E_CMD and an input address I_ADDR from an external device. The external device may denote a host or a controller coupled to the PIM device 500. Hereinafter, it may be assumed that the external command E_CMD transmitted to the PIM device 500 is a command requesting the MAC arithmetic operation. That is, the PIM device 500 may perform the deterministic MAC arithmetic operation in response to the external command E_CMD. The data I/O circuit 540 may provide a means through which the PIM device 500 communicates with the external device.

The receiving driver 530 may separately output the external command E_CMD and the input address I_ADDR received from the external device. Data DA inputted to the PIM device 500 through the data I/O circuit 540 may be processed by the serializer/deserializer 580 and may be transmitted to the first memory bank (BK0) 511 and the global buffer 595 through the GIO line 590 of the PIM device 500. The data DA outputted from the first memory bank (BK0) 511 and the first MAC operator (MAC0) 520 through the GIO line 590 may be processed by the serializer/deserializer 580 and may be outputted to the external device through the data I/O circuit 540. The serializer/deserializer 580 may convert the data DA into parallel data if the data DA are serial data or may convert the data DA into serial data if the data DA are parallel data. For the data conversion, the serializer/deserializer 580 may include a serializer converting parallel data into serial data and a deserializer converting serial data into parallel data.

The command decoder 550 may decode the external command E_CMD outputted from the receiving driver 530 to generate and output the internal command signal I_CMD. The internal command signal I_CMD outputted from the command decoder 550 may be the same as the internal command signal I_CMD described with reference to FIG. 17. That is, the internal command signal I_CMD may include a first internal command signal corresponding to the memory active signal ACT_M, a second internal command signal corresponding to the MAC arithmetic signal MAC, and a third internal command signal corresponding to the result read signal READ_RST. The first to third internal command signals outputted from the command decoder 550 may be sequentially inputted to the MAC command generator 570. As described with reference to FIG. 17, the memory active signal ACT_M, the MAC arithmetic signal MAC, and the result read signal READ_RST outputted from the command decoder 550 may be sequentially generated at predetermined points in time (or clocks) in order to perform the deterministic MAC arithmetic operation of the PIM device 500. Thus, the host or the controller outputting the external command E_CMD may predict the points in time when the first to third internal command signals constituting the internal command signal I_CMD are generated by the command decoder 550 in advance at a point in time when the external command E_CMD is outputted from the host or the controller. That is, the host or the controller may predict a point in time (or a clock) when the MAC arithmetic operation terminates in the PIM device 500 after the external command E_CMD requesting the MAC arithmetic operation is transmitted from the host or the controller to the PIM device 500, even without receiving any signals from the PIM device 500.

The address latch 560 may convert the input address I_ADDR outputted from the receiving driver 530 into a row/column address ADDR_R/ADDR_C to output the row/column address ADDR_R/ADDR_C. The row/column address ADDR_R/ADDR_C outputted from the address latch 560 may be transmitted to the first memory bank (BK0) 511. According to the present embodiment, the first data and the second data to be used for the MAC arithmetic operation may be simultaneously read out of the first memory bank (BK0) 511 and the global buffer 595, respectively. Thus, it may be unnecessary to generate a bank selection signal for selecting the first memory bank 511. A point in time when the row/column address ADDR_R/ADDR_C is inputted to the first memory bank 511 may be a point in time when a MAC command (i.e., the MAC arithmetic signal MAC) requesting a data read operation for the first memory bank 511 for the MAC arithmetic operation is generated.

The MAC command generator 570 may output the MAC command signal MAC_CMD in response to the internal command signal I_CMD outputted from the command decoder 550. The MAC command signal MAC_CMD outputted from the MAC command generator 570 may be the same as the MAC command signal MAC_CMD described with reference to FIG. 17. That is, the MAC command signal MAC_CMD outputted from the MAC command generator 570 may include the MAC active signal RACTV corresponding to the first MAC command signal, the MAC read signal MAC_RD_BK corresponding to the second MAC command signal, the MAC input latch signal MAC_L1 corresponding to the third MAC command signal, the MAC output latch signal MAC_L3 corresponding to the fourth MAC command signal, and the MAC result latch signal MAC_L_RST corresponding to the fifth MAC command signal.

The MAC active signal RACTV may be generated based on the memory active signal ACT_M outputted from the command decoder 550. The MAC read signal MAC_RD_BK, the MAC input latch signal MAC_1, the MAC output latch signal MAC_L3, and the MAC result latch signal MAC_L_RST may be sequentially generated based on the MAC arithmetic signal MAC outputted from the command decoder 550. That is, the MAC input latch signal MAC_L1 may be generated at a point in time when a certain time elapses from a point in time when the MAC read signal MAC_RD_BK is generated. The MAC output latch signal MAC_L3 may be generated at a point in time when a certain time elapses from a point in time when the MAC input latch signal MAC_1 is generated. Finally, the MAC result latch signal MAC_L_RST may be generated based on the result read signal READ_RST outputted from the command decoder 550.

The MAC active signal RACTV outputted from the MAC command generator 570 may control an activation operation for the first memory bank 511. The MAC read signal MAC_RD_BK outputted from the MAC command generator 570 may control a data read operation for the first memory bank 511 and the global buffer 595. The MAC input latch signal MAC_L1 outputted from the MAC command generator 570 may control an input data latch operation of the first MAC operator (MAC0) 520. The MAC output latch signal MAC_L3 outputted from the MAC command generator 570 may control an output data latch operation of the first MAC operator (MAC0) 520. The MAC result latch signal MAC_L_RST outputted from the MAC command generator 570 may control an output operation of MAC result data of the first MAC operator (MAC0) 520 and a reset operation of the first MAC operator (MAC0) 520.

As described above, in order to perform the deterministic MAC arithmetic operation of the PIM device 500, the memory active signal ACT_M, the MAC arithmetic signal MAC, and the result read signal READ_RST outputted from the command decoder 550 may be sequentially generated at predetermined points in time (or clocks), respectively. Thus, the MAC active signal RACTV, the MAC read signal MAC_RD_BK, the MAC input latch signal MAC_L1, the MAC output latch signal MAC_L3, and the MAC result latch signal MAC_L_RST may also be generated and outputted from the MAC command generator 570 at predetermined points in time after the external command E_CMD is inputted to the PIM device 500, respectively. That is, a time period from a point in time when the first and second memory banks 511 is activated by the MAC active signal RACTV until a point in time when the first MAC operator (MAC0) 520 is reset by the MAC result latch signal MAC_L_RST may be predetermined.

The MAC command generator 570 of the PIM device 500 according to the present embodiment may have the same configuration as described with reference to FIG. 18. In addition, the input signals and the output signals of the MAC command generator 570 may be inputted to and outputted from the MAC command generator 570 at the same points in time as described with reference to FIG. 19. As described with reference to FIGS. 18 and 19, the MAC command generator 570 may sequentially receive the memory active signal ACT_M, the MAC arithmetic signal MAC, and the result read signal READ_RST from the command decoder 550. In addition, the MAC command generator 570 may sequentially generate and output the MAC active signal RACTV, the MAC read signal MAC_RD_BK, the MAC input latch signal MAC_L1, the MAC output latch signal MAC_L3, and the MAC result latch signal MAC_L_RST.

The MAC active signal RACTV, the MAC read signal MAC_RD_BK, the MAC input latch signal MAC_L1, the MAC output latch signal MAC_L3, and the MAC result latch signal MAC_L_RST may be outputted from the MAC command generator 570 in series with certain time intervals.

The MAC command generator 570 may generate and output the MAC active signal RACTV in response to the memory active signal ACT_M outputted from the command decoder 550. Subsequently, the MAC command generator 570 may generate and output the MAC read signal MAC_RD_BK in response to the MAC arithmetic signal MAC outputted from the command decoder 550. The MAC command generator 570 may delay the MAC arithmetic signal MAC by a certain time determined by the first delay circuit (372 of FIG. 18) to generate and output the MAC input latch signal MAC_L1. The MAC command generator 570 may delay the MAC input latch signal MAC_L1 by a certain time determined by the second delay circuit (373 of FIG. 18) to generate and output the MAC output latch signal MAC_L3. Subsequently, the MAC command generator 570 may generate and output the MAC result latch signal MAC_L_RST in response to the result read signal READ_RST outputted from the command decoder 550.

Figure 29:
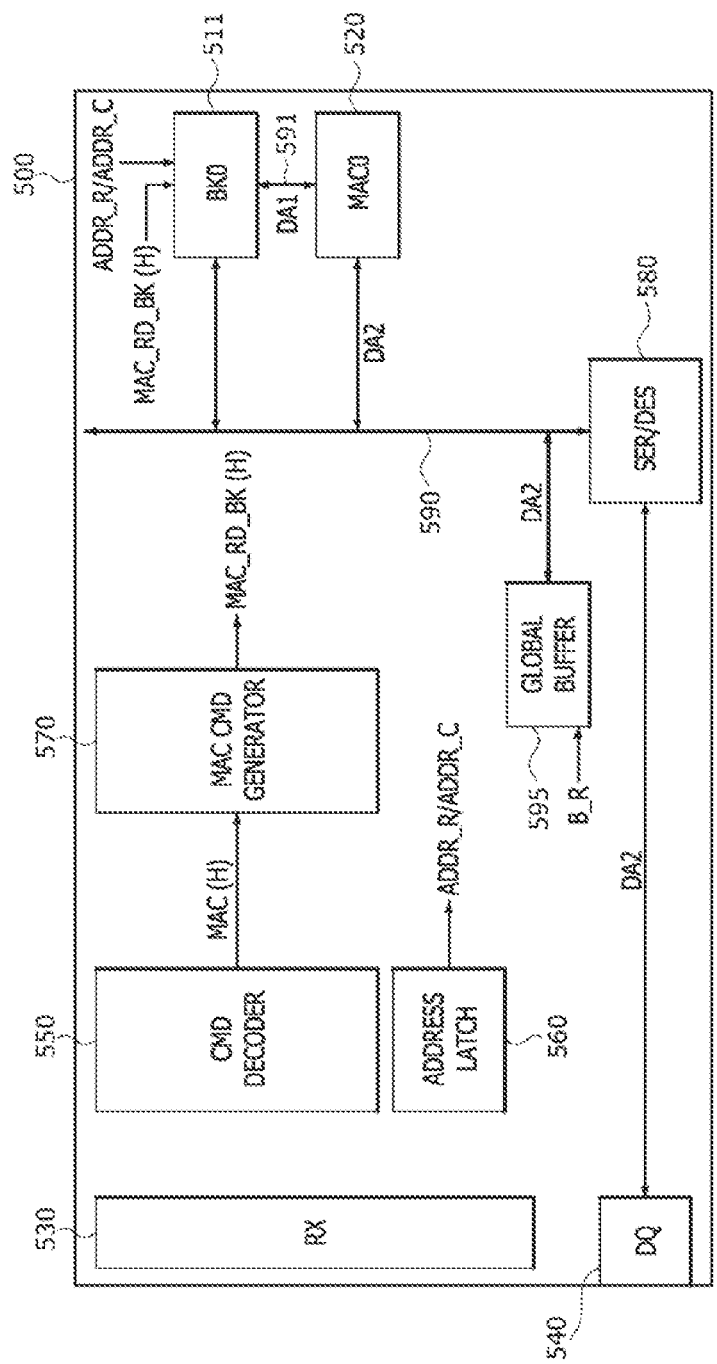
FIG. 29 is a block diagram illustrating an operation of the PIM device illustrated in FIG. 28.

FIG. 29 is a block diagram illustrating an operation of the PIM device 500 illustrated in FIG. 28. In FIG. 29, the same reference numerals or the same reference symbols as used in FIG. 16 denote the same elements. The operation of the PIM device 500 according to the present embodiment may be similar to the operation of the PIM device 300 described with reference to FIG. 16 except a transmission process of the first and second data DA1 and DA2 inputted to the first MAC operator (MAC0) 520. Thus, the operation of the PIM device 500 executed before the first and second data DA1 and DA2 are transmitted to the first MAC operator (MAC0) 520 may be the same as the operation of the PIM device 300 described with reference to FIG. 21. As illustrated in FIG. 29, when the MAC arithmetic signal MAC having a logic "high(H)" level is transmitted from the command decoder 550 to the MAC command generator 570, the MAC command generator 570 may generate and output the MAC read signal MAC_RD_BK having a logic "high(H)" level. The MAC read signal MAC_RD_BK having a logic "high(H)" level, together with the row/column address ADDR_R/ADDR_C, may be transmitted to the first memory bank (BK0) 511. In such a case, a global buffer read signal B_R may also be transmitted to the global buffer 595. The first data DA1 may be read out of the first memory bank (BK0) 511 by the MAC read signal MAC_RD_BK having a logic "high(H)" level and may be transmitted to the first MAC operator (MAC0) 520 through the BIO line 591. In addition, the second data DA2 may be read out of the global buffer 595 by the global buffer read signal B_R and may be transmitted to the first MAC operator (MAC0) 520 through the GIO line 590. The operation of the PIM device 500 executed after the first and second data DA1 and DA2 are transmitted to the first MAC operator (MAC0) 520 may be the same as the operation of the PIM device 300 described with reference to FIGS. 23 to 25.

Figure 30:
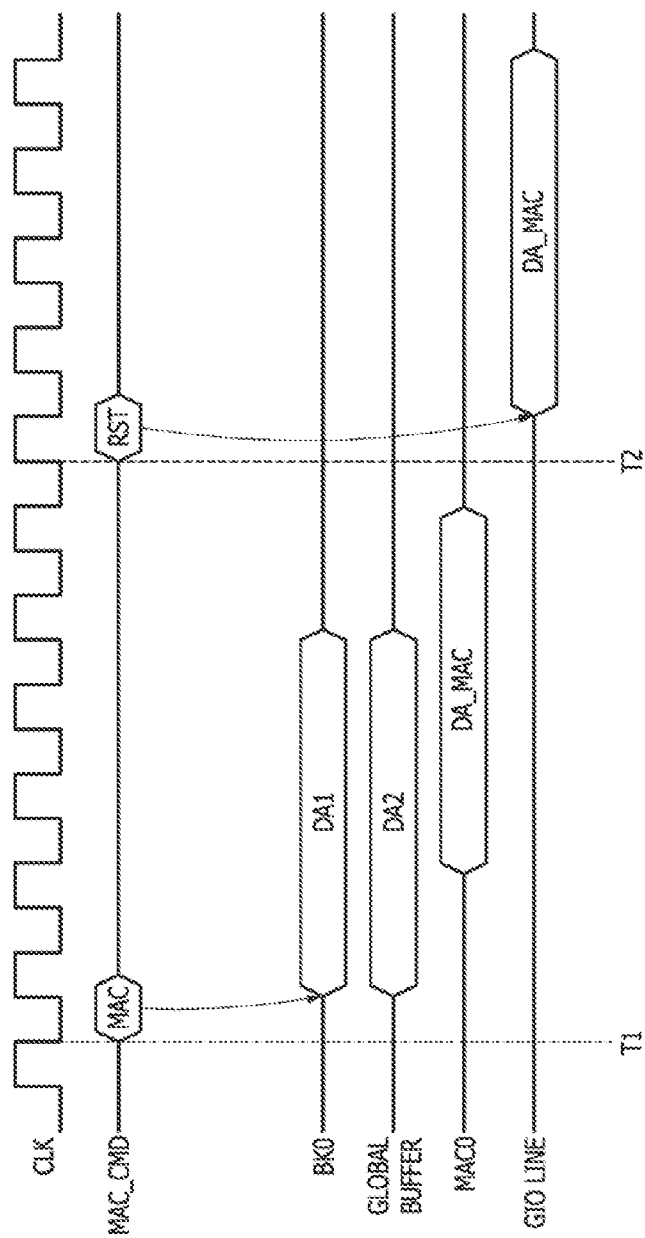
FIG. 30 is a timing diagram illustrating an operation of the PIM device illustrated in FIG. 28.

FIG. 30 is a timing diagram illustrating an operation of the PIM device 500 illustrate in FIG. 28. Referring to FIG. 30, at a first point in time "T1", the MAC command generator 570 may be synchronized with a falling edge of a clock signal CLK to generate and output the MAC read signal MAC_RD_BK (R) having a logic "high(H)" level. The first memory bank (BK0) 511 may be selected by the MAC read signal MAC_RD_BK (R) having a logic "high(H)" level so that the first data DA1 are read out of the first memory bank (BK0) 511. In addition, the second data DA2 may be read out of the global buffer 595. If a certain time elapses from a point in time when the first and second data DA1 and DA2 are read out of the first memory bank (BK0) 511 and the global buffer 595, the first MAC operator (MAC0) 520 may perform the MAC arithmetic operation of the first and second data DA1 and DA2 to generate the MAC result data DA_MAC. At a second point in time "T2", the MAC command generator 570 may be synchronized with a falling edge of the clock signal CLK to generate and output the MAC result latch signal MAC_L_RST (RST). The MAC result data DA_MAC may be transmitted to an external device through the GIO line 590 or to the first memory bank (BK0) 511 through the BIO line 591, by the MAC result latch signal MAC_L_RST (RST).

Figure 31:
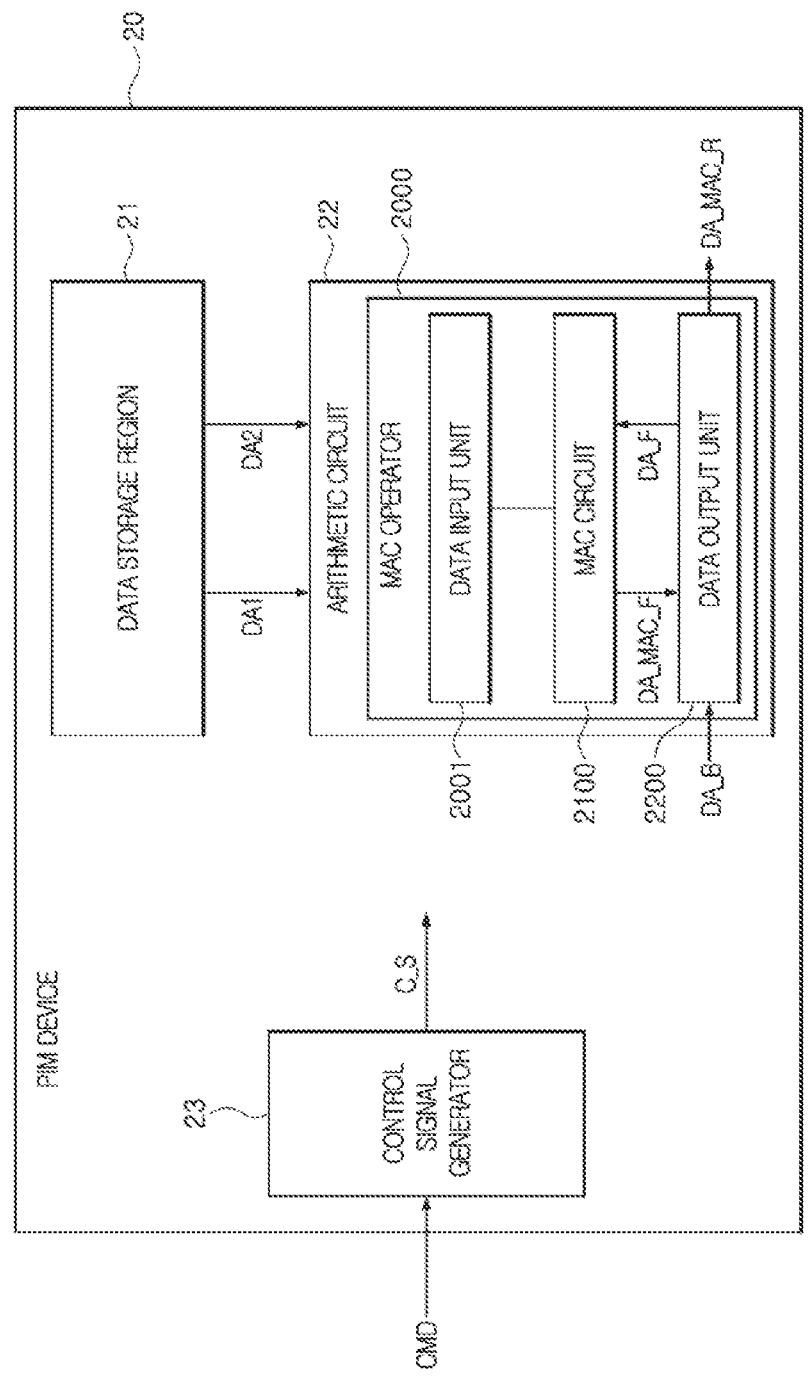
FIG. 31 is a block diagram illustrating a configuration of a PIM device according to an embodiment of the present disclosure.

FIG. 31 is a block diagram illustrating a configuration of a PIM device 20 according to an embodiment of the present disclosure. Referring to FIG. 31, the PIM device 20 may include a data storage region 21, an arithmetic circuit 22, and a control signal generator 23. The data storage region 21 may store first data DA1 and second data DA2. The arithmetic circuit 22 may perform the MAC arithmetic operation of the first data DA1 and the second data DA2 outputted from the data storage region 21 to generate a result of the MAC arithmetic operation. The control signal generator 23 may output a control signal C_S for controlling an access operation to the data storage region 21 and the MAC arithmetic operation of the arithmetic circuit 22. The control signal generator 23 may decode an external command CMD outputted from an external device (not shown) such as a host or a controller to generate and output the control signal C_S as an internal command. In an embodiment, the external command CMD may be a MAC command instructing the MAC arithmetic operation. In an embodiment, the control signal C_S may represent a plurality of control signals C_Ss.

The data storage region 21 may have substantially the same configuration as the data storage region 11 illustrated in FIG. 1. Thus, detailed descriptions of the data storage region 21 will be omitted hereinafter. Descriptions of the PIM device 10 illustrated in FIG. 1 may also be equally applicable to the PIM device 20 illustrated in FIG. 31. For example, the PIM device 20 may operate in a memory mode or a MAC arithmetic mode, like the PIM device 10 illustrated in FIG. 1.

The arithmetic circuit 22 may include at least one MAC operator 2000. The MAC operator 2000 may include a data input unit 2001, a MAC circuit 2100, and a data output unit 2200. The data input unit 2001 may receive and latch the first data DA1 and the second data DA2 which are outputted from the data storage region 21. The MAC circuit 2100 may perform the MAC arithmetic operation of the first data DA1 and the second data DA2, which are outputted from the data storage region 21, to generate MAC interim data. The MAC circuit 2100 may add feedback data DA_F to the MAC interim data to generate and output MAC result data DA_MAC_F. The data output unit 2200 may receive the MAC result data DA_MAC_F from the MAC circuit 2100. The data output unit 2200 may output the MAC result data DA_MAC_F as MAC result data DA_MAC_R corresponding to final result data of the arithmetic circuit 22.

In an embodiment, the MAC arithmetic operation may be iteratively performed at least twice. For example, when an amount of the first data DA1 and the second data DA2 is larger than an amount of data which are able to be processed by the MAC circuit 2100 at once, the MAC arithmetic operation may be iteratively performed until arithmetic operations for all of the first data DA1 and the second data DA2 terminate. In such a case, the MAC circuit 2100 may output the MAC result data DA_MAC_F which are obtained by adding the feedback data DA_F outputted from the data output unit 2200 to the previous MAC result data. The data output unit 2200 may output the MAC result data DA_MAC_F, which are obtained by adding the feedback data DA_F to the previous MAC result data, as the feedback data DA_F which are transmitted to the MAC circuit 2100 again. These processes may be executed until all of the arithmetic operations for the first data DA1 and the second data DA2 terminate. Although the following embodiments are described in conjunction with a case for which the MAC arithmetic operation is iteratively performed, the following embodiments may be equally applicable to even a case for which the MAC arithmetic operation is performed only once.

According to the PIM device 20, initial feedback data of the data output unit 2200 may be set as the bias data DA_B. Thus, before a first MAC arithmetic operation of the MAC circuit 2100 for the first data DA1 and the second data DA2 is performed, the data output unit 2200 may receive the bias data DA_B from an external device and may output the bias data DA_B as the feedback data DA_F to the MAC circuit 2100. In order to set the initial feedback data of the data output unit 2200 as the bias data DA_B, the data output unit 2200 may receive the bias data DA_B from the data storage region 21 of the PIM device 20 or an external data memory. After the first MAC arithmetic operation of the MAC circuit 2100 for the first data DA1 and the second data DA2 is performed, the MAC circuit 2100 may add the bias data DA_B corresponding to first feedback data DA_F to data generated by the first MAC arithmetic operation to generate and output the MAC result data DA_MAC_F. Thus, according to the PIM device 20, the bias data DA_B may be added to the result data of the first MAC arithmetic operation. Accordingly, it may be unnecessary to perform an extra adding operation for adding the bias data DA_B to the MAC result data DA_MAC_R generated by termination of the MAC arithmetic operation.

FIG. 32 illustrates an example of the MAC arithmetic operation performed by the PIM device 20. Referring to FIG. 32, the MAC arithmetic operation performed by the PIM device 20 may be executed through a matrix calculation. Specifically, the PIM device may execute a matrix multiplying calculation of a '(M+1)×(N+1)' weight matrix and a '(N+1)×1' vector matrix according to control of an external controller (where, "M" and "N" are natural numbers). As a result of the matrix multiplying calculation of the '(M+1)×(N+1)' weight matrix and the '(N+1)×1' vector matrix, an '(N+1)×1' MAC result matrix may be generated. The '(M+1)×(N+1)' weight matrix may include '(M+1)×(N+1)'-number of elements W0.0, . . . , and WM.N. The '(N+1)×1' vector matrix may include '(N+1)'-number of elements X0.0, . . . , and XN.0. The MAC result matrix may include '(N+1)'-number of elements MAC0.0, . . . , and MACN.0.

In an embodiment, the matrix multiplying calculation may be performed for an '8×8' weight matrix and an '8×1' vector matrix. In such a case, an '8×1' MAC result matrix may be generated as a result of the matrix multiplying calculation. The '8×8' weight matrix may include sixty four elements W0.0, . . . , and W7.7, and the '8×1' vector matrix may include eight elements X0.0, . . . , and X7.0. In addition, the '8×1' MAC result matrix may include MAC0.0, . . . , and MAC7.0.

The MAC arithmetic operation performed by the PIM device may include a matrix adding operation executed with bias data. Specifically, the PIM device 20 may perform the matrix adding operation of the '(N+1)×1' MAC result matrix and an '(N+1)×1' bias matrix. The '(N+1)×1' bias matrix may have '(N+1)'-number of bias data B0.0, . . . , and BN.0 as elements. As a result of the matrix adding operation for the MAC result matrix and the bias matrix, an '(N+1)×1' biased result matrix including '(N+1)'-number of elements Y0.0, . . . , and YN.0 may be generated. In an embodiment, an '8×1' bias matrix including eight elements B0.0, . . . , and B7.0 may be employed as the '(N+1)×1' bias matrix. The bias matrix may be set to reduce an error of the MAC result data.

Each of the elements W0.0, . . . , and WM.N included in the weight matrix, the elements X0.0, . . . , and XN.0 included in the vector matrix, and the elements B0.0, . . . , BN.0 included in the bias matrix may be a binary stream having multiple bits. In an embodiment, the first data DA1 may be comprised of the elements W0.0, . . . , W0.N arrayed in a first row of the weight matrix, and the second data DA2 may be comprised of the elements X0.0, . . . , and XN.0 arrayed in the vector matrix. The bias data DA_B corresponding to the first data DA1 comprised of the elements W0.0, . . . , and W0.N arrayed in the first row of the weight matrix may be an element B0.0 located in a first row of the bias matrix.

The matrix multiplying operation of the weight matrix and the vector matrix may be used in a multi-layered perceptron-type (MLP-type) neural network. In general, the MLP-type neural network for executing a deep learning process may include at least three hidden layers and an output layer. The matrix multiplying operation (i.e., the MAC arithmetic operation) of the weight matrix and the vector matrix illustrated in FIG. 32 may correspond to an arithmetic operation executed in one of the multiple hidden layers. The MAC arithmetic operation in the first hidden layer may be performed using the vector data which are inputted to the first hidden layer. However, the MAC arithmetic operations in the second to last hidden layers may be performed using the arithmetic result data generated in a previous hidden layer as the vector data.

In general, after the MAC result matrix is generated by the MAC arithmetic operation of the weight matrix and the vector matrix, a matrix adding operation for adding a bias matrix to the MAC result matrix may be performed. The matrix adding operation may be generally performed using a bias adder. However, according to the PIM device 20 illustrated in FIG. 31, the bias data B0.0 may be set as the initial feedback data DA_F. Thus, the data output unit 2200 may output the bias data B0.0 employed as the first feedback data DA_F to the MAC circuit 2100. The bias data B0.0 employed as the first feedback data DA_F may be transmitted to the MAC circuit 2100 and may be added to first MAC interim data generated by the MAC circuit 2100. Accordingly, an additional bias adder is not required because the bias data B0.0 are added to the first MAC interim data during the MAC arithmetic operation.

Figure 33:
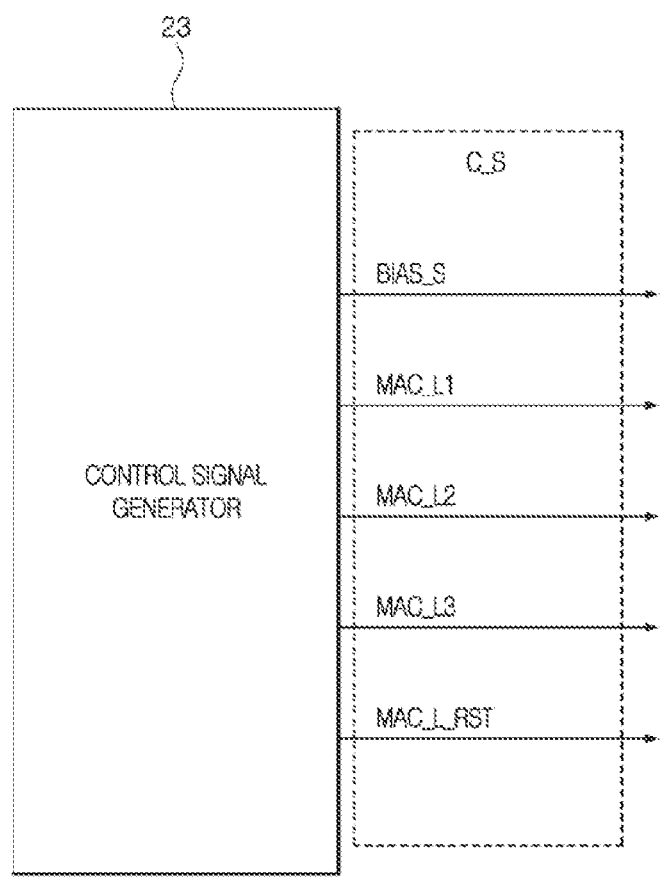
FIG. 33 illustrates an example of signals outputted from a control signal generator included in the PIM device illustrated in FIG. 31.

FIG. 33 illustrates an example of signals outputted from the control signal generator 23 included in the PIM device 20 illustrated in FIG. 31. Referring to FIG. 33, the control signal generator 23 may output various control signals C_Ss controlling operations of the arithmetic circuit (22 of FIG. 31) in response to the external command CMD provided by an external device. The control signals C_Ss may include first to fifth control signals. The first control signal may correspond to a bias input latch signal BIAS_S. The second control signal may correspond to a first MAC input latch signal MAC_L1. The third control signal may correspond to a second MAC input latch signal MAC_L2. The fourth control signal may correspond to a MAC output latch signal MAC_L3. The fifth control signal may correspond to a MAC result output latch signal MAC_L_RST.

In an embodiment, the control signal generator 23 may output the bias input latch signal BIAS_S, the first MAC input latch signal MAC_1, the second MAC input latch signal MAC_L2, the MAC output latch signal MAC_L3, and the MAC result output latch signal MAC_L_RST in response to first to third commands included in the external command CMD. In the present embodiment, the control signal generator 23 may output the bias input latch signal BIAS_S in response to the first command of the external command CMD. In addition, the control signal generator 23 may sequentially output the first MAC input latch signal MAC_1, the second MAC input latch signal MAC_L2, and the MAC output latch signal MAC_L3 at a certain time interval in response to the second command of the external command CMD. Moreover, the control signal generator 23 may output the MAC result output latch signal MAC_L_RST in response to the third command of the external command CMD.

Figure 34:
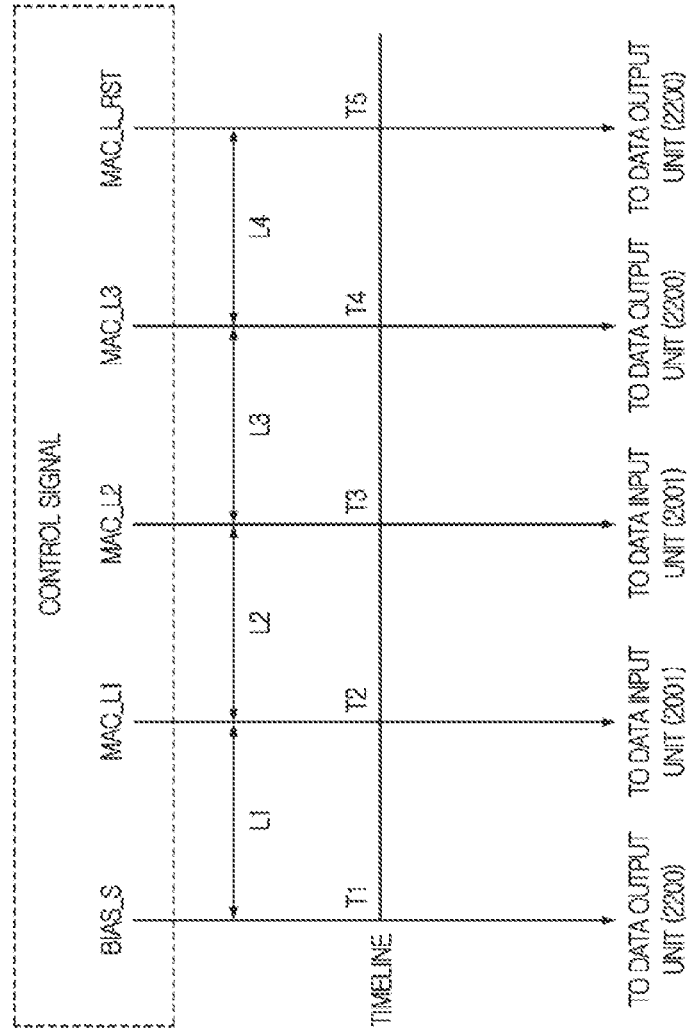
FIG. 34 is a schematic diagram illustrating output signals of the control signal generator illustrated in FIG. 33 with a timeline.

FIG. 34 illustrates the output signals BIAS_S, MAC_-1, MAC_L2, MAC_L3, and MAC_L_RST of the control signal generator 23 illustrated in FIG. 33 with a timeline. Referring to FIGS. 33 and 34, the control signal generator 23 may output the bias input latch signal BIAS_S at a first point in time "T1". The bias input latch signal BIAS_S may be inputted to the data output unit 2200. The control signal generator 23 may output the first MAC input latch signal MAC_1 at a second point in time "T2" when a first latency L1 elapses from the first point in time "T1". The first MAC input latch signal MAC_L1 may be inputted to the data input unit 2001. The control signal generator 23 may output the second MAC input latch signal MAC_L2 at a third point in time "T3" when a second latency L2 elapses from the second point in time "T2". The second MAC input latch signal MAC_L2 may be inputted to the data input unit 2001. The control signal generator 23 may output the MAC output latch signal MAC_L3 at a fourth point in time "T4" when a third latency L3 elapses from the third point in time "T3". The MAC output latch signal MAC_L3 may be inputted to the data output unit 2200. The control signal generator 23 may output the MAC result output latch signal MAC_L_RST at a fifth point in time "T5" when a fourth latency L4 elapses from the fourth point in time "T4". The MAC result output latch signal MAC_L_RST may be inputted to the data output unit 2200.

The bias input latch signal BIAS_S may be a signal for setting the bias data DA_B as initial feedback data DA_F of the data output unit 2200. The first MAC input latch signal MAC_L1 may be a signal for controlling an input latch operation of the data input unit 2001 for the first data DAL. The second MAC input latch signal MAC_L2 may be a signal for controlling an input latch operation of the data input unit 2001 for the second data DA2. The MAC output latch signal MAC_L3 may be a signal for controlling an output latch operation of the data output unit 2200 for data transmitted from the MAC circuit 2100 to the data output unit 2200. The MAC result output latch signal MAC_L_RST may be a signal for controlling an external output operation of the data output unit 2200 for outputting the MAC result data DA_MAC_R from the data output unit 2200.

The bias input latch signal BIAS_S, the first and second MAC input latch signals MAC_1 and MAC_L2, the MAC output latch signal MAC_L3, and the MAC result output latch signal MAC_L_RST may be activated to have a logic "high" level. In an embodiment, the first and second MAC input latch signals MAC_1 and MAC_L2 and the MAC output latch signal MAC_L3 may be iteratively outputted from the control signal generator 23. Thus, the MAC arithmetic operation and the feedback process may be iteratively performed by the MAC circuit 2100 and the data output unit 2200.

The first latency L1 may be set as an amount of time which is necessary to initialize the feedback data DA_F as the bias data DA_B based on the bias input latch signal BIAS_S. The second latency L2 may be set as an amount of time which is necessary for the input latch operation of the data input unit 2001 for receiving the first data DA1 based on the first MAC input latch signal MAC_1. The third latency L3 may be set as an amount of time which is necessary for the input latch operation of the data input unit 2001 for receiving the second data DA2 based on the second MAC input latch signal MAC_L2 and necessary for the MAC arithmetic operation of the first and second data DA1 and DA2. The fourth latency L4 may be set as an amount of time which is necessary for the output latch operation of the data output unit 2200 for outputting data received from the MAC circuit 2100 based on the MAC output latch signal MAC_L3. The first to fourth latencies L1, L2, L3, and L4 may be set as predetermined inherent time periods, respectively.

Figure 35:
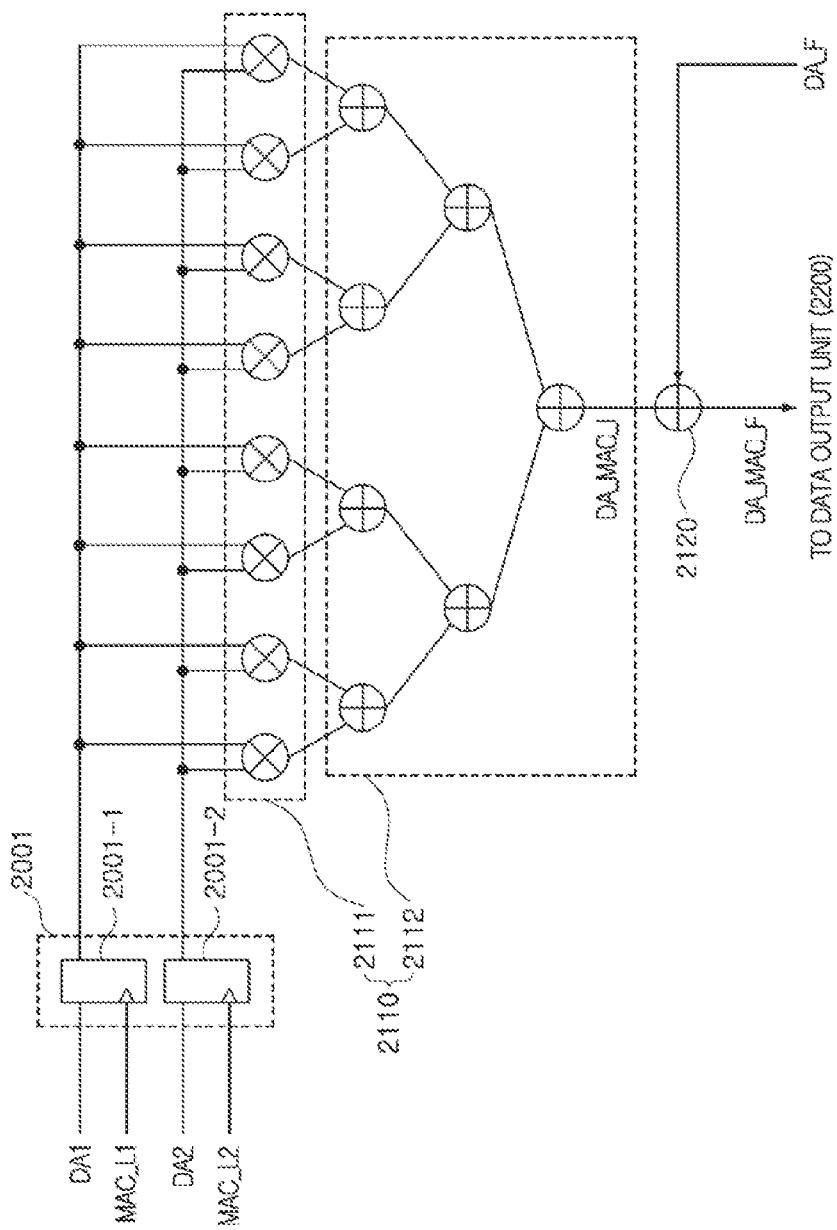
FIGS. 35 and 36 illustrate an example of low-order elements of a MAC operator included in the PIM device illustrated in FIG. 31.

FIG. 35 illustrates an example of configurations of the data input unit 2001 and the MAC circuit 2100 illustrated in FIG. 31. Referring to FIG. 35, the data input unit 2001 may include a first input latch 2001-1 and a second input latch 2001-2. The first input latch 2001-1 may be synchronized with the first MAC input latch signal MAC_L1 to output the first data DA1 to an arithmetic block 2110. The second input latch 2001-2 may be synchronized with the second MAC input latch signal MAC_L2 to output the second data DA2 to the arithmetic block 2110.

The MAC circuit 2100 may include the arithmetic block 2110 and an accumulative addition logic circuit 2120. The arithmetic block 2110 may perform the MAC arithmetic operation of the first data DA1 and the second data DA2 outputted from the data input unit 2001 to generate and output MAC interim data DA_MAC_I. The MAC arithmetic operation may be iteratively performed at least twice. As a result, multiple sets of the MAC interim data DA_MAC_I may be generated. The arithmetic block 2110 may include a multiplication logic circuit 2111 and an addition logic circuit 2112. The multiplication logic circuit 2111 and the addition logic circuit 2112 may be realized to have substantially the same configuration as the multiplication logic circuit 222-1 and the addition logic circuit 222-2 described with reference to FIG. 7, respectively. Thus, detailed descriptions of the multiplication logic circuit 2111 and the addition logic circuit 2112 will be omitted hereinafter.

The accumulative addition logic circuit 2120 may add the feedback data DA_F to the MAC interim data DA_MAC_I outputted from the arithmetic block 2110 to generate and output the MAC result data DA_MAC_F. The bias data employed as the first feedback data DA_F may be transmitted to the accumulative addition logic circuit 2120. Thus, the MAC result data DA_MAC_F outputted from the accumulative addition logic circuit 2120 may include a result of a bias addition operation.

Figure 36:
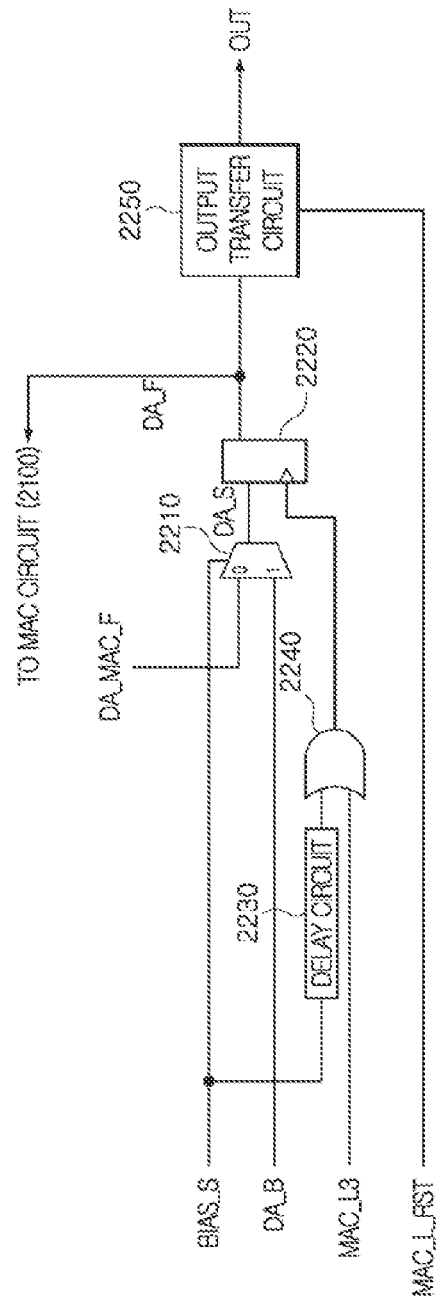

FIG. 36 illustrates an example of a configuration of the data output unit 2200 illustrated in FIG. 31. Referring to FIG. 36, the data output unit 2200 may include a data selector 2210, a data output latch 2220, a delay circuit 2230, an OR gate 2240, and an output transfer circuit 2250.

The data selector 2210 may have a first input terminal '0', a second input terminal '1', and an output terminal. The MAC result data DA_MAC_F may be inputted to the first input terminal '0' of the data selector 2210. The bias data DA_B may be inputted to the second input terminal '1' of the data selector 2210. The data selector 2210 may selectively output the MAC result data DA_MAC_F or the bias data DA_B as output data DA_S through the output terminal of the data selector 2210. The selection of the MAC result data DA_MAC_F or the bias data DA_B may be executed by the bias input latch signal BIAS_S. In an embodiment, when the bias input latch signal BIAS_S has a logic "high" level, the data selector 2210 may output the bias data DA_B as the output data DA_S. In contrast, when the bias input latch signal BIAS_S has a logic "low" level, the data selector 2210 may output the MAC result data DA_MAC_F as the output data DA_S. In an embodiment, the data selector 2210 may be realized using a multiplexer.

The data output latch 2220 may receive and latch the output data DA_S outputted from the data selector 2210. The data output latch 2220 may be synchronized with the MAC output latch signal MAC_L3 to output the output data DA_S received from the data selector 2210. That is, when the data selector 2210 outputs the bias data DA_B as the output data DA_S, the data output latch 2220 may be synchronized with the MAC output latch signal MAC_L3 to output the bias data DA_B. When the data selector 2210 outputs the MAC result data DA_MAC_F as the output data DA_S, the data output latch 2220 may be synchronized with the MAC output latch signal MAC_L3 to output the MAC result data DA_MAC_F. The output data of the data output latch 2220 may correspond to the feedback data DA_F, and the feedback data DA_F may be transmitted to the accumulative addition logic circuit (2120 of FIG. 35) of the MAC circuit (2100 of FIG. 35). In addition, the output data of the data output latch 2220 may also be transmitted to the output transfer circuit 2250.

The delay circuit 2230 may receive and delay the bias input latch signal BIAS_S by a certain time to output the delayed signal of the bias input latch signal BIAS_S. The OR gate 2240 may receive an output signal of the delay circuit 2230 and the MAC output latch signal MAC_L3 and may perform a logical OR operation of the output signal of the delay circuit 2230 and the MAC output latch signal MAC_L3 to output a result of the logical OR operation. An output signal of the OR gate 2240 may be inputted to a clock terminal of the data output latch 2220. The OR gate 2240 may output a signal having a logic "high" level when at least one of two input signals has a logic "high" level and may output a signal having a logic "low" level when both of two input signals have a logic "low" level.

Figure 37:
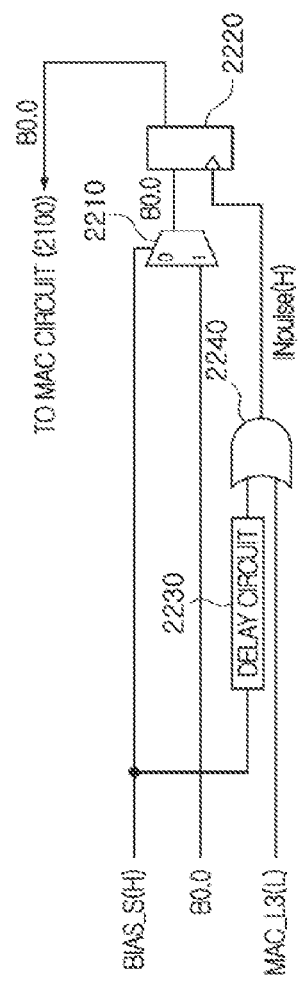
FIGS. 37 to 39 illustrate arithmetic operations and data flow of the PIM device illustrated in FIG. 31.
Figure 38:
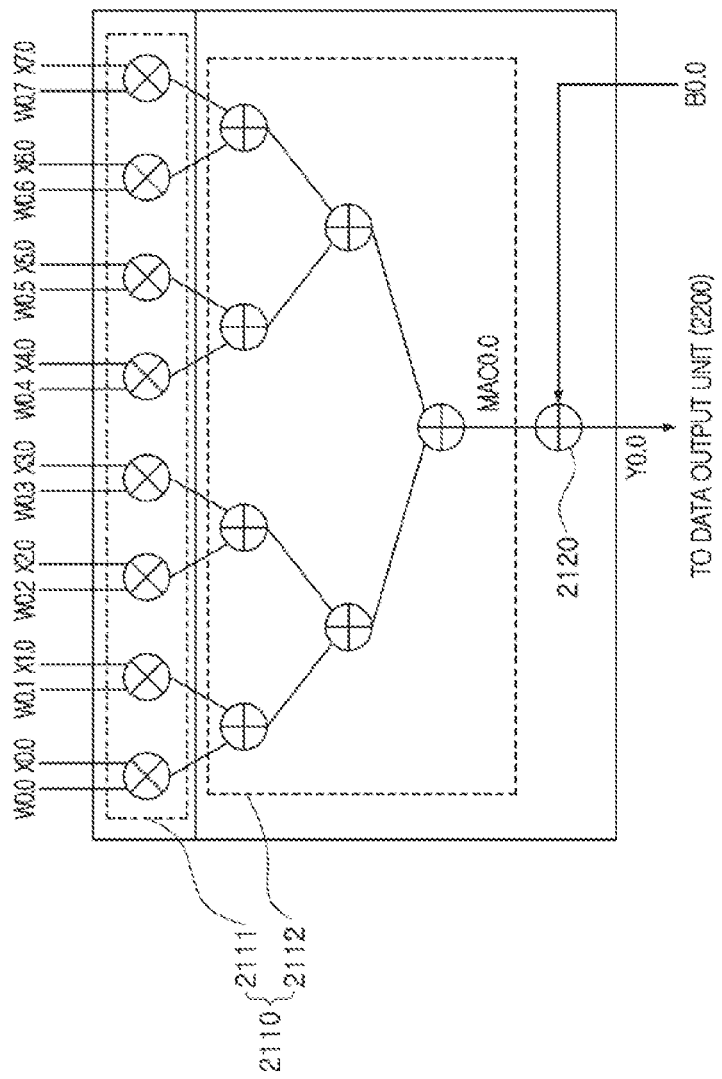
Figure 39:
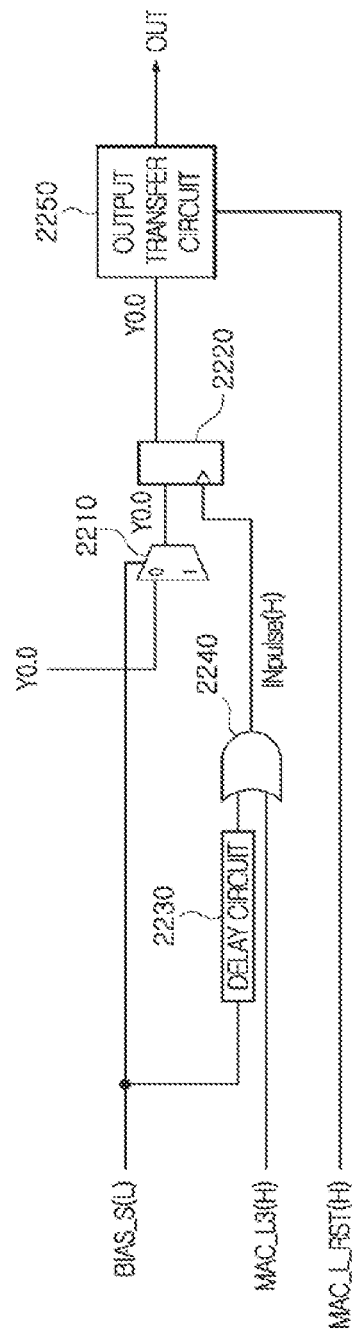

FIGS. 37 to 39 illustrate arithmetic operations and data flow of the MAC circuit 2100 and the data output unit 2200 included in the PIM device 20 illustrated in FIG. 31. Specifically, FIG. 37 illustrates a process for which the bias data are set as the initial feedback data in the data output unit 2200, FIG. 38 illustrates a process for which the bias data are added in the MAC circuit 2100, and FIG. 39 illustrates a process for which the biased result data generated by adding the bias data to the MAC result data are outputted from the data output unit 2200.

In the present embodiment, for the purpose of ease and convenience in explanation, it may be assumed that the first data DA1 are set as the elements W0.0, . . . , and W0.7 arrayed in the first row of the '8×8' weight matrix described with reference to FIG. 32 and the second data DA2 are set as the elements X0.0, . . . , and X7.0 of the '8×1' vector matrix described with reference to FIG. 32. In addition, it may be assumed that the bias data DA_B are set as the element B0.0 arrayed in the first row of the '8×1' bias matrix described with reference to FIG. 32. In FIGS. 37 to 39, some elements, which are unrelated with the description of the present embodiment, among all of elements included in the MAC circuit 2100 and the data output unit 2200 are not illustrated.

Referring to FIGS. 34 and 37, before the MAC arithmetic operation of the MAC circuit 2100 is performed, the bias data B0.0 may be transmitted to the second input terminal '1' of the data selector 2210. When the bias input latch signal BIAS_S having a logic "high(H)" level is transmitted to the data selector 2210 at the first point in time "T1", the data selector 2210 may output the bias data B0.0 inputted to the second input terminal '1' to the data output latch 2220. Thus, the bias data B0.0 may be set as an initial value (i.e., a first feedback data) of the data output latch 2220.

The bias input latch signal BIAS_S having a logic "high (H)" level may be inputted to the OR gate 2240 through the delay circuit 2230. The MAC output latch signal MAC_L3 may maintain a logic "low(L)" level even when the bias input latch signal BIAS_S having a logic "high(H)" level is inputted to the OR gate 2240. Thus, when the bias input latch signal BIAS_S having a logic "high(H)" level and the MAC output latch signal MAC_L3 having a logic "low(L)" level are inputted to the OR gate 2240, the OR gate 2240 may output a clock signal INpulse having a logic "high(H)" level. The data output latch 2220 may be synchronized with the clock signal INpulse having a logic "high(H)" level to output the bias data B0.0. The bias data B0.0 outputted from the data output latch 2220 may correspond to the feedback data DA_F and may be fed back to the accumulative addition logic circuit 2120 of the MAC circuit 2100.

Referring to FIG. 38, the arithmetic block 2110 of the MAC circuit 2100 may perform the MAC arithmetic operation for the first data DA1 (i.e., the elements W0.0, . . . , and W0.7) and the second data DA2 (i.e., the elements X0.0, . . . , and X7.0) to generate and output MAC interim data MAC0.0. The accumulative addition logic circuit 2120 may add the bias data B0.0 corresponding to the feedback data DA_F to the MAC interim data MAC0.0 to generate and output the MAC result data Y0.0. As such, the bias data B0.0 may be added to the MAC interim data MAC0.0 by the accumulative addition logic circuit 2120 included in the MAC circuit 2100. Accordingly, the bias addition operation may be performed even without any additional logic circuit for performing an extra bias addition operation.

Referring to FIGS. 34 and 39, the MAC result data Y0.0 including a result of the bias addition operation may be inputted to the first input terminal '0' of the data selector 2210. At the fourth point in time "T4" when the third latency L3 elapses from the third point in time "T3", the MAC output latch signal MAC_L3 having a logic "high(H)" level may be inputted to the OR gate 2240 of the data output unit 2200. In addition, the bias input latch signal BIAS_S, a logic level of which is changed from a logic "high(H)" level into a logic "low(L)" level at the second point in time "T2" may be set as a selection signal of the data selector 2210. The data selector 2210 may output the MAC result data Y0.0 received from the MAC circuit 2100 in response to the bias input latch signal BIAS_S having a logic "low(L)" level.

The delay circuit 2230 may receive the bias input latch signal BIAS_S having a logic "low(L)" level and may delay the bias input latch signal BIAS_S having a logic "low(L)"

level by a certain time to output the delayed signal of the bias input latch signal BIAS_S having a logic "low(L)" level. The OR gate 2240 may receive the MAC output latch signal MAC_L3 having a logic "high(H)" level and the bias input latch signal BIAS_S having a logic "low(L)" level outputted from the delay circuit 2230 to output the clock signal INpulse having a logic "high(H)" level. The data output latch 2220 may be synchronized with the clock signal INpulse having a logic "high(H)" level to output the MAC result data Y0.0 including a result of the bias addition operation. The output transfer circuit 2250 may be synchronized with the MAC result output latch signal MAC_L_RST having a logic "high(H)" level, which is generated at the fifth point in time "T5" when the fourth latency L4 elapses from the fourth point in time "T4", to output the MAC result data Y0.0 including a result of the bias addition operation to an external device OUT.

In the present embodiment, because the MAC result data Y0.0 including a result of the bias addition operation corresponds to the final MAC result data DA_MAC_F of the MAC arithmetic operation for the first data DA1 and the second data DA2, the MAC result data Y0.0 including a result of the bias addition operation may be transmitted to the output transfer circuit 2250. However, in some other embodiments, the MAC result data Y0.0 including a result of the bias addition operation may correspond to the feedback data. In such a case, the MAC result data Y0.0 including a result of the bias addition operation may be transmitted to the accumulative addition logic circuit 2120 illustrated in FIG. 38 again.

Figure 40:
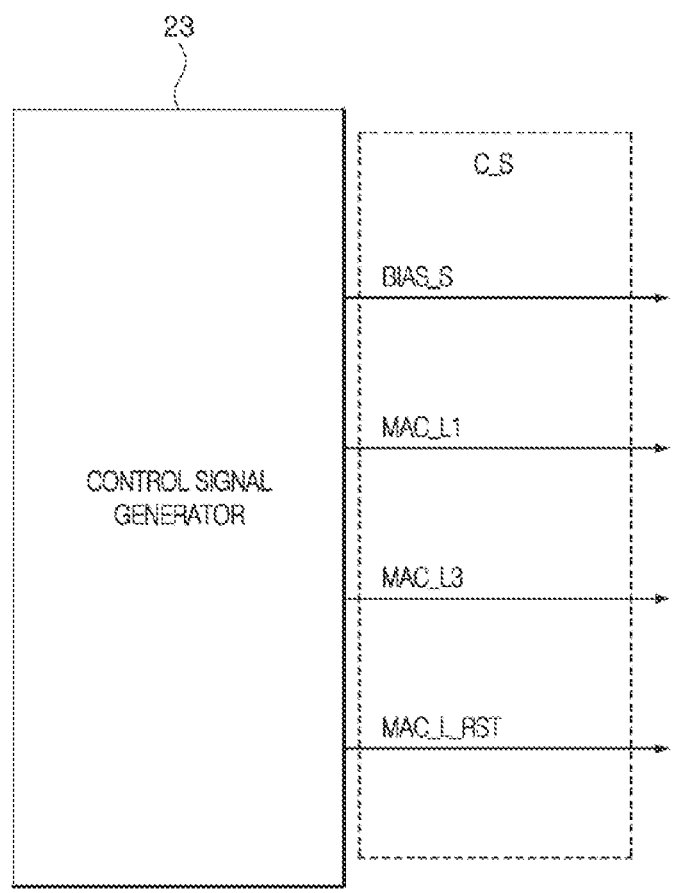
FIG. 40 illustrates another example of signals outputted from a control signal generator included in the PIM device illustrated in FIG. 31.

FIG. 40 illustrates another example of signals outputted from the control signal generator 23 included in the PIM device 20 illustrated in FIG. 31. Referring to FIG. 40, the control signal generator 23 may output various control signals C_Ss controlling operations of the arithmetic circuit (22 of FIG. 31) in response to the external command CMD provided by an external device. The control signals C_Ss may include first to fourth control signals. The first control signal may correspond to a bias input latch signal BIAS_S. The second control signal may correspond to a first MAC input latch signal MAC_L1. The third control signal may correspond to a MAC output latch signal MAC_L3. The fourth control signal may correspond to a MAC result output latch signal MAC_L_RST.

In an embodiment, the control signal generator 23 may output the bias input latch signal BIAS_S, the first MAC input latch signal MAC_L1, the MAC output latch signal MAC_L3, and the MAC result output latch signal MAC_L_RST in response to first to third commands included in the external command CMD. In the present embodiment, the control signal generator 23 may output the bias input latch signal BIAS_S in response to the first command of the external command CMD. In addition, the control signal generator 23 may sequentially output the first MAC input latch signal MAC_L1 and the MAC output latch signal MAC_L3 in response to the second command of the external command CMD. Moreover, the control signal generator 23 may output the MAC result output latch signal MAC_L_RST in response to the third command of the external command CMD.

Figure 41:
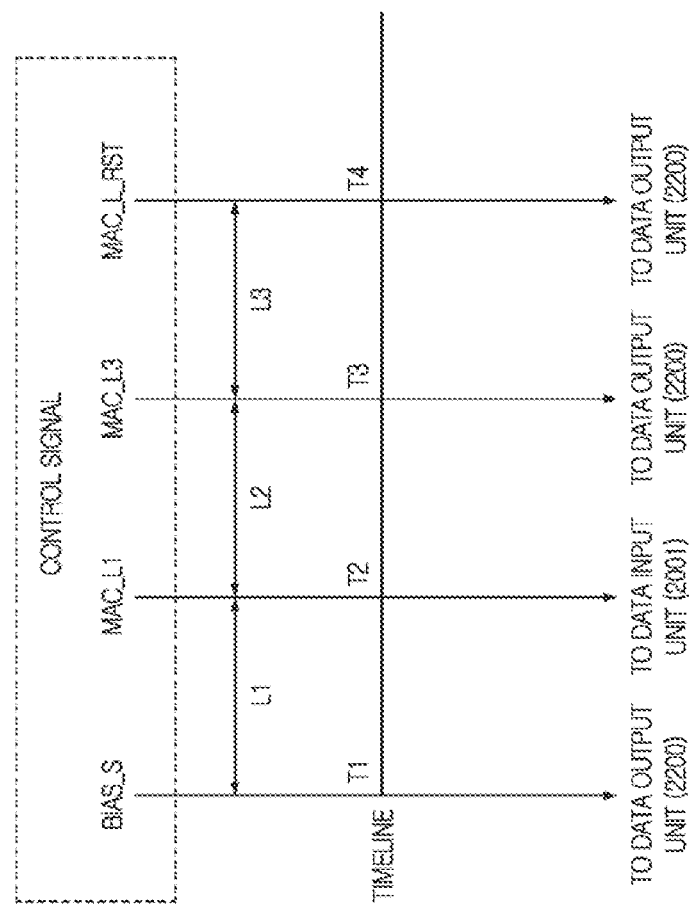
FIG. 41 is a schematic diagram illustrating output signals of the control signal generator illustrated in FIG. 40 with a timeline.

FIG. 41 illustrates the output signals BIAS_S, MAC_L1, MAC_L3, and MAC_L_RST of the control signal generator 23 illustrated in FIG. 40 with a timeline. Referring to FIGS. 40 and 41, the control signal generator 23 may output the bias input latch signal BIAS_S at a first point in time "T1". The bias input latch signal BIAS_S may be inputted to the data output unit 2200. The control signal generator 23 may output the first MAC input latch signal MAC_1 at a second point in time "T2" when a first latency L1 elapses from the first point in time "T1". The first MAC input latch signal MAC_L1 may be inputted to the data input unit 2001. The control signal generator 23 may output the MAC output latch signal MAC_L3 at a third point in time "T3" when a second latency L2 elapses from the second point in time "T2". The MAC output latch signal MAC_L3 may be inputted to the data output unit 2200. The control signal generator 23 may output the MAC result output latch signal MAC_L_RST at a fourth point in time "T4" when a third latency L3 elapses from the third point in time "T3". The MAC result output latch signal MAC_L_RST may be inputted to the data output unit 2200.

The bias input latch signal BIAS_S may be a signal for setting the bias data DA_B as initial feedback data DA_F of the data output unit 2200. The first MAC input latch signal MAC_L1 may be a signal for controlling an input latch operation of the data input unit 2001 for the first data DA1 and the second data DA2. The MAC output latch signal MAC_L3 may be a signal for controlling an output latch operation of the data output unit 2200 for data transmitted from the MAC circuit 2100 to the data output unit 2200. The MAC result output latch signal MAC_L_RST may be a signal for controlling an external output operation of the data output unit 2200 for outputting the MAC result data DA_MAC_R from the data output unit 2200.

The first latency L1 may be set as an amount of time which is necessary to initialize the feedback data DA_F as the bias data DA_B based on the bias input latch signal BIAS_S. The second latency L2 may be set as an amount of time which is necessary for the input latch operation of the data input unit 2001 for receiving the first data DA1 and the second data DA2 based on the first MAC input latch signal MAC_L1. The third latency L3 may be set as an amount of time which is necessary for the output latch operation of the data output unit 2200 for outputting data received from the MAC circuit 2100 based on the MAC output latch signal MAC_L3.

The bias input latch signal BIAS_S, the first MAC input latch signal MAC_1, the MAC output latch signal MAC_L3, and the MAC result output latch signal MAC_L_RST may be activated to have a logic "high" level. In an embodiment, the first MAC input latch signal MAC_1 and the MAC output latch signal MAC_L3 may be iteratively outputted from the control signal generator 23. Thus, the MAC arithmetic operation and the feedback process may be iteratively performed by the MAC circuit 2100 and the data output unit 2200. The first to third latencies L1, L2, and L3 may be set as predetermined inherent time periods, respectively.

Figure 42:
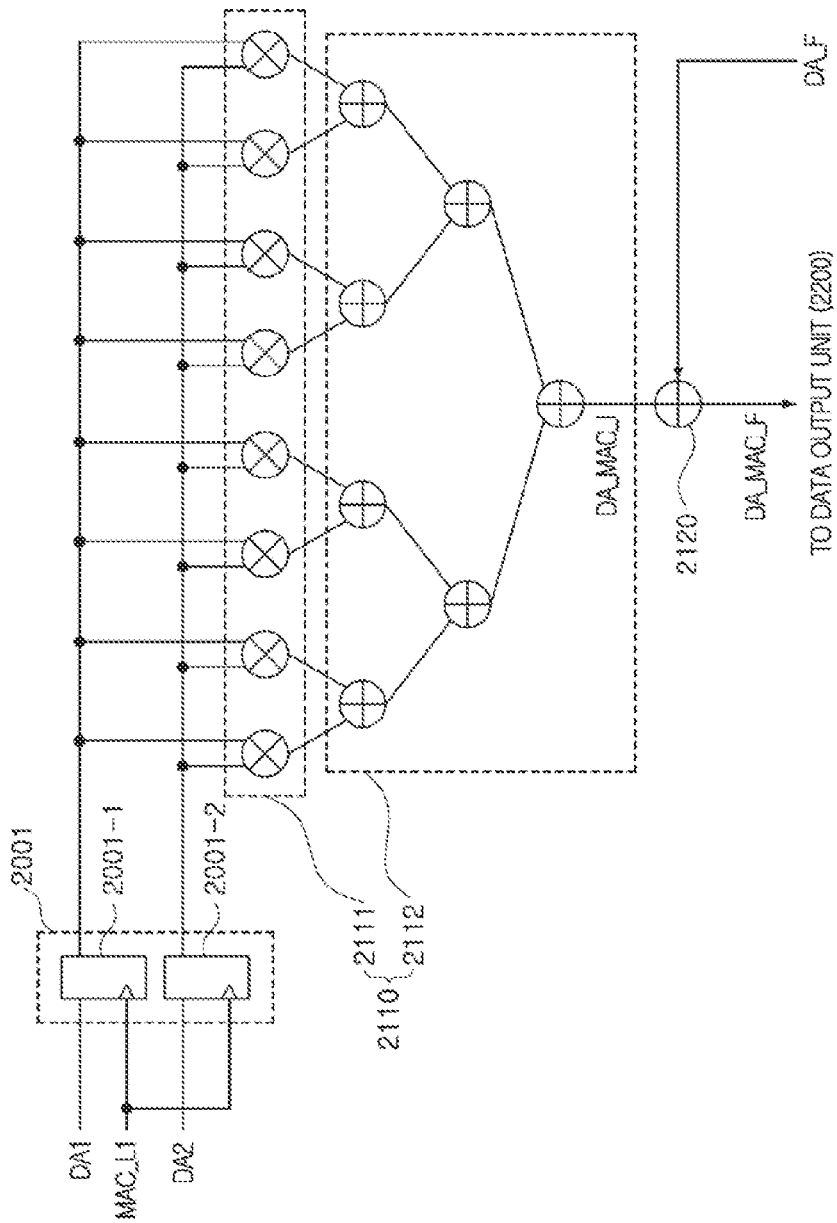
FIG. 42 illustrates an input status of some output signals of the control signal generator illustrated in FIG. 41.

FIG. 42 illustrates a configuration of a portion of the MAC operator 2000 illustrated in FIG. 31, which receives the first MAC input latch MAC_1 from the control signal generator 23 illustrated in FIG. 40. Referring to FIG. 42, both of the first input latch 2001-1 and the second input latch 2001-2 included in the data input unit 2001 may be synchronized with the first MAC input latch signal MAC_1 to simultaneously output the first data DA1 and the second data DA2 to the arithmetic block 2110. In contrast, the first input latch 2001-1 and the second input latch 2001-2 illustrated in FIG. 35 may be synchronized with respective ones of the first and second MAC input latch signals MAC_1 and MAC_L2 to sequentially output the first data DA1 and the second data DA2, as described with reference to FIG. 35. Except for the above difference, the data input unit 2001 and the MAC circuit 2100 illustrated in FIG. 42 may perform the same operation as described with reference to FIGS. 35 to 39. Thus, the descriptions of the data input unit 2001 and the MAC circuit 2100 illustrated in FIG. 42 will be omitted hereinafter.

Figure 43:
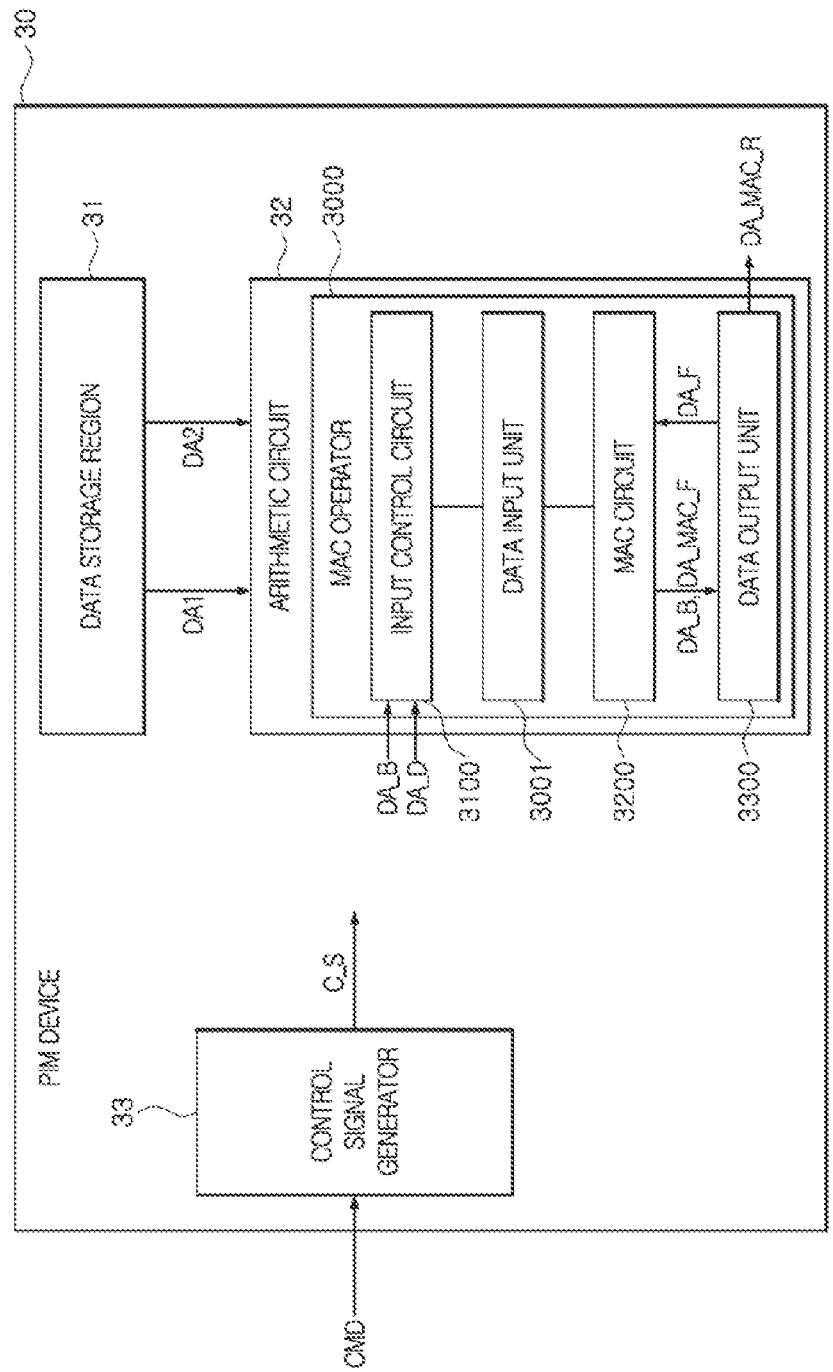
FIG. 43 is a block diagram illustrating a configuration of a PIM device according to another embodiment of the present disclosure.

FIG. 43 is a block diagram illustrating a configuration of a PIM device 30 according to another embodiment of the present disclosure. Referring to FIG. 43, the PIM device 30 may include a data storage region 31, an arithmetic circuit 32, and a control signal generator 33. The data storage region 31 may store first data DA1 and second data DA2. The arithmetic circuit 32 may perform the MAC arithmetic operation of the first data DA1 and the second data DA2 outputted from the data storage region 31 to generate a result of the MAC arithmetic operation. The control signal generator 33 may output a control signal C_S for controlling an access operation to the data storage region 31 and the MAC arithmetic operation of the arithmetic circuit 32. The control signal generator 33 may decode an external command CMD outputted from an external device (not shown) such as a host or a controller to generate and output the control signal C_S as an internal command. In an embodiment, the external command CMD may be a MAC command instructing the MAC arithmetic operation.

The data storage region 31 may have substantially the same configuration as the data storage region 11 illustrated in FIG. 1. Thus, detailed descriptions of the data storage region 31 will be omitted hereinafter. Descriptions of the PIM device 10 illustrated in FIG. 1 may also be equally applicable to the PIM device 30 illustrated in FIG. 43. For example, the PIM device 30 may operate in a memory mode or a MAC arithmetic mode, like the PIM device 10 illustrated in FIG. 1.

The arithmetic circuit 32 may include at least one MAC operator 3000. The MAC operator 3000 may include an input control circuit 3100, a data input unit 3001, a MAC circuit 3200, and a data output unit 3300.

The input control circuit 3100 may receive the first data DA1 and the second data DA2 from the data storage region 31 and may also receive bias data DA_B and bias detection data DA_D from an external device. The external device may correspond to the data storage region 31 or an external data memory coupled to the PIM device 30. The bias detection data DA_D may be comprised of elements for setting a result value of the MAC arithmetic operation performed with the bias data DA_B as bias data B0.0. The input control circuit 3100 may be configured to supply the first and second data DA1 and DA2 to the data input unit 3001. In addition, the input control circuit 3100 may be configured to supply first preliminary data and second preliminary data to the data input unit 3001 before supplying the first and second data DA1 and DA2 to the data input unit 3001. A result value of the MAC arithmetic operation for the first preliminary data and the second preliminary data may be set as the bias data DA_B. In an embodiment, the bias detection data DA_D and the bias data DA_B may correspond to the first preliminary data and the second preliminary data, respectively. In such a case, before the first and second data DA1 and DA2 are supplied to the MAC circuit 3200, the bias data DA_B and the bias detection data DA_D may be supplied to the MAC circuit 3200.

The data input unit 3001 may receive and latch data which are outputted from the input control circuit 3100 and may output the latched data to the MAC circuit 3200. The MAC circuit 3200 may perform the MAC arithmetic operation of the first data DA1 and the second data DA2, which are outputted from the data input unit 3001, to generate and output MAC result data. The MAC circuit 3200 may perform the MAC arithmetic operation of the bias data DA_B and the bias detection data DA_D, which are outputted from the input control circuit 3100, to output a result of the MAC arithmetic operation before performing the MAC arithmetic operation of the first data DA1 and the second data DA2. In an embodiment, the bias data DA_B may be generated as a result of the MAC arithmetic operation of the bias data DA_B and the bias detection data DA_D. In addition, the MAC circuit 3200 may add feedback data DA_F to the MAC result data to generate and output MAC result data DA_MAC_F. In an embodiment, first feedback data DA_F may correspond to the bias data DA_B. Thus, the MAC circuit 3200 may output the MAC result data generated by addition of the first feedback data DA_F as the MAC result data DA_MAC_F.

The data output unit 3300 may latch the data received from the MAC circuit 3200. The data output unit 3300 may receive the bias data DA_B from the MAC circuit 3200 before the MAC circuit 3200 performs the MAC arithmetic operation of the first data DA1 and the second data DA2. The data output unit 3300 may output the bias data DA_B received from the MAC circuit 3200 as the feedback data DA_F which are transmitted to the MAC circuit 3200. In addition, the data output unit 3300 may receive the MAC result data DA_MAC_F, which are generated by addition of the feedback data DA_F, from the MAC circuit 3200. The data output unit 3300 may output the MAC result data DA_MAC_F as MAC result data DA_MAC_R corresponding to final MAC result data.

In an embodiment, the MAC arithmetic operation may be iteratively performed at least twice. For example, when an amount of the first data DA1 and the second data DA2 is larger than an amount of data which are able to be processed by the MAC circuit 3200 at once, the MAC arithmetic operation may be iteratively performed until arithmetic operations for all of the first data DA1 and the second data DA2 terminate. In such a case, the MAC circuit 3200 may output the MAC result data DA_MAC_F which are obtained by adding the feedback data DA_F outputted from the data output unit 3300 to the previous MAC result data. The data output unit 3300 may output the MAC result data DA_MAC_F, which are obtained by adding the feedback data DA_F to the previous MAC result data, as the feedback data DA_F which are transmitted to the MAC circuit 3200 again. These processes may be executed until all of the arithmetic operations for the first data DA1 and the second data DA2 terminate. That is, the MAC arithmetic operation of the MAC circuit 3200 for the first data DA1 and the second data DA2 and the feedback process of the data output unit 3300 may be iteratively performed until the arithmetic operations for all of the first data DA1 and the second data DA2 terminate. Although the following embodiments are described in conjunction with a case that the MAC arithmetic operation is iteratively performed, the following embodiments may be equally applicable to even a case that the MAC arithmetic operation is performed only once.

According to the PIM device 30, initial feedback data of the data output unit 3300 may be set as the bias data DA_B. Thus, before a first MAC arithmetic operation of the MAC circuit 3200 for the first data DA1 and the second data DA2 is performed, the data output unit 3300 may receive the bias data DA_B from the MAC circuit 3200 and may output the bias data DA_B as the feedback data DA_F which are transmitted to the MAC circuit 3200. In order to set the initial feedback data of the data output unit 3300 as the bias data DA_B, the MAC circuit 3200 may add the bias data DA_B corresponding to the first feedback data DA_F to a result of the first MAC arithmetic operation to generate and output the MAC result data DA_MAC_F after the first MAC arithmetic operation of the MAC circuit 3200 for the first data DA1 and the second data DA2 is performed. Thus, according to the PIM device 30, the bias data DA_B may be added to the result data of the first MAC arithmetic operation. Accordingly, it may be unnecessary to perform an extra adding operation for adding the bias data DA_B to the MAC result data DA_MAC_R generated by termination of the MAC arithmetic operation.

In general, after a MAC result matrix is generated by the MAC arithmetic operation of the weight matrix and the vector matrix, a matrix adding operation for adding a bias matrix to the MAC result matrix may be performed. The matrix adding operation may be generally performed using a bias adder. However, according to the PIM device 30 illustrated in FIG. 43, the bias data DA_B may be set as the initial feedback data DA_F of the data output unit 3300. Thus, the data output unit 3300 may output the bias data DA_B employed as the first feedback data DA_F which are transmitted to the MAC circuit 3200. The bias data DA_B, which are fed back to the MAC circuit 3200, may be added to first MAC interim data generated by the MAC circuit 3200. Accordingly, an additional bias adder is not required because the bias data DA_B are added to the first MAC interim data during the MAC arithmetic operation.

Figure 44:
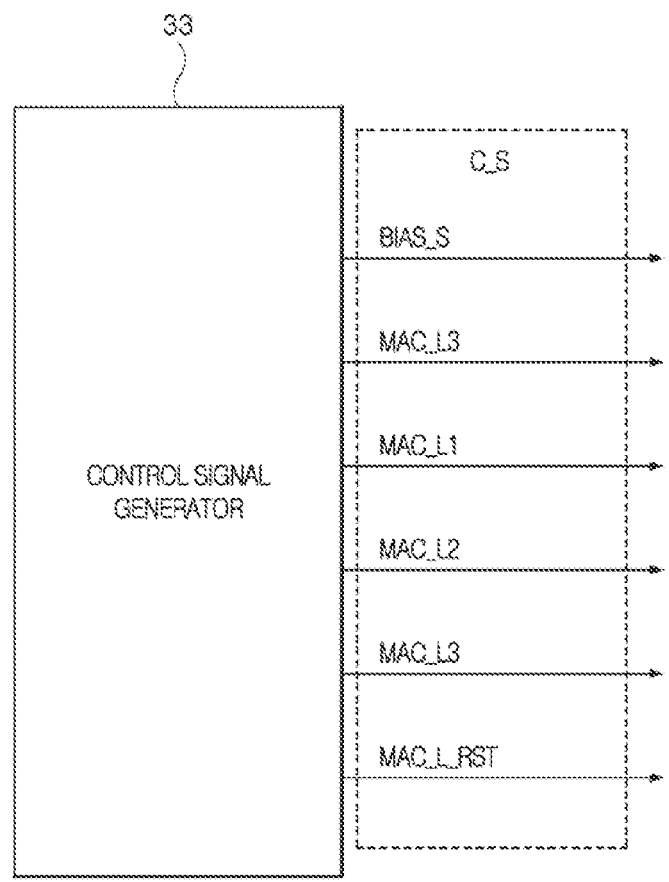
FIG. 44 illustrates an example of signals outputted from a control signal generator included in the PIM device illustrated in FIG. 43.

FIG. 44 illustrates an example of signals outputted from the control signal generator 33. Referring to FIG. 44, the control signal generator 33 may output various control signals C_Ss controlling operations of the arithmetic circuit (32 of FIG. 43) in response to the external command CMD. The control signals C_Ss may include first to sixth control signals. The first control signal may correspond to a bias input latch signal BIAS_S. The second control signal may correspond to a MAC output latch signal MAC_L3. The third control signal may correspond to a first MAC input latch signal MAC_L1. The fourth control signal may correspond to a second MAC input latch signal MAC_L2. The fifth control signal may correspond to the MAC output latch signal MAC_L3. The sixth control signal may correspond to a MAC result output latch signal MAC_L_RST.

In an embodiment, the control signal generator 33 may output the bias input latch signal BIAS_S, the MAC output latch signal MAC_L3, the first MAC input latch signal MAC_1, the second MAC input latch signal MAC_L2, the MAC output latch signal MAC_L3, and the MAC result output latch signal MAC_L_RST in response to first to third commands included in the external command CMD. In the present embodiment, the control signal generator 33 may sequentially output the bias input latch signal BIAS_S and the MAC output latch signal MAC_L3 at a certain time interval in response to the first command of the external command CMD. In addition, the control signal generator 33 may sequentially output the first MAC input latch signal MAC_L1, the second MAC input latch signal MAC_L2, and the MAC output latch signal MAC_L3 at a certain time interval in response to the second command of the external command CMD. Moreover, the control signal generator 33 may output the MAC result output latch signal MAC_L_RST in response to the third command of the external command CMD.

Figure 45:
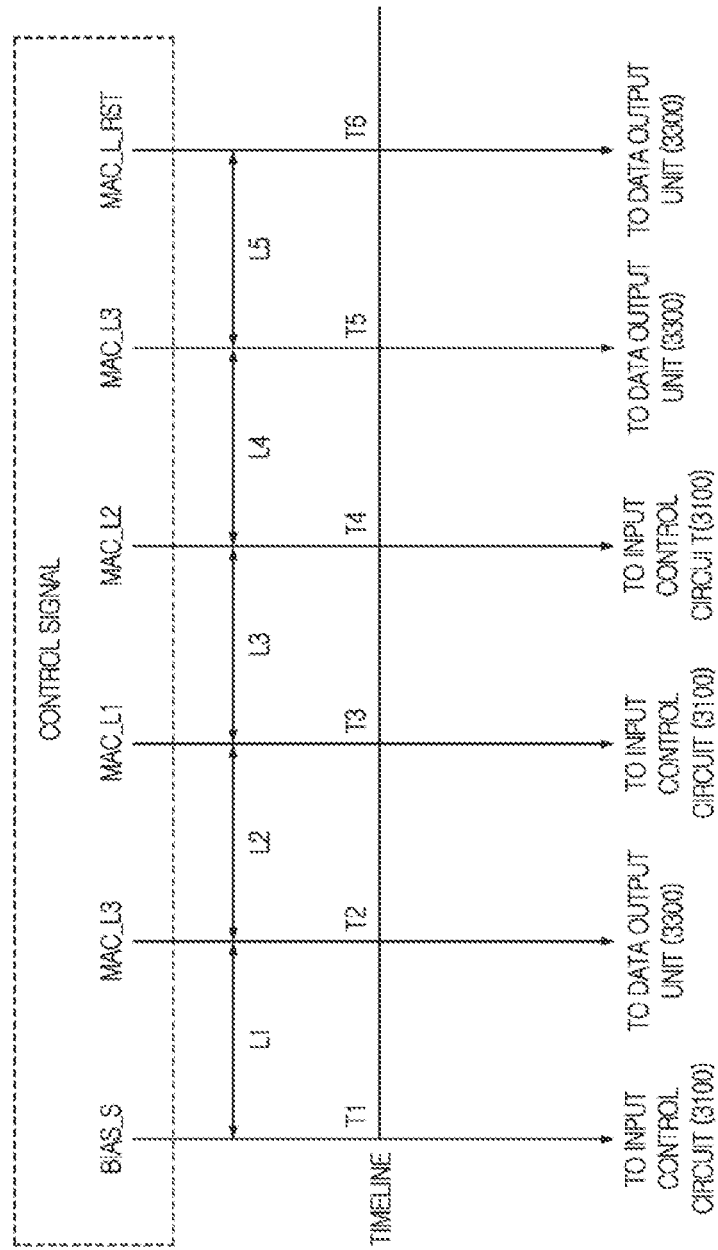
FIG. 45 is a schematic diagram illustrating output signals of the control signal generator illustrated in FIG. 44 with a timeline.

FIG. 45 illustrates the output signals BIAS_S, MAC_L1, MAC_L-2, MAC_L3, and MAC_L_RST of the control signal generator 33 illustrated in FIG. 44 with a timeline. Referring to FIGS. 44 and 45, the control signal generator 33 may output the bias input latch signal BIAS_S at a first point in time "T1". The bias input latch signal BIAS_S may be inputted to the input control circuit 3100. The control signal generator 33 may output the MAC output latch signal MAC_L3 at a second point in time "T2" when a first latency L1 elapses from the first point in time "T1". The MAC output latch signal MAC_L3 may be inputted to the data output unit 3300. The control signal generator 33 may output the first MAC input latch signal MAC_L1 at a third point in time "T3" when a second latency L2 elapses from the second point in time "T2". The first MAC input latch signal MAC_1 may be inputted to the input control circuit 3100. The control signal generator 33 may output the second MAC input latch signal MAC_L2 at a fourth point in time "T4" when a third latency L3 elapses from the third point in time "T3". The second MAC input latch signal MAC_L2 may be inputted to the input control circuit 3100. The control signal generator 33 may output the MAC output latch signal MAC_L3 to the data output unit 3300 again at a fifth point in time "T5" when a fourth latency L4 elapses from the fourth point in time "T4". The control signal generator 33 may output the MAC result output latch signal MAC_L_RST at a sixth point in time "T6" when a fifth latency L5 elapses from the fifth point in time "T5". The MAC result output latch signal MAC_L_RST may be inputted to the data output unit 3300.

The bias input latch signal BIAS_S may be a signal for setting an initial value of the bias data DA_B. The first MAC input latch signal MAC_L1 may be a signal for controlling an input latch operation of the data input unit 3001 for the first data DA1. The second MAC input latch signal MAC_L2 may be a signal for controlling an input latch operation of the data input unit 3001 for the second data DA2. The MAC output latch signal MAC_L3 may be a signal for controlling an output latch operation of the data output unit 3300 for data transmitted from the MAC circuit 3200 to the data output unit 3300. The MAC result output latch signal MAC_L_RST may be a signal for controlling an external output operation of the data output unit 3300 for outputting the MAC result data DA_MAC_R from the data output unit 3300.

The bias input latch signal BIAS_S, the first and second MAC input latch signals MAC_1 and MAC_L2, the MAC output latch signal MAC_L3, and the MAC result output latch signal MAC_L_RST may be activated to have a logic "high" level. In an embodiment, the second to fifth control signals (i.e., the MAC output latch signal MAC_L-3, the first and second MAC input latch signals MAC_L1 and MAC_L2, and the MAC output latch signal MAC_L3) may be iteratively outputted from the control signal generator 33. Thus, the MAC arithmetic operation and the feedback process may be iteratively performed by the MAC circuit 3200 and the data output unit 3300.

The first latency L1 may be set as an amount of time it takes to input the bias data into the data output unit 3300 based on the bias input latch signal BIAS_S. The second latency L2 may be set as an amount of time which is necessary to transmit the bias data corresponding to the first feedback data from the data output unit 3300 to the MAC circuit 3200 based on the MAC output latch signal MAC_L3. The third latency L3 may be set as an amount of time which is necessary for the input latch operation of the first data DA1 based on the first MAC input latch signal MAC_L1. The fourth latency L4 may be set as an amount of time which is necessary for the input latch operation of the second data DA2 based on the second MAC input latch signal MAC_L2 and necessary for the MAC arithmetic operation of the first and second data DA1 and DA2. The fifth latency L5 may be set as an amount of time which is necessary for the output latch operation of the data output unit 3300 for outputting the MAC result data, which are received from the MAC circuit 3200, based on the MAC output latch signal MAC_L3. The first to fifth latencies L1, L2, L3, L4, and L5 may be set as predetermined inherent time periods, respectively.

Figure 46:
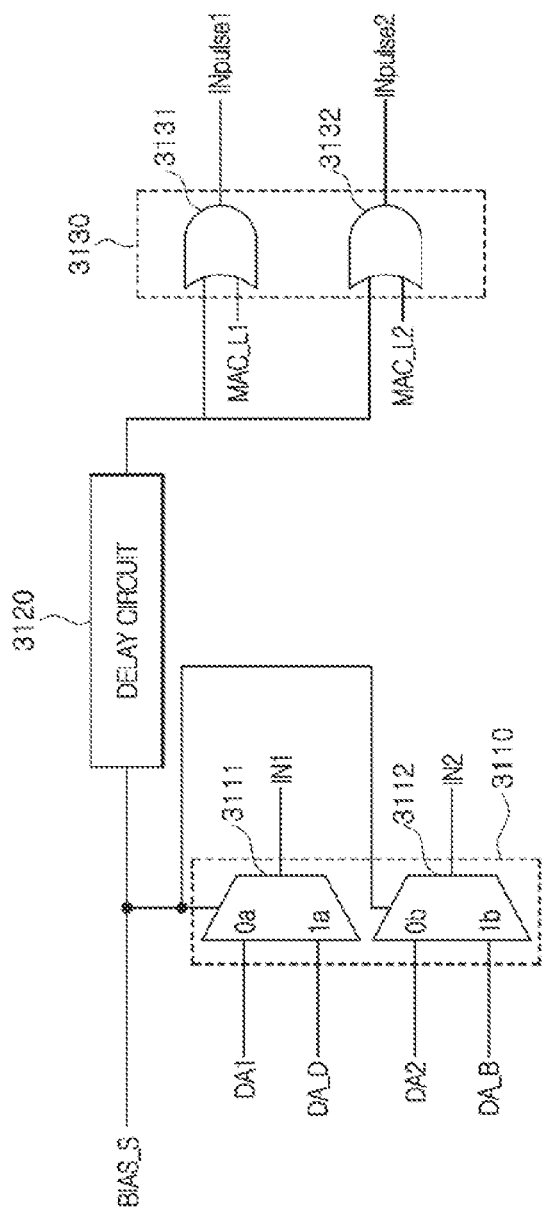
FIGS. 46 to 48 illustrate an example of low-order elements of a MAC operator included in the PIM device illustrated in FIG. 43.

FIG. 46 illustrates a configuration of the input control circuit 3100. Referring to FIG. 46, the input control circuit 3100 may include a data selection output circuit 3110, a delay circuit 3120, and a signal output circuit 3130. The data selection output circuit 3110 may output both of the first and second data DA1 an DA2 or both of the bias data DA_B and the bias detection data DA_D according to the bias input latch signal BIAS_S corresponding to a selection signal. The delay circuit 3120 may receive and delay the bias input latch signal BIAS_S by a certain time to output the delayed signal of the bias input latch signal BIAS_S. The signal output circuit 3130 may receive an output signal of the delay circuit 3120 and the first and second MAC input latch signals MAC_1 and MAC_L2 to generate and output a clock signal.

Specifically, the data selection output circuit 3110 may include a first data selector 3111 and a second data selector 3112 that receive the bias input latch signal BIAS_S as a selection signal. The first data selector 3111 may have a first input terminal '0a', a second input terminal '1a', and an output terminal. The second data selector 3112 may have a first input terminal '0b', a second input terminal '1b', and an output terminal. The first data DA1 may be inputted to the first input terminal '0a' of the first data selector 3111, and the bias detection data DA_D corresponding to the first preliminary data may be inputted to the second input terminal '1a' of the first data selector 3111. The first data DA1 or the bias detection data DA_D may be selectively outputted as first input data IN1 through the output terminal of the first data selector 3111. The second data DA2 may be inputted to the first input terminal '0b' of the second data selector 3112, and the bias data DA_B corresponding to the second preliminary data may be inputted to the second input terminal '1b' of the second data selector 3112. The second data DA2 or the bias data DA_B may be selectively outputted as second input data IN2 through the output terminal of the second data selector 3112.

In an embodiment, the first data selector 3111 may selectively output the bias detection data DA_D as the first input data IN1 when the bias input latch signal BIAS_S has a logic "high" level. The second data selector 3112 may selectively output the bias data DA_B as the second input data IN2 when the bias input latch signal BIAS_S has a logic "high" level. The first data selector 3111 may selectively output the first data DA1 as the first input data IN1 when the bias input latch signal BIAS_S has a logic "low" level. The second data selector 3112 may selectively output the second data DA2 as the second input data IN2 when the bias input latch signal BIAS_S has a logic "low" level. As such, the bias input latch signal BIAS_S may be set as a control signal for selectively outputting both of the first and second data DA1 and DA2 from the input control circuit 3100 or for selectively outputting both of the bias data DA_B and the bias detection data DA_D from the input control circuit 3100.

The signal output circuit 3130 may include a first OR gate 3131 and a second OR gate 3132. The first OR gate 3131 may receive an output signal of the delay circuit 3120 and the first MAC input latch signal MAC_1 and may perform a logical OR operation of the output signal of the delay circuit 3120 and the first MAC input latch signal MAC_L1 to generate and output a first clock signal INpulse1. The second OR gate 3132 may receive the output signal of the delay circuit 3120 and the second MAC input latch signal MAC_L2 and may perform a logical OR operation of the output signal of the delay circuit 3120 and the second MAC input latch signal MAC_L2 to generate and output a second clock signal INpulse2. Each of the first and second OR gates 3131 and 3132 may output a signal having a logic "high" level when at least one of two input signals has a logic "high" level and may output a signal having a logic "low" level when both of two input signals have a logic "low" level. In an embodiment, the first MAC input latch signal MAC_1 may be set as a control signal for transmitting the first data DA1 from the data input unit 3001 to an arithmetic block (3210 of FIG. 47) of the MAC circuit 3200. The second MAC input latch signal MAC_L2 may be set as a control signal for transmitting the second data DA2 from the data input unit 3001 to the arithmetic block (3210 of FIG. 47) of the MAC circuit 3200.

Figure 47:
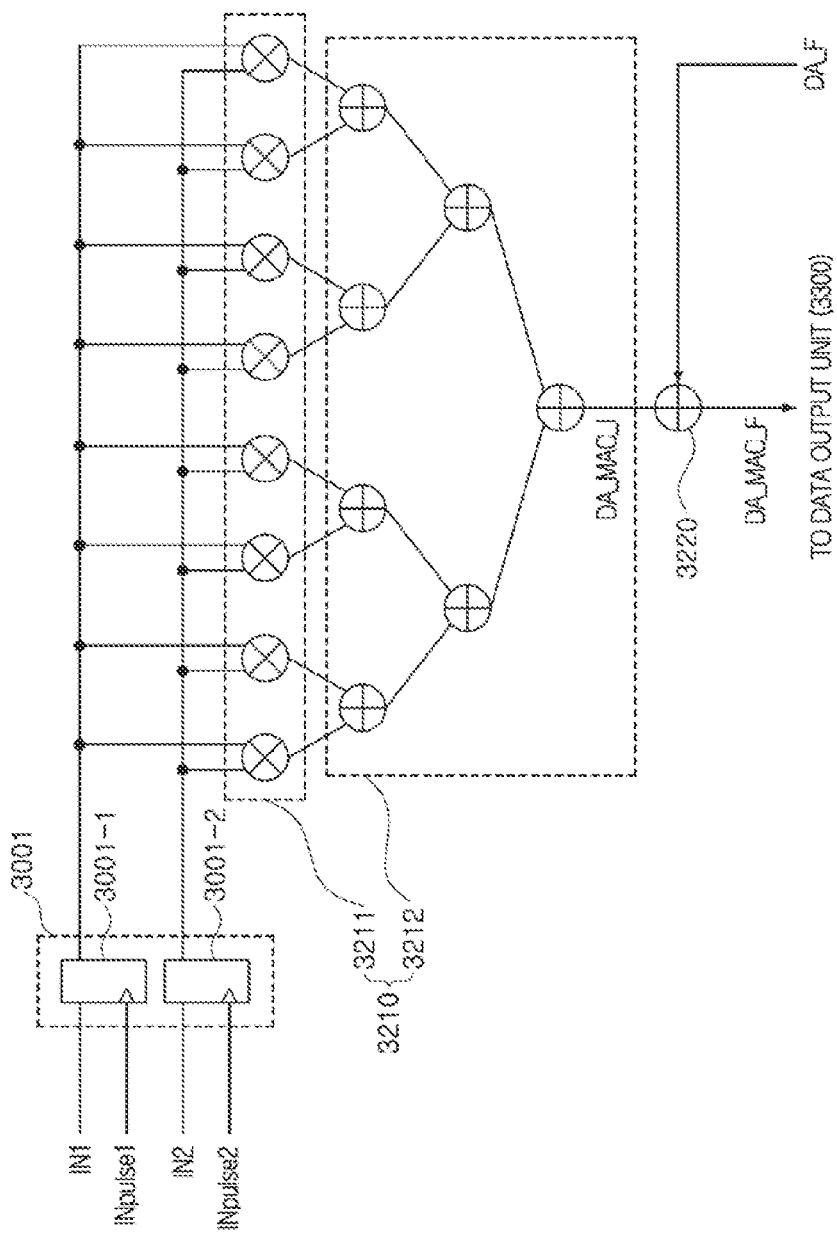

FIG. 47 illustrates configurations of the data input unit 3001 and the MAC circuit 3200 illustrated in FIG. 43. Referring to FIG. 47, the data input unit 3001 may receive and latch the first and second input data IN1 and IN2 outputted from the input control circuit 3100. The MAC circuit 3200 may include the arithmetic block 3210 and an accumulative addition logic circuit 3220. The arithmetic block 3210 may perform the MAC arithmetic operation of the data outputted from the data input unit 3001. The accumulative addition logic circuit 3220 may add the feedback data DA_F to MAC interim data DA_MAC_I outputted from the arithmetic block 3210 to generate and output the MAC result data DA_MAC_F.

Specifically, the data input unit 3001 may include a first input latch 3001-1 and a second input latch 3001-2. The first input latch 3001-1 may receive and latch the first input data IN1. The first input latch 3001-1 may be synchronized with the first clock signal INpulse1 to output the first input data IN1 to the arithmetic block 3210 of the MAC circuit 3200. The second input latch 3001-2 may receive and latch the second input data IN2. The second input latch 3001-2 may be synchronized with the second clock signal INpulse2 to output the second input data IN2 to the arithmetic block 3210 of the MAC circuit 3200. In an embodiment, before the first and second data DA1 and DA2 are transmitted from the data input unit 3001 to the arithmetic block 3210, the bias data DA_B and the bias detection data DA_D may be transmitted from the data input unit 3001 to the arithmetic block 3210.

The arithmetic block 3210 may perform the MAC arithmetic operation of the first and second input data IN1 and IN2 to generate and output the MAC interim data DA_MAC_I. The MAC arithmetic operation may be iteratively performed at least twice. As a result, multiple sets of the MAC interim data DA_MAC_I may be generated. In an embodiment, the arithmetic block 3210 may perform the MAC arithmetic operation of the bias data DA_B and the bias detection data DA_D to output the bias data DA_B before performing the MAC arithmetic operation of the first and second data DA1 and DA2 to output a result of the MAC arithmetic operation of the first and second data DA1 and DA2. The arithmetic block 3210 may include a multiplication logic circuit 3211 and an addition logic circuit 3212. The multiplication logic circuit 3211 and the addition logic circuit 3212 may be realized to have substantially the same configuration as the multiplication logic circuit 222-1 and the addition logic circuit 222-2 described with reference to FIG. 7, respectively. Thus, detailed descriptions of the multiplication logic circuit 3211 and the addition logic circuit 3212 will be omitted hereinafter.

Figure 48:
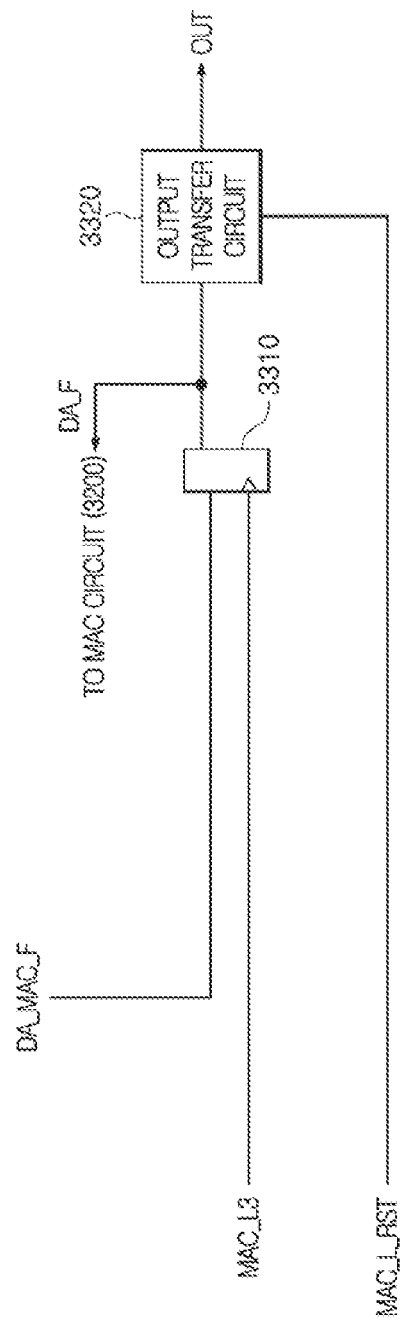

FIG. 48 illustrates a configuration of the data output unit 3300 illustrated in FIG. 43. Referring to FIG. 48, the data output unit 3300 may include a data output latch 3310 and an output transfer circuit 3320. The data output latch 3310 may receive and latch the data (e.g., the bias data DA_B or the MAC result data DA_MAC_F) outputted from the MAC circuit 3200. The data output latch 3310 may be synchronized with the MAC output latch signal MAC_L3 to output the data which are received from the MAC circuit 3200.

When the bias data DA_B are transmitted from the MAC circuit 3200 to the data output latch 3310 before the MAC arithmetic operation of the first and second data DA1 and DA2 is performed, the data output latch 3310 may be synchronized with the MAC output latch signal MAC_L3 to output the bias data DA_B. The bias data DA_B outputted from the data output latch 3310 may correspond to the feedback data DA_F and may be transmitted to the accumulative addition logic circuit 3220 illustrated in FIG. 47 before the MAC arithmetic operation of the first and second data DA1 and DA2 is performed. As such, the MAC output latch signal MAC_L3 may be set as a control signal for outputting data, which are inputted to the data output latch 3310, from the data output latch 3310.

When the MAC result data DA_MAC_F are transmitted from the MAC circuit 3200 to the data output latch 3310, the data output latch 3310 may be synchronized with the MAC output latch signal MAC_L3 to output the MAC result data DA_MAC_F. The MAC result data DA_MAC_F outputted from the data output latch 3310 may correspond to the feedback data DA_F. In such a case, the feedback data DA_F may be fed back to the accumulative addition logic circuit 3220 illustrated in FIG. 47 and may also be inputted to the output transfer circuit 3320. The output transfer circuit 3320 may receive data outputted from the data output latch 3310. The output transfer circuit 3320 may be synchronized with the MAC result output latch signal MAC_L_RST to output the data received from the data output latch 3310 to an external device OUT.

Figure 49:
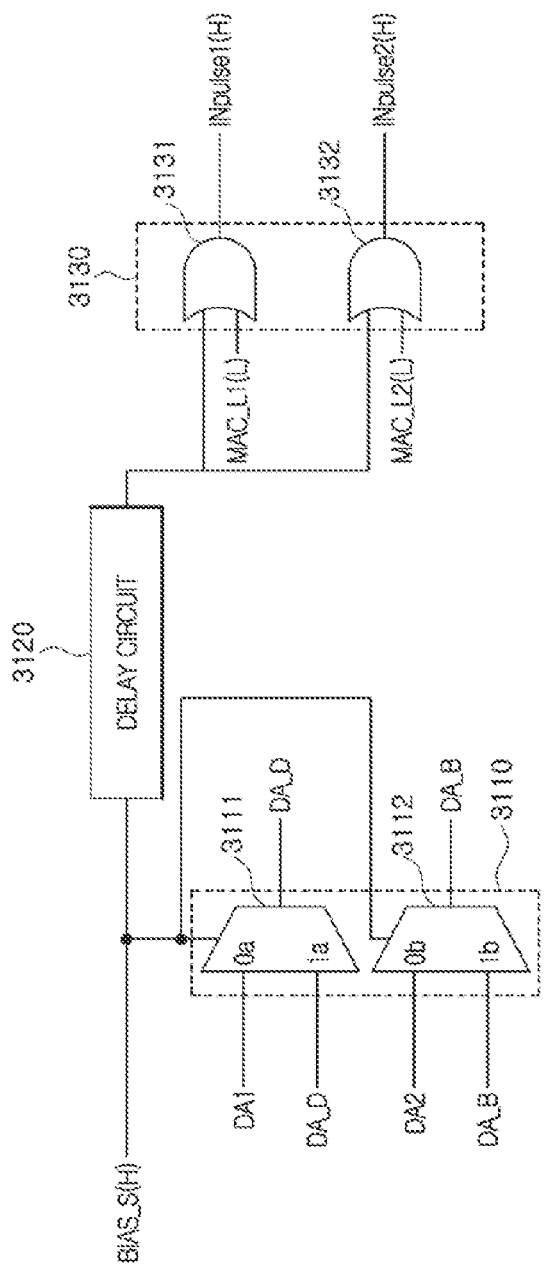
FIGS. 49 to 54 illustrate arithmetic operations and data flow of the PIM device illustrated in FIG. 43.
Figure 50:
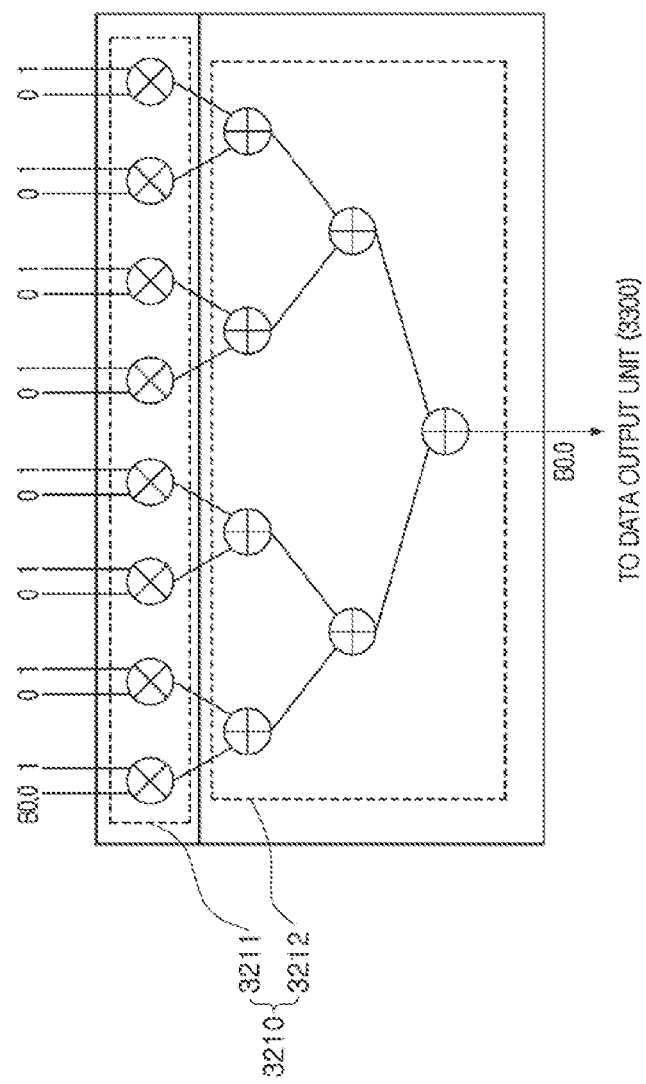
Figure 51:
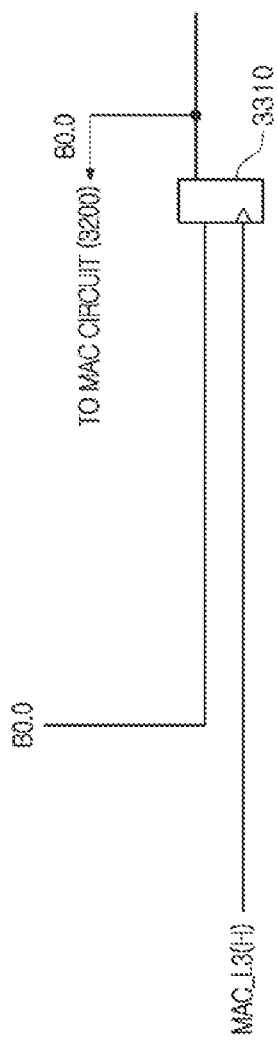
Figure 52:
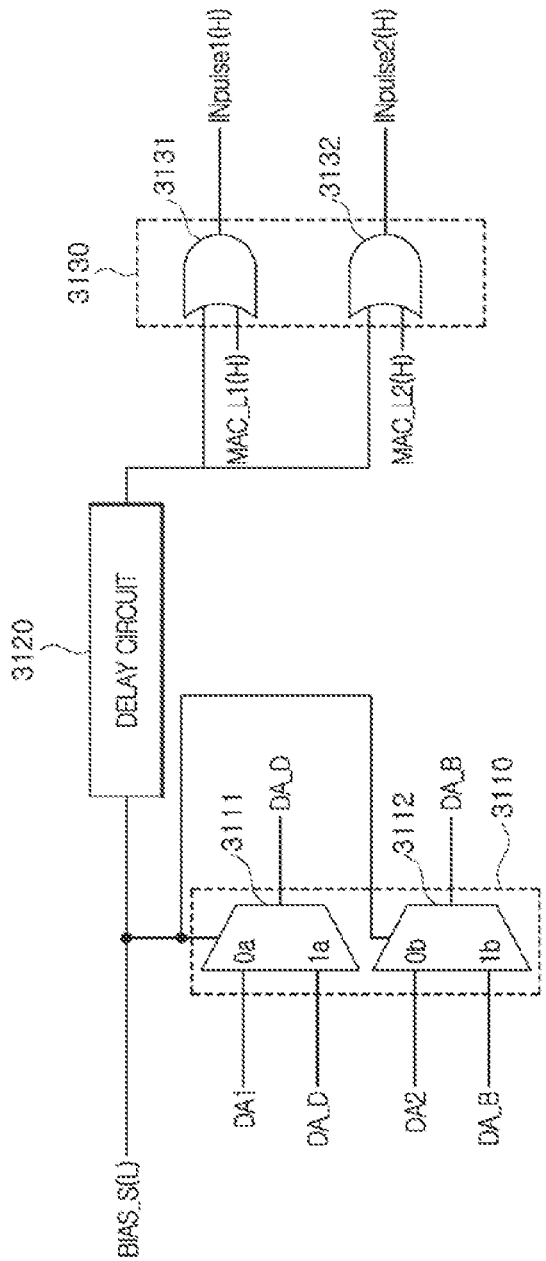
Figure 53:
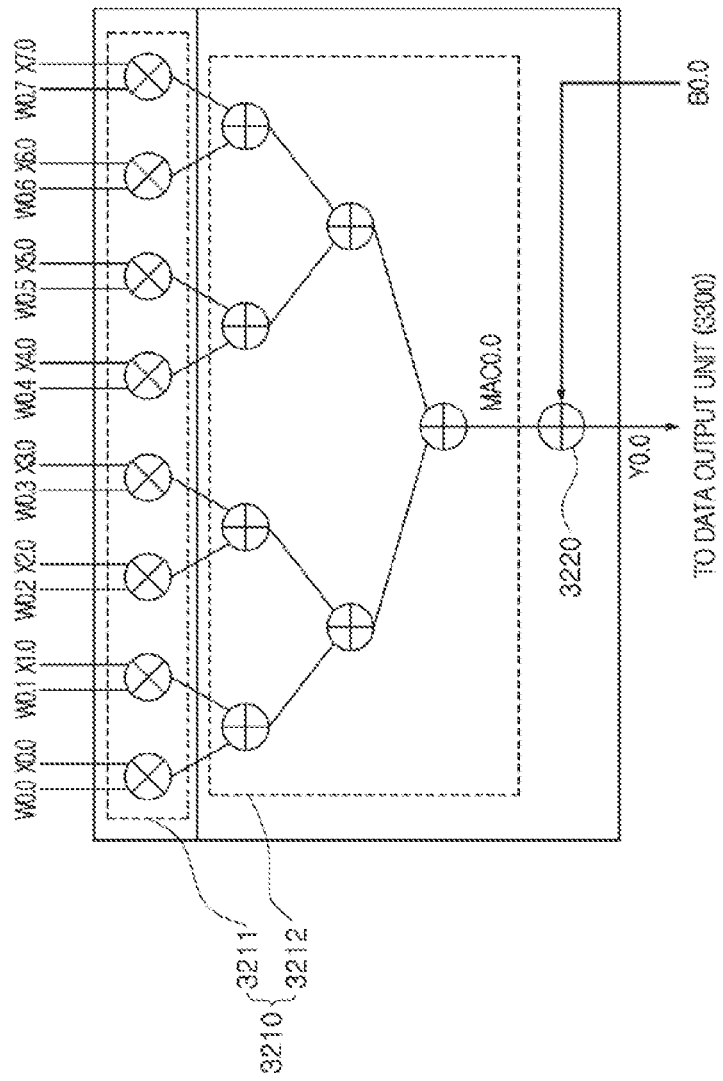
Figure 54:
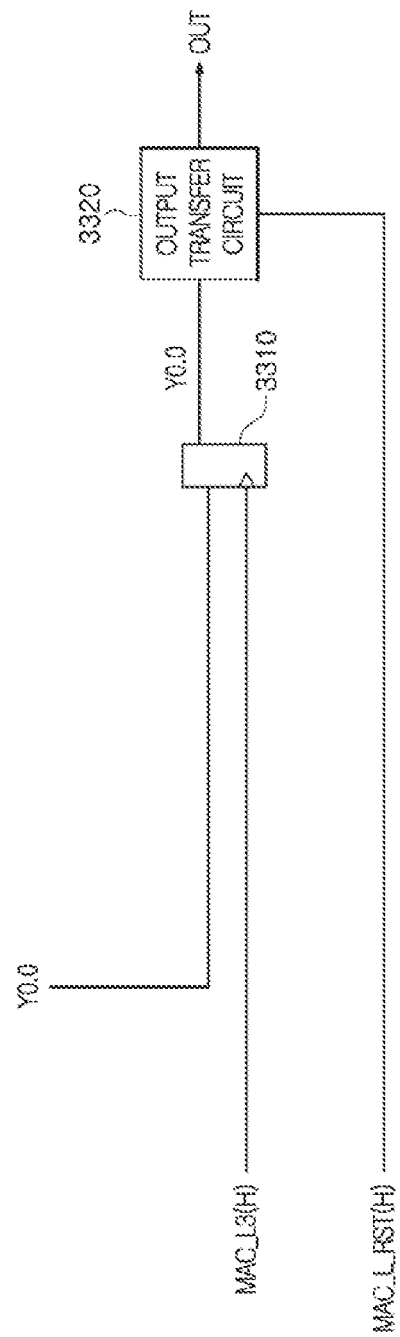

FIGS. 49 to 54 illustrate arithmetic operations and data flow of the PIM device 30 illustrated in FIG. 43. Specifically, FIG. 49 illustrates data or signals outputted from the input control circuit 3100 based on the bias input latch signal BIAS_S having a logic "high(H)" level, FIG. 50 illustrates the MAC arithmetic operation of the MAC circuit 3200 for the bias data DA_B and the bias detection data DA_D, and FIG. 51 illustrates an initialization process and a feedback process of the bias data in the data output unit 3300. In addition, FIG. 52 illustrates data or signals outputted from the input control circuit 3100 based on the bias input latch signal BIAS_S having a logic "low(L)" level, FIG. 53 illustrates the MAC arithmetic operation of the MAC circuit 3200 for the first data DA1 and the second data DA2, and FIG. 54 illustrates a data output process of the data output unit 3300 for the MAC result data generated by the MAC arithmetic operation of the first and second data DA1 and DA2. In FIGS. 49 to 54, some elements, which are unrelated with the description of the present embodiment, among all of elements included in the input control circuit 3100, the MAC circuit 3200, and the data output unit 3300 are not illustrated.

In the present embodiment, for the purpose of ease and convenience in explanation, it may be assumed that the first data DA1 are set as the elements W0.0, . . . , and W0.7 arrayed in the first row of the '8×8' weight matrix described with reference to FIG. 32 and the second data DA2 are set as the elements X0.0, . . . , and X7.0 of the '8×1' vector matrix described with reference to FIG. 32. In addition, it may be assumed that the bias data DA_B are set as the element B0.0 arrayed in the first row of the '8×1' bias matrix described with reference to FIG. 32 and the bias detection data DA_D are set as data of "1".

Referring to FIGS. 45 and 49, before the MAC arithmetic operation of the first and second data DA1 and DA2 is performed, the bias detection data DA_D may be inputted to the second input terminal "1a" of the first data selector 3111 and the bias data DA_B may be inputted to the second input terminal "1b" of the second data selector 3112. If the bias input latch signal BIAS_S having a logic "high(H)" level is inputted to the input control circuit 3100 at the first point in time "T1", the bias input latch signal BIAS_S having a logic "high(H)" level may be set as a selection signal of the first and second data selectors 3111 and 3112. In such a case, the first data selector 3111 may output the bias detection data DA_D received through the second input terminal "1a" thereof as output data, and the second data selector 3112 may output the bias data DA_B received through the second input terminal "1b" thereof as output data. The bias input latch signal BIAS_S having a logic "high(H)" level may be inputted to the first and second OR gates 3131 and 3132 of the signal output circuit 3130 through the delay circuit 3120.

The first and second MAC input latch signals MAC_L1 and MAC_L2 may maintain a logic "low(L)" level. Thus, the first OR gate 3131 may receive the bias input latch signal BIAS_S having a logic "high(H)" level and the first MAC input latch signal MAC_1 having a logic "low(L)" level to generate and output the first clock signal INpulse1 having a logic "high(H)" level, and the second OR gate 3132 may receive the bias input latch signal BIAS_S having a logic "high(H)" level and the second MAC input latch signal MAC_L2 having a logic "low(L)" level to generate and output the second clock signal INpulse2 having a logic "high(H)" level.

Referring to FIG. 50, the arithmetic block 3210 of the MAC circuit 3200 may perform the MAC arithmetic operation of the bias data B0.0 and the bias detection data DA_D to output the bias data B0.0 as a result of the MAC arithmetic operation. During the initialization process of the bias data, no feedback data are inputted to the accumulative addition logic circuit 3220. Thus, the bias data B0.0 outputted from the arithmetic block 3210 may be outputted from the MAC circuit 3200 without being processed by the accumulative addition logic circuit 3220. Even though the bias data B0.0 are inputted to the accumulative addition logic circuit 3220, the accumulative addition logic circuit 3220 may output the bias data B0.0 as it is.

Referring to FIGS. 45 and 51, the bias data B0.0 outputted from the MAC circuit 3200 may be inputted to the data output latch 3310. Thus, the bias data B0.0 may be set as an initial value of the data output latch 3310. At the second point in time "T2" when the first latency L1 elapses from the first point in time "T1", the MAC output latch signal MAC_L3 may be inputted to the data output latch 3310. The data output latch 3310 may be synchronized with the MAC output latch signal MAC_L3 to output the bias data B0.0. The bias data B0.0 outputted from the data output latch 3310 may correspond to the feedback data DA_F and may be transmitted to the accumulative addition logic circuit 3220 of the MAC circuit 3200. Accordingly, the initialization of the bias data may be executed by the above process.

Referring to FIGS. 45 and 52, after the initialization of the bias data B0.0, a logic level of the bias input latch signal BIAS_S may change from a logic "high(H)" level into a logic "low(L)" level at the second point in time "T2" or at the third point in time "T3". Thus, the bias input latch signal BIAS_S having a logic "low(L)" level may be set as a selection signal of the first and second data selectors 3111 and 3112. In a such a case, the first data selector 3111 may output the first data DA1 received through the first input terminal '0a' according to the bias input latch signal BIAS_S having a logic "low(L)" level, and the second data selector 3112 may output the second data DA2 received through the first input terminal '0b' according to the bias input latch signal BIAS_S having a logic "low(L)" level. The bias input latch signal BIAS_S having a logic "low(L)" level may be inputted to the first and second OR gates 3131 and 3132 of the signal output circuit 3130 through the delay circuit 3120.

At the third point in time "T3" when the second latency L2 elapses from the second point in time "T2", the first MAC input latch signal MAC_L1 may be inputted to the first OR gate 3131 of the input control circuit 3100. At the fourth point in time "T4" when the third latency L3 elapses from the third point in time "T3", the second MAC input latch signal MAC_L2 may be inputted to the second OR gate 3132 of the input control circuit 3100. The first OR gate 3131 may perform a logical OR operation of the first MAC input latch signal MAC_L1 having a logic "high(H)" level and the bias input latch signal BIAS_S having a logic "low(L)" level to output the first clock signal INpulse1 having a logic "high(H)" level. The second OR gate 3132 may perform a logical OR operation of the second MAC input latch signal MAC_L2 having a logic "high(H)" level and the bias input latch signal BIAS_S having a logic "low(L)" level to output the second clock signal INpulse2 having a logic "high(H)" level.

Referring to FIG. 53, the first data W0.0, . . . , and W0.7 may be inputted to the arithmetic block 3210 from the first input latch 3001-1 in synchronization with the first clock signal INpulse1 outputted from the first OR gate 3131. The second data X0.0, . . . , and X7.0 may be inputted to the arithmetic block 3210 from the second input latch 3001-2 in synchronization with the second clock signal INpulse2 outputted from the second OR gate 3132. The arithmetic block 3210 may perform the MAC arithmetic operation of the first data W0.0, . . . , and W0.7 and the second data X0.0, . . . , and X7.0 to output MAC interim data MAC0.0. The accumulative addition logic circuit 3220 may receive the MAC interim data MAC0.0 from the arithmetic block 3210. The accumulative addition logic circuit 3220 may perform the bias addition operation for adding the bias data B0.0 (corresponding to the feedback data), which are outputted from the data output latch 3310, to the MAC interim data MAC0.0, thereby generating and outputting MAC result data Y0.0.

Referring to FIGS. 45 and 54, the MAC result data Y0.0 including the result of the bias addition operation may be inputted to the data output latch 3310. Thereafter, the data output latch 3310 may be synchronized with the MAC output latch signal MAC_L3, which is generated again at the fifth point in time "T5" when the fourth latency L4 elapses from the fourth point in time "T4", to output the MAC result data Y0.0. The output transfer circuit 3320 may be synchronized with the MAC result output latch signal MAC_L_RST, which is generated to have a logic "high(H)" level at the sixth point in time "T6" when the fifth latency L5 elapses from the fifth point in time "T5", to output the MAC result data Y0.0 received from the data output latch 3310 to an external device OUT.

In the present embodiment, the MAC result data Y0.0 (including the result of the bias addition operation) outputted from the data output latch 3310 may correspond to a final MAC result data for the first and second data DA1 and DA2 and may be inputted to the output transfer circuit 3320. However, in some other embodiments, the MAC result data Y0.0 including the result of the bias addition operation may be fed back to the MAC circuit 3200 for an additional MAC arithmetic operation and an additional feedback process.

Figure 55:
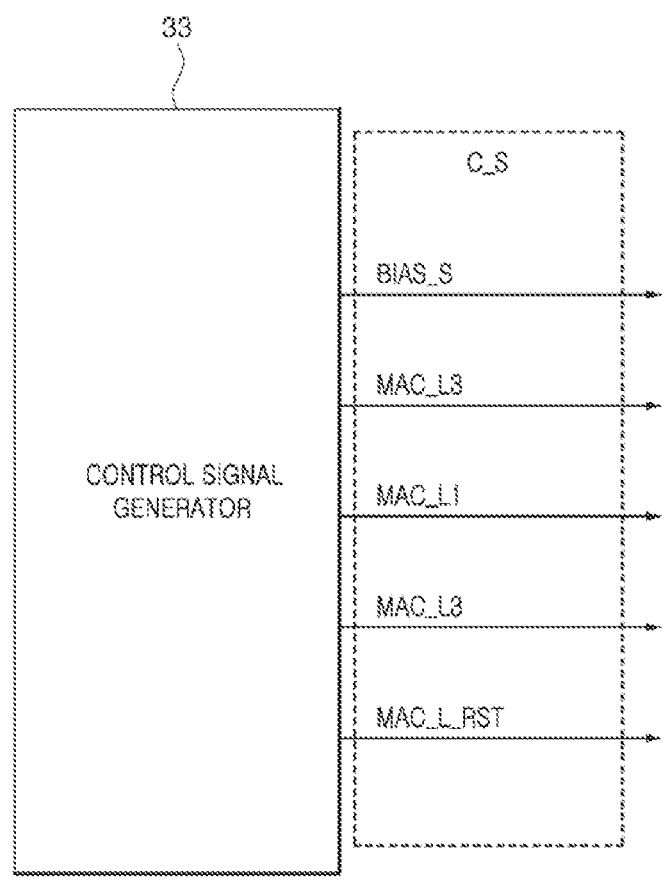
FIG. 55 illustrates another example of signals outputted from a control signal generator included in the PIM device illustrated in FIG. 43.

FIG. 55 illustrates another example of signals outputted from the control signal generator 33. Referring to FIG. 55, the control signal generator 33 may output various control signals C_Ss controlling operations of the arithmetic circuit (32 of FIG. 43) in response to the external command CMD. The control signals C_Ss may include first to fifth control signals. The first control signal may correspond to a bias input latch signal BIAS_S. The second control signal may correspond to a MAC output latch signal MAC_L3. The third control signal may correspond to a first MAC input latch signal MAC_L1. The fourth control signal may correspond to the MAC output latch signal MAC_L3. The fifth control signal may correspond to a MAC result output latch signal MAC_L_RST.

In an embodiment, the control signal generator 33 may output the bias input latch signal BIAS_S, the MAC output latch signal MAC_L3, the first MAC input latch signal MAC_L1, the MAC output latch signal MAC_L3, and the MAC result output latch signal MAC_L_RST in response to first to third commands included in the external command CMD. In the present embodiment, the control signal generator 33 may sequentially output the bias input latch signal BIAS_S and the MAC output latch signal MAC_L3 at a certain time interval in response to the first command of the external command CMD. In addition, the control signal generator 33 may sequentially output the first MAC input latch signal MAC_L1 and the MAC output latch signal MAC_L3 at a certain time interval in response to the second command of the external command CMD. Moreover, the control signal generator 33 may output the MAC result output latch signal MAC_L_RST in response to the third command of the external command CMD.

Figure 56:
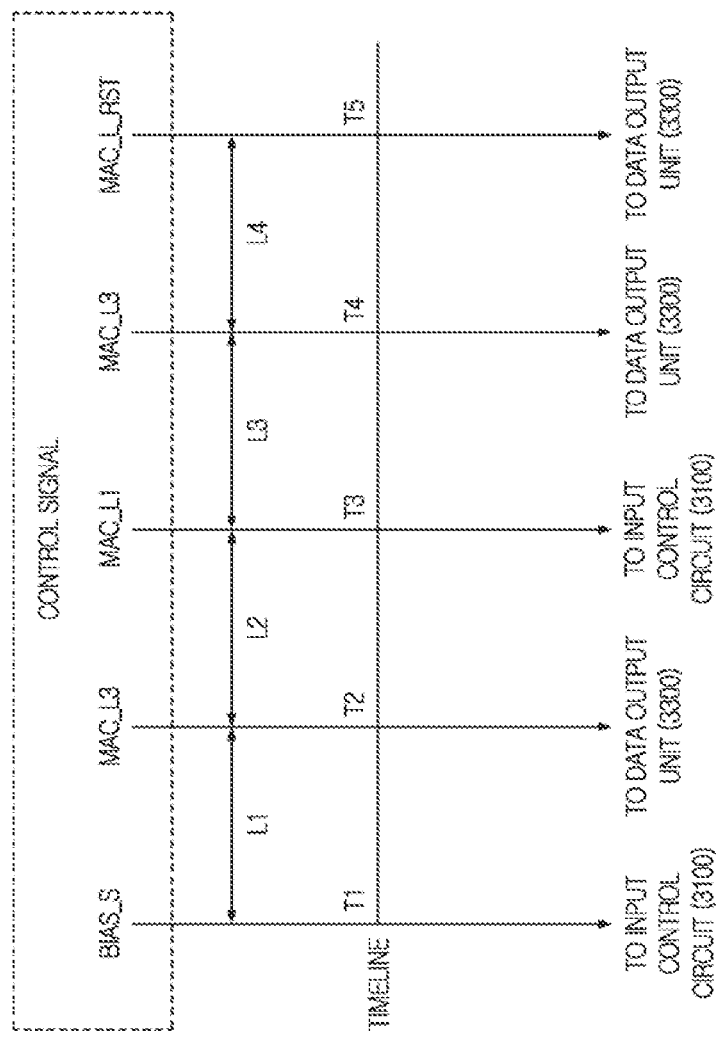
FIG. 56 is a schematic diagram illustrating output signals of the control signal generator illustrated in FIG. 55 with a timeline.

FIG. 56 illustrates the output signals BIAS_S, MAC_L1, MAC_L3, and MAC_L_RST of the control signal generator 33 illustrated in FIG. 55 with a timeline. Referring to FIGS. 55 and 56, the control signal generator 33 may output the bias input latch signal BIAS_S at a first point in time "T1". The bias input latch signal BIAS_S may be inputted to the input control circuit 3100. The control signal generator 33 may output the MAC output latch signal MAC_L3 at a second point in time "T2" when a first latency L1 elapses from the first point in time "T1". The MAC output latch signal MAC_L3 may be inputted to the data output unit 3300. The control signal generator 33 may output the first MAC input latch signal MAC_L1 at a third point in time "T3" when a second latency L2 elapses from the second point in time "T2". The first MAC input latch signal MAC_1 may be inputted to the input control circuit 3100. The control signal generator 33 may output the MAC output latch signal MAC_L3 to the data output unit 3300 again at a fourth point in time "T4" when a third latency L3 elapses from the third point in time "T3". The control signal generator 33 may output the MAC result output latch signal MAC_L_RST at a fifth point in time "T5" when a fourth latency L4 elapses from the fourth point in time "T4". The MAC result output latch signal MAC_L_RST may be inputted to the data output unit 3300.

The bias input latch signal BIAS_S may be a control signal for setting an initial value of the bias data DA_B. The first MAC input latch signal MAC_1 may be a signal for controlling an input latch operation of the data input unit 3001 for the first data DA1 and the second data DA2. The MAC output latch signal MAC_L3 may be a signal for controlling an output latch operation of the data output unit 3300. The MAC result output latch signal MAC_L_RST may be a signal for controlling an external output operation of the data output unit 3300 for outputting the MAC result data DA_MAC_R from the data output unit 3300. In an embodiment, the second to fourth control signals (i.e., the MAC output latch signal MAC_L3, the first MAC input latch signal MAC_L1, and the MAC output latch signal MAC_L3) may be iteratively outputted from the control signal generator 33. Thus, the MAC arithmetic operation and the feedback process may be iteratively performed by the MAC circuit 3200 and the data output unit 3300.

In the present embodiment, the first latency L1 may be set as an amount of time it takes to input the bias data into the data output unit 3300 based on the bias input latch signal BIAS_S. The second latency L2 may be set as an amount of time which is necessary to transmit the bias data corresponding to the first feedback data from the data output unit 3300 to the MAC circuit 3200 based on the MAC output latch signal MAC_L3. The third latency L3 may be set as an amount of time which is necessary for the input latch operation of the first data DA1 and the second data DA2 based on the first MAC input latch signal MAC_1 and necessary for the MAC arithmetic operation of the first and second data DA1 and DA2. The fourth latency L4 may be set as an amount of time which is necessary for the output latch operation of the data output unit 3300 for outputting the MAC result data, which are received from the MAC circuit 3200, based on the MAC output latch signal MAC_L3.

The bias input latch signal BIAS_S, the first MAC input latch signal MAC_1, the MAC output latch signal MAC_L3, and the MAC result output latch signal MAC_L_RST may be activated to have a logic "high" level. In an embodiment, a logic level of the bias input latch signal BIAS_S may change from a logic "high" level into a logic "low" level at the second point in time "T2" or the third point in time "T3". The first to fourth latencies L1, L2, L3, and L4 may be set as predetermined inherent time periods, respectively.

Figure 57:
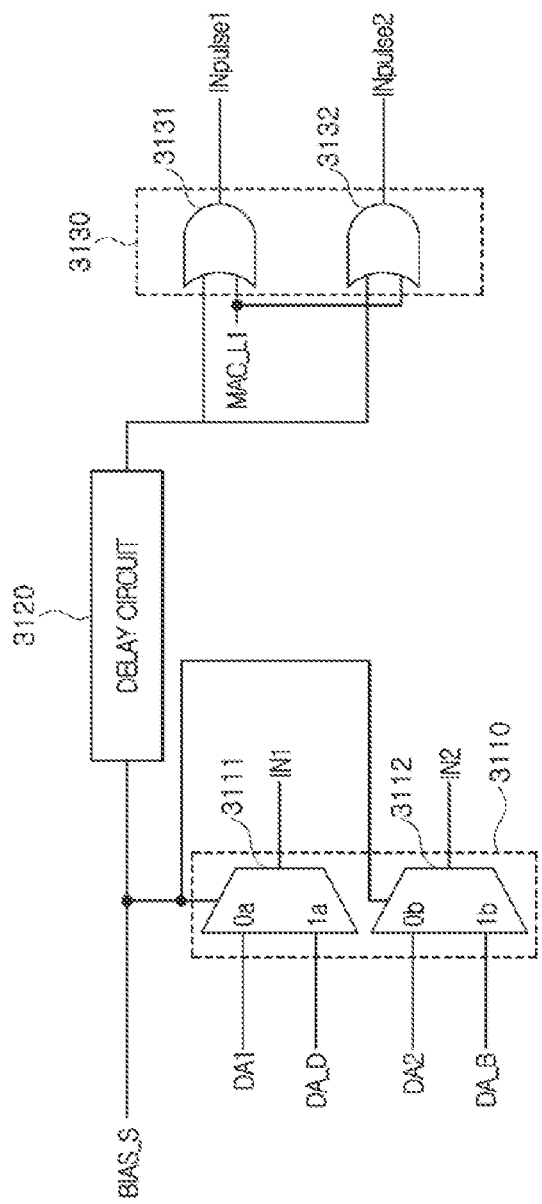
FIG. 57 illustrates an input status of some output signals of the control signal generator illustrated in FIG. 55.

FIG. 57 illustrates a configuration of the input control circuit 3100 to which the first MAC input latch signal MAC_1 generated by the control generator 33 illustrated in FIG. 55 is inputted. Referring to FIG. 57, each of the first and second OR gates 3131 and 3132 included in the signal output circuit 3130 may receive an output signal of the delay circuit 3120 and the first MAC input latch signal MAC_L1. That is, while the first and second OR gates 3131 and 3132 illustrated in FIG. 46 receive different input signals, the first and second OR gates 3131 and 3132 illustrated in FIG. 57 may receive the same input signals. Except for the above difference, operations performed by the output signals of the control signal generator 33 illustrated in FIG. 55 may be the same as described with reference to FIGS. 46 to 54. Thus, descriptions of the operations performed by the output signals BIAS_S, MAC_L3, MAC_L-1, MAC_L3, and MAC_L_RST of the control signal generator 33 illustrated in FIG. 55 will be omitted hereinafter.

Figure 58:
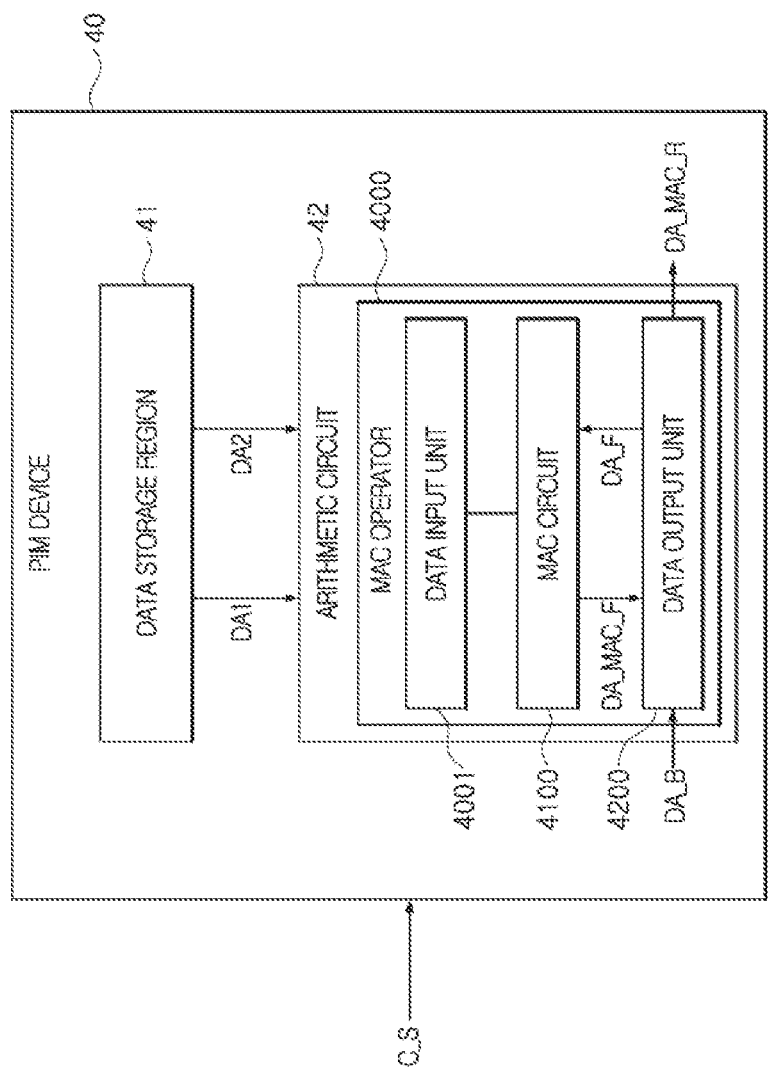
FIG. 58 is a block diagram illustrating a configuration of a PIM device according to yet another embodiment of the present disclosure.

FIG. 58 is a block diagram illustrating a configuration of a PIM device 40 according to yet another embodiment of the present disclosure. Referring to FIG. 58, the PIM device 40 may include a data storage region 41 and an arithmetic circuit 42 having substantially the same configurations as respective ones of the data storage region 21 and the arithmetic circuit 22 included in the PIM device 20 illustrated in FIG. 31. Thus, the arithmetic circuit 42 may also include a MAC operator 4000 having the same configuration as the MAC operator 2000 illustrated in FIG. 31. That is, the arithmetic circuit 42 may include a data input unit 4001, a MAC circuit 4100, and a data output unit 4200 which have substantially the same configurations as respective ones of the data input unit 2001, the MAC circuit 2100, and the data output unit 2200 illustrated in FIG. 31. Operations of the PIM device 40 may be controlled by a control signal C_S provided by an external device (not shown) coupled to the PIM device 40. In the present embodiment, the external device may correspond to a controller that controls the PIM device 40.

The control signal C_S provided by the external device may include the control signals BIAS_S, MAC_L1, MAC_L2, MAC_L3, and MAC_L_RST which are described with reference to FIGS. 33 and 34 or the control signals BIAS_S, MAC_L1, MAC_L3, and MAC_L_RST which are described with reference to FIGS. 40 and 41. As such, the PIM device 40 may be realized to have the same configuration as the PIM device 20 from which only the control signal generator 23 is removed, and a control signal generator corresponding to the control signal generator 23 may be located outside of the PIM device 40. That is, while the PIM device 20 operates based on the control signal C_S generated by the control signal generator 23 included in the PIM device 20, the PIM device 40 may operate based on the control signal C_S provided by an external device located outside of the PIM device 40. Except for the above difference, the descriptions of the PIM device 20 illustrated in FIGS. 31 to 42 may be equally applicable to the PIM device 40.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A processing-in-memory (PIM) device comprising:
   a data storage region configured to store first data and second data; and
   a multiplication/accumulation (MAC) operator configured to perform a MAC arithmetic operation of the first data and the second data,
   wherein the MAC operator includes:
   a MAC circuit configured to perform the MAC arithmetic operation to output MAC result data; and
   a data output unit configured to feedback bias data to the MAC circuit prior to the MAC arithmetic operation, and
   wherein the data output unit includes:
   a data selector configured to receive the bias data and the MAC result data and configured to selectively output the bias data or the MAC result data based on a selection signal; and a data output latch configured to receive output data of the data selector to feedback the output data of the data selector to the MAC circuit;

a delay circuit configured to receive and delay the selection signal by a certain time to output a delayed selection signal; and an OR gate configured to perform a logical OR operation of an output signal of the delay circuit and a clock signal of the data output latch to output a result of the logical OR operation to a clock terminal of the data output latch.

2. The PIM device of claim 1, wherein the MAC operator further includes a data input unit configured to:
receive the first data and the second data from the data storage region; and
latch the first data and the second data.

3. The PIM device of claim 2, wherein the MAC circuit includes:
an arithmetic block configured to perform the MAC arithmetic operation of the first and second data to output MAC interim data; and
an accumulative addition logic circuit configured to perform a bias addition operation for adding feedback data, which are outputted from the data output unit, to the MAC interim data outputted from the arithmetic block to generate and output the MAC result data.

4. The PIM device of claim 1, wherein the data output latch is configured to set the bias data as initial feedback data.

5. The PIM device of claim 4, wherein the data output unit is configured to latch the MAC result data when the data output unit receives the MAC result data from the data selector.

6. The PIM device of claim 1,
wherein the MAC circuit includes:
an arithmetic block configured to perform the MAC arithmetic operation of the first and second data to output MAC interim data; and
an accumulative addition logic circuit configured to perform a bias addition operation for adding feedback data, which are outputted from the data output unit, to the MAC interim data outputted from the arithmetic block to generate and output the MAC result data,
wherein the PIM device further comprises a control signal generator configured to output first, second, third, and fourth control signals for controlling operations of the MAC operator,
wherein the first control signal is the selection signal, which is inputted to the data selector, for selectively outputting one of the bias data and the MAC result data from the data selector,
wherein the second control signal is a control signal, which is inputted to the data input unit, for transmitting the first data from the data input unit to the arithmetic block,
wherein the third control signal is a control signal, which is inputted to the data input unit, for transmitting the second data from the data input unit to the arithmetic block, and
wherein the fourth control signal is the clock signal of the data output latch for outputting output data of the accumulative addition logic circuit from the data output latch.

7. The PIM device of claim 6, wherein the control signal generator is configured to:
output the first control signal having a logic "high" level at a first point in time;
output the second control signal at a second point in time when a first latency elapses from the first point in time;
output the third control signal at a third point in time when a second latency elapses from the second point in time;
output the fourth control signal at a fourth point in time when a third latency elapses from the third point in time; and
change a logic level of the first control signal from a logic "high" level into a logic "low" level at the second point in time.

8. The PIM device of claim 1,
wherein the data selector is configured to output the bias data to the data output latch when the first control signal has a first logic level; and
wherein the data output latch is synchronized with an output signal of the OR gate to output the bias data received from the data selector.

9. The PIM device of claim 1, wherein the data selector is configured to output the MAC result data to the data output latch when the first control signal has a second logic level.

10. A processing-in-memory (PIM) device comprising:
a multiplication/accumulation (MAC) circuit including an arithmetic block and an accumulative addition logic circuit, wherein the arithmetic block is configured to perform a MAC arithmetic operation of first data and second data to output MAC interim data and the accumulative addition logic circuit is configured to add feedback data to the MAC interim data to output MAC result data;
a data output unit configured to set the MAC result data as the feedback data to transmit the feedback data to the accumulative addition logic circuit; and
an input control circuit configured to supply the first and second data to the MAC circuit,
wherein the input control circuit is configured to supply first preliminary data and second preliminary data to the MAC circuit before the first and second data are supplied to the MAC circuit,
wherein bias data are outputted as the MAC result data by the MAC arithmetic operation of the first and second preliminary data, and
wherein the input control circuit includes:
a first data selector configured to receive the first data and the first preliminary data and configured to selectively output the first data or the first preliminary data according to a selection signal; and
a second data selector configured to receive the second data and the second preliminary data and configured to selectively output the second data or the second preliminary data according to the selection signal.

11. The PIM device of claim 10, further comprising a data input unit configured to receive and latch output data of the input control circuit.

12. The PIM device of claim 11, wherein the data output unit includes a data output latch which is configured to receive the MAC result data from the MAC circuit to output the MAC result data as the feedback data.

13. The PIM device of claim 12, wherein the data output latch is configured to set the bias data as initial data of the feedback data.

14. The PIM device of claim 12, further comprising a control signal generator configured to output first, second, third, and fourth control signals for controlling operations of the input control circuit, the MAC circuit, the data input unit, and the data output unit, wherein the first control signal is a control signal corresponding to the selection signal, which is inputted to the input control circuit, for selectively outputting both of the first and second data or both of the first and second preliminary data from the input control circuit;

wherein the second control signal is a control signal, which is inputted to the data output latch, for outputting input data of the data output latch from the data output latch;

wherein the third control signal is a control signal, which is inputted to the input control circuit, for transmitting the first data from the data input unit to the arithmetic block; and wherein the fourth control signal is a control signal, which is inputted to the input control circuit, for transmitting the second data from the data input unit to the arithmetic block.

15. The PIM device of claim 14, wherein the input control circuit further includes:
- a delay circuit configured to receive and delay the first control signal by a certain time to output the delayed first control signal;
- a first OR gate configured to perform a logical OR operation of an output signal of the delay circuit and the third control signal to output a result of the logical OR operation to the data input unit; and
- a second OR gate configured to perform a logical OR operation of the output signal of the delay circuit and the fourth control signal to output a result of the logical OR operation to the data input unit.

16. The PIM device of claim 15, wherein the control signal generator is configured to:
- output the first control signal having a first logic level at a first point in time;
- output the second control signal at a second point in time when a first latency elapses from the first point in time;
- output the third control signal at a third point in time when a second latency elapses from the second point in time;
- output the fourth control signal at a fourth point in time when a third latency elapses from the third point in time; and
- change a logic level of the first control signal from the first logic level into a second logic level at the second point in time.

17. The PIM device of claim 14,
wherein the first data selector is configured to output the first preliminary data when the first control signal having a first logic level is set as the selection signal and output the first data when the first control signal having a second logic level is set as the selection signal; and wherein the second data selector is configured to output the second preliminary data when the first control signal having the first logic level is set as the selection signal and output the second data when the first control signal having the second logic level is set as the selection signal.

18. The PIM device of claim 14, wherein the data output latch is configured to be synchronized with the second control signal to output the MAC result data received from the MAC circuit.

* * * * *